United States Patent
Inoue et al.

(10) Patent No.: US 9,020,651 B2
(45) Date of Patent: Apr. 28, 2015

(54) UTILIZATION START INTERVAL PREDICTION DEVICE AND UTILIZATION START INTERVAL PREDICTION METHOD

(75) Inventors: Tsuyoshi Inoue, Nara (JP); Jun Ozawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 589 days.

(21) Appl. No.: 13/454,222

(22) Filed: Apr. 24, 2012

(65) Prior Publication Data
US 2012/0209439 A1    Aug. 16, 2012

Related U.S. Application Data

(63) Continuation of application No. PCT/JP2011/001279, filed on Mar. 4, 2011.

(30) Foreign Application Priority Data

Mar. 8, 2010 (JP) ................................. 2010-051152
Mar. 8, 2010 (JP) ................................. 2010-051153

(51) Int. Cl.
  *G05D 9/00* (2006.01)
  *G06Q 10/04* (2012.01)

(52) U.S. Cl.
  CPC ........................................ *G06Q 10/04* (2013.01)

(58) Field of Classification Search
  CPC ............................................................. G06Q 10/04
  USPC .......................................................... 700/291
  See application file for complete search history.

(56) References Cited

U.S. PATENT DOCUMENTS

| | | | |
|---|---|---|---|
| 7,562,242 B2 | 7/2009 | Hori | |
| 8,355,827 B2 * | 1/2013 | Egnor et al. | 700/291 |
| 8,654,263 B2 * | 2/2014 | Chang | 348/730 |
| 2006/0206734 A1 | 9/2006 | Hori | |
| 2011/0138202 A1 * | 6/2011 | Inoue et al. | 713/310 |

FOREIGN PATENT DOCUMENTS

| | | | | |
|---|---|---|---|---|
| EP | 1729223 A2 * | 12/2006 | | G06F 17/00 |
| JP | 2001-242948 | 9/2001 | | |

(Continued)

OTHER PUBLICATIONS

International Search Report issued Apr. 5, 2011 in International (PCT) Application No. PCT/JP2011/001279.

*Primary Examiner* — Robert Fennema
*Assistant Examiner* — Sivalingam Sivanesan
(74) *Attorney, Agent, or Firm* — Wenderoth, Lind & Ponack, L.L.P.

(57) ABSTRACT

A prediction device for predicting a prediction interval being a time interval predicted with a high possibility of appliance utilization starts includes: an evaluation unit calculating, using utilization interval history data, an evaluation value for determining a prediction scheme for each appliance; a determination unit, based on the evaluation value at least for each appliance, determining at least one of a first and a second prediction scheme as the scheme of the prediction interval for the appliance, the first prediction scheme using a property that the appliance is utilized in a predetermined cycle, and the second prediction scheme using a property that the utilization of a second appliance being the appliance is started in a period from a start or an end of utilization of a first appliance being another appliance to a passage of a predetermined time; a prediction unit predicting a prediction interval according to the determined scheme.

20 Claims, 49 Drawing Sheets

(56) References Cited

FOREIGN PATENT DOCUMENTS

| | | | |
|---|---|---|---|
| JP | 2002-065516 | 3/2002 | |
| JP | 2002-281574 | 9/2002 | |
| JP | 2006-254185 | 9/2006 | |
| JP | 2006-303898 | * 11/2006 | ............... H04Q 9/00 |
| JP | 2007-259647 | * 10/2007 | ............... H02J 13/00 |
| JP | 2008-021020 | 1/2008 | |

* cited by examiner

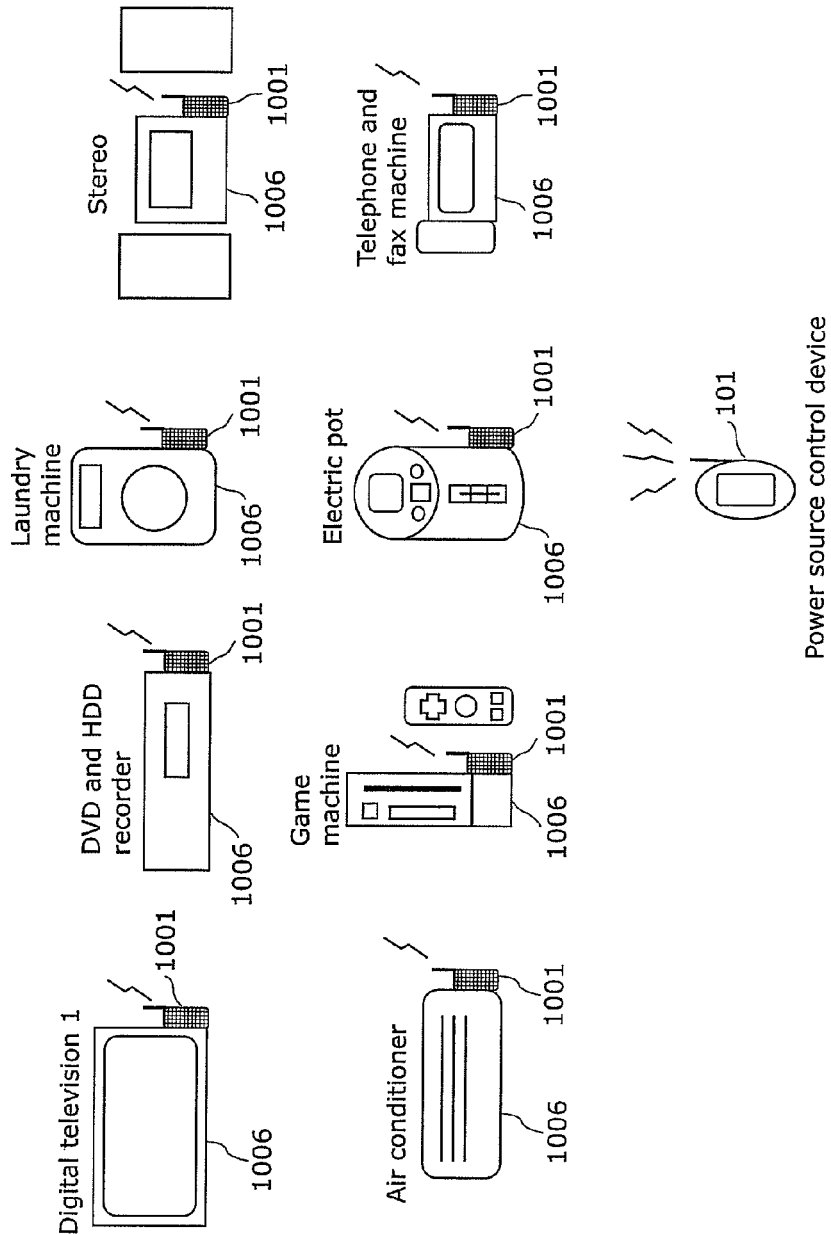

FIG. 5

| Appliance ID 501 | Measurement day 502 | Measurement day of week 503 | Measurement time 504 | Power consumption [W] 505 |
|---|---|---|---|---|
| 2 | 2009/9/2 | Wednesday | 19:00:10 | 0 |
|   | 2009/9/2 | Wednesday | 19:00:20 | 0 |
|   | 2009/9/2 | Wednesday | 19:00:30 | 0 |
|   | 2009/9/2 | Wednesday | 19:00:40 | 52 |
|   | 2009/9/2 | Wednesday | 19:00:50 | 38 |
|   | 2009/9/2 | Wednesday | 19:01:00 | 42 |
|   | 2009/9/2 | Wednesday | 19:01:10 | 45 |
|   | 2009/9/2 | Wednesday | 19:01:20 | 37 |
|   | 2009/9/2 | Wednesday | 19:01:30 | 40 |
|   | 2009/9/2 | Wednesday | 19:01:40 | 41 |
|   | 2009/9/2 | Wednesday | 19:01:50 | 37 |
|   | ... |   | ... | ... |

FIG. 6

| Measurement day | Measurement day of week | Measurement time | Power consumption of appliance ID 1 [W] | Power consumption of appliance ID 2 [W] | ... |
|---|---|---|---|---|---|
| 2009/9/2 | Wednesday | 19:00:10 | 125 | 0 | ... |
| 2009/9/2 | Wednesday | 19:00:20 | 128 | 0 | ... |
| 2009/9/2 | Wednesday | 19:00:30 | 120 | 0 | ... |
| 2009/9/2 | Wednesday | 19:00:40 | 126 | 52 | ... |
| 2009/9/2 | Wednesday | 19:00:50 | 126 | 38 | ... |
| 2009/9/2 | Wednesday | 19:01:00 | 146 | 42 | ... |
| 2009/9/2 | Wednesday | 19:01:10 | 118 | 45 | ... |
| 2009/9/2 | Wednesday | 19:01:20 | 120 | 37 | ... |
| 2009/9/2 | Wednesday | 19:01:30 | 125 | 40 | ... |
| 2009/9/2 | Wednesday | 19:01:40 | 137 | 41 | ... |
| 2009/9/2 | Wednesday | 19:01:50 | 128 | 37 | ... |
| ... | | | ... | ... | ... |

| Interval No. 902 | Utilization date 903 | Utilization day of week 904 | Start time 905 | End time 906 | Utilization interval (second) 907 | Power consumption amount (Wh) 908 | Number of times of low electric power 909 | Start/end kind 910 | Appliance ID2 |
|---|---|---|---|---|---|---|---|---|---|
| | | | Appliance ID1 901 | | | | | | |
| 1 | 2009/9/2 | Wednesday | 06:05:10 | 06:30:40 | 1530 | 126 | 0 | Manual/manual | ... |
| 2 | ... | ... | ... | ... | ... | ... | ... | ... | ... |
| . | . | . | . | . | . | . | . | . | . |

FIG. 12

| Appliance ID (1201) | Prediction interval No. (1202) | Day (1203) | Day of week (1204) | Start time (1205) | End time (1206) |
|---|---|---|---|---|---|
| 2 | 1 | 2009/9/2 | Wednesday | 06:05:10 | 06:30:40 |
|  | 2 | 2009/9/2 | Wednesday | 08:30:10 | 10:20:10 |
|  | . | . | . | . | . |
|  | . | . | . | . | . |
|  | . | . | . | . | . |
|  | : | : | : | : | : |

FIG. 13

| Appliance ID | Prediction interval No. | ΔT1 = 10 | | | | | | Prediction interval No. | ΔT1 = 20 | | |
| --- | --- | --- | --- | --- | --- | --- | --- | --- | --- | --- | --- |
| | | Day | Day of week | Start time | End time | | | | Day | Day of week | · |
| 2 | 1 | 2009/9/2 | Wednesday | 06:05:10 | 06:30:40 | | | 1 | 2009/9/2 | Wednesday | · |
| | 2 | 2009/9/2 | Wednesday | 08:30:10 | 10:20:10 | | | 2 | 2009/9/2 | Wednesday | · |
| | · | · | · | · | · | | | · | · | · | · |
| | · | · | · | · | · | | | · | · | · | · |
| | · | · | · | · | · | | | · | · | · | · |
| | ·· | ·· | ·· | ·· | ·· | | | ·· | ·· | ·· | ·· |

| Appliance ID | ΔT1 | Number of times of correct answers | Number of times of failures | User load value |
|---|---|---|---|---|
| 1501 | 1502 | 1503 | 1504 | 1505 |
| 2 | 10 | 40 | 30 | 30 |
|  | 20 | 45 | 25 | 25 |
|  | 30 | .. | .. | .. |
|  | .. | .. | .. | .. |
|  | .. | .. | .. | .. |

Prediction target data information:

| Appliance ID | Number of prediction target days | Number of prediction utilization intervals |
|---|---|---|
| 1506 | 1507 | 1508 |
| 2 | 7 | 70 |

FIG. 16

| Name of appliance | Appliance ID | Start time (second) | Utilization of remote control | Standby power consumption [W] |
|---|---|---|---|---|
| Laundry machine | 1 | 0 | No | 1.4 |
| DVD recorder | 2 | 80 | Yes | 8.6 |
| Television | 3 | 1 | Yes | 2.3 |
| .. | .. | .. | .. | .. |
| .. | .. | .. | .. | .. |
| .. | .. | .. | .. | .. |

| Appliance ID | ΔT1 | Utilization in prediction interval Waste power supply interval sum [hour] | No utilization in prediction interval Waste power supply interval sum [hour] | Power saving effect value (power saving hour) |
|---|---|---|---|---|
| 2 | 10 | 1.5 | 2.5 | 15.5 |
|  | 20 | 2.5 | 4.0 | 13.0 |
|  | 30 | . | . |  |
|  | . | . | . |  |
|  | . | . | . |  |

1801  1802  1803  1804  1805

Prediction target data information:

| Appliance ID | Number of prediction target days | Number of prediction utilization intervals | Utilization interval total hours | Average utilization interval total hours |
|---|---|---|---|---|
| 2 | 7 | 70 | 28 | 4.5 |

| Appliance ID | ΔT1 | Total | 0:00 - 4:00 | 4:00 - 8:00 | 8:00 - 12:00 |
|---|---|---|---|---|---|
| 2 | 10 | 4.2 | 0.0 | 0.5 | 1.2 |
|  | 20 | 3.6 | 0.0 | 0.3 | 1.0 |
|  | 30 | . | . | . | . |
|  | . | . | . | . | . |
|  | . | . | . | . | . |
|  | . | . | . | . | . |

1901 — Appliance ID
1902 — ΔT1
1903 — Total
1904 — {0:00 - 4:00, 4:00 - 8:00, 8:00 - 12:00}

FIG. 19B

| Appliance ID (1901) | ΔT1 (1902) | Total (1905) | 0:00 - 4:00 | 4:00 - 8:00 | 8:00 - 12:00 (1906) | | | |
|---|---|---|---|---|---|---|---|---|
| 2 | 10 | 15.5 | 4.0 | 1.5 | 2.2 | .. | .. | .. |
|  | 20 | 13.0 | 4.0 | 1.3 | 2.0 | .. | .. | .. |
|  | 30 | .. | .. | .. | .. | .. | .. | .. |
|  | .. | .. | .. | .. | .. | .. | .. | .. |
|  | .. | .. | .. | .. | .. | .. | .. | .. |
|  | .. | .. | .. | .. | .. | .. | .. | .. |

FIG. 31

| Number of time (horizontal ⇒ vertical) | Total | Laundry machine | Hair dryer | Toaster | Automatic rice cooker | PC | TV (HDD) | Air conditioner | Dishwasher | Microwave oven | [Nothing] |
|---|---|---|---|---|---|---|---|---|---|---|---|
| Laundry machine | 109 | 0 | 12 | 26 | 10 | 11 | 68 | 4 | 3 | 15 | 28 |
| Hair dryer | 63 | 18 | 23 | 16 | 2 | 6 | 34 | 0 | 7 | 9 | 10 |
| Toaster | 192 | 82 | 39 | 108 | 10 | 14 | 161 | 10 | 12 | 61 | 9 |
| Automatic rice cooker | 78 | 1 | 0 | 1 | 0 | 6 | 43 | 4 | 0 | 2 | 29 |
| PC | 90 | 7 | 5 | 17 | 7 | 1 | 43 | 3 | 1 | 7 | 30 |
| TV (HDD) | 541 | 40 | 20 | 34 | 60 | 50 | 128 | 24 | 23 | 28 | 269 |
| Air conditioner | 74 | 5 | 0 | 9 | 11 | 6 | 33 | 33 | 0 | 8 | 14 |
| Dishwasher | 45 | 12 | 5 | 13 | 1 | 7 | 16 | 1 | 0 | 6 | 17 |
| Microwave oven | 105 | 34 | 6 | 43 | 6 | 5 | 79 | 6 | 3 | 18 | 15 |

| Number of time (horizontal ⇒ vertical) | Total | Laundry machine | Hair dryer | Toaster | Automatic rice cooker | PC | TV (HDD) | Air conditioner | Dishwasher | Microwave oven | [Nothing] |
|---|---|---|---|---|---|---|---|---|---|---|---|
| Laundry machine | 109 | 0 | 0.11 | 0.24 | 0.09 | 0.1 | 0.62 | 0.04 | 0.03 | 0.14 | 0.26 |
| Hair dryer | 63 | 0.29 | 0.37 | 0.25 | 0.03 | 0.1 | 0.54 | 0 | 0.11 | 0.14 | 0.16 |
| Toaster | 192 | 0.43 | 0.2 | 0.56 | 0.05 | 0.07 | 0.84 | 0.05 | 0.06 | 0.32 | 0.05 |
| Automatic rice cooker | 78 | 0.01 | 0 | 0.01 | 0 | 0.08 | 0.55 | 0.05 | 0 | 0.03 | 0.37 |
| PC | 90 | 0.08 | 0.06 | 0.19 | 0.08 | 0.01 | 0.48 | 0.03 | 0.01 | 0.08 | 0.33 |
| TV (HDD) | 541 | 0.07 | 0.04 | 0.06 | 0.11 | 0.09 | 0.24 | 0.04 | 0.04 | 0.05 | 0.5 |
| Air conditioner | 74 | 0.07 | 0 | 0.12 | 0.15 | 0.08 | 0.45 | 0.45 | 0 | 0.11 | 0.19 |
| Dishwasher | 45 | 0.27 | 0.11 | 0.29 | 0.02 | 0.16 | 0.36 | 0.02 | 0 | 0.13 | 0.38 |
| Microwave oven | 105 | 0.32 | 0.06 | 0.41 | 0.06 | 0.05 | 0.75 | 0.06 | 0.03 | 0.17 | 0.14 |

Distribution of air conditioner starts based on start of television

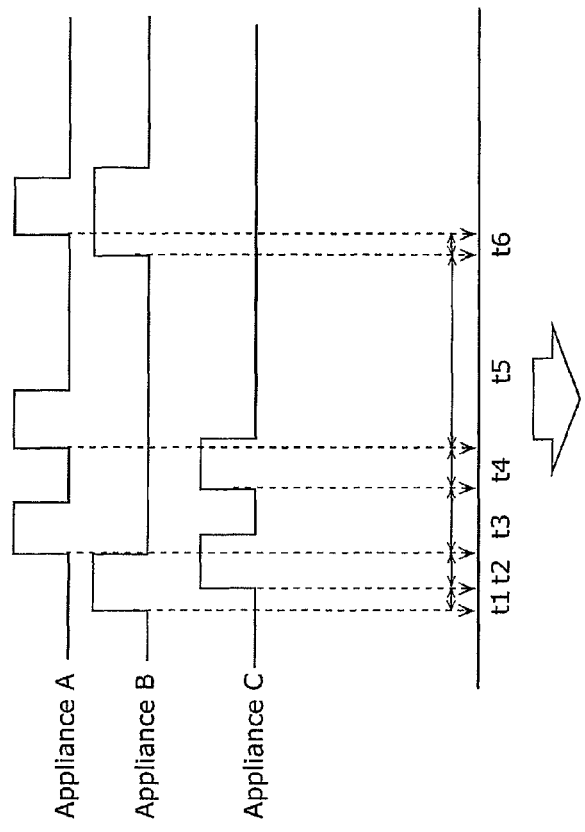

FIG. 36B

| First appliance | Start interval | Probability |
|---|---|---|
| Appliance A | 10 minutes | 0.5 |
| | 20 minutes | 0.4 |
| | 30 minutes | 0 |
| | ⋮ | ⋮ |
| Appliance B | 10 minutes | 0.1 |
| | 20 minutes | 0.2 |
| | 30 minutes | 0.5 |
| | ⋮ | ⋮ |
| ⋮ | ⋮ | ⋮ |

FIG. 36C

| Start interval | Second appliance | Probability |
|---|---|---|
| 10 minutes | Appliance A | 0.1 |
| | Appliance B | 0.3 |
| | Appliance C | 0 |
| | ⋮ | ⋮ |
| 20 minutes | Appliance A | 0.1 |
| | Appliance B | 0.2 |
| | Appliance C | 0.5 |
| | ⋮ | ⋮ |
| ⋮ | ⋮ | ⋮ |

| First appliance | Start interval | Second appliance | Probability |
|---|---|---|---|
| Appliance A | 10 minutes | Appliance A | 0.1 |
| | | Appliance B | 0.4 |
| | | Appliance C | 0 |
| | | ⋮ | ⋮ |
| | 20 minutes | Appliance A | 0.1 |
| | | Appliance B | 0.4 |
| | | Appliance C | 0 |
| | | ⋮ | ⋮ |
| ⋮ | ⋮ | ⋮ | ⋮ |
| Appliance B | 10 minutes | Appliance A | 0.1 |
| | | Appliance B | 0.4 |
| | | Appliance C | 0 |
| ⋮ | ⋮ | ⋮ | ⋮ |

FIG. 40

| Appliance ID (4101) | Name of appliance (4102) | ⟁T (4103) |
|---|---|---|
| 3 | Air conditioner | 60 |

| | From 6:00 to 6:59 | From 7:00 to 7:59 | From 8:00 to 8:59 | ... |
|---|---|---|---|---|
| Total number of starts | 10 | 3 | 1 | ... |

(4104)

| Name of appliance (4105) | From 6:00 to 6:59 | From 7:00 to 7:59 | From 8:00 to 8:59 | ... |
|---|---|---|---|---|
| Television | 10 | 0 | 1 | ... |
| DVD recorder | 5 | 1 | 0 | ... |
| Laundry machine | 3 | 1 | 0 | ... |
| : | : | : | : | ... |
| Total | 34 | 8 | 10 | |

| Appliance ID (4201) | Name of appliance (4202) | ⌀T (4203) |
|---|---|---|
| 3 | Air conditioner | 60 |

| Name of appliance (4204) | From 6:00 to 6:59 (4205) | From 7:00 to 7:59 | From 8:00 to 8:59 | ... |
|---|---|---|---|---|
| Television | 1 | 0 | 1 | ... |
| DVD recorder | 1 | 1 | 0 | ... |
| Laundry machine | 1 | 1 | 0 | ... |
| : | : | : | : | ... |

FIG. 42

| Appliance ID | Name of appliance | ΔT |
|---|---|---|
| 3 | Air conditioner | 60 |

4301　4302　4303

| | From 6:00 to 6:59 | From 7:00 to 7:59 | From 8:00 to 8:59 | ... |
|---|---|---|---|---|
| Prediction scheme | 2 | 1 | 1 | ... |
| Name of appliance | Television<br>DVD recorder<br>Laundry machine<br>... | | | ... |

4304　4305

UTILIZATION START INTERVAL PREDICTION DEVICE AND UTILIZATION START INTERVAL PREDICTION METHOD

CROSS REFERENCE TO RELATED APPLICATIONS

This is a continuation application of PCT Patent Application No. PCT/JP2011/001279 filed on Mar. 4, 2011, designating the United States of America, which is based on and claims priority of Japanese Patent Application No. 2010-051152 and No. 2010-051153 filed on Mar. 8, 2010. The entire disclosures of the above-identified applications, including the specifications, drawings and claims are incorporated herein by reference in their entirety.

TECHNICAL FIELD

Devices and methods consistent with exemplary embodiments of this disclosure relate generally to a utilization start interval prediction device for predicting a prediction interval which is a time interval predicted to have a high possibility that utilization of each of a plurality of appliances consuming electric power is started.

BACKGROUND ART

In recent years, many electrical appliances such as household electrical appliances have been used in households and power consumption in households has been rising. Against the background of this situation, a technique is disclosed for decreasing waste power consumption such as standby power consumption through measuring power consumption of electrical appliances and cutting off power supply to electrical appliances during a time interval in which users do not utilize the appliances.

For example, a technique is disclosed for a toilet device which stores a utilization time period for the toilet device and controls, by using the result, power consumption in a time period in which a user is predicted to avoid using the appliance (for example, refer to Patent Literature 1).

CITATION LIST

Patent Literature

Patent Literature 1: Japanese Unexamined Patent Application Publication No. 2002-65516

SUMMARY OF INVENTION

Technical Problem

However, the above conventional technique requires a control of a decrease in power saving effect and a further decrease in user load.

One or more exemplary embodiments of this disclosure may overcome the above disadvantage and other disadvantages not described here. However, it is understood that one or more exemplary embodiments of this disclosure are not required to overcome or may not overcome the disadvantage described above and other disadvantages not described here. One or more exemplary embodiments of this disclosure provide a solution to the above problem, and provide a utilization start prediction device such that a decrease in power saving effect is controlled and user load can be decreased in the case where power supply to an appliance is controlled based on a prediction interval.

Solution to Problem

So as to attain the above mentioned object, a utilization start interval prediction device according to an aspect of the present disclosure is a utilization start interval prediction device for predicting, for each of a plurality of appliances consuming electric power, a prediction interval which is a time interval predicted to have a high possibility that utilization of the appliances is started, comprising: a utilization interval data storage unit configured to store, for each of the appliances, history data of a utilization interval which is a time interval in which the appliance has been used; and a prediction interval prediction unit configured to predict a prediction interval at least for each of the appliances based on the history data of the utilization interval, wherein the prediction interval prediction unit includes: an evaluation unit configured to calculate, by using the history data of the utilization interval, an evaluation value for determining a prediction scheme of the prediction interval, the prediction scheme being for each of the appliances; a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is an other appliance until a passage of predetermined time; and a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance.

It should be noted that these overall and specific embodiments may be implemented as a system, a method, an integrated circuit, a computer program, or a recording medium, and as an optional combination of a system, a method, an integrated circuit, a computer program, and a recording medium.

Advantageous Effects of Invention

As described above, the present disclosure can ensure that a decrease in the power saving effect can be controlled and the user load can be decreased.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure. In the Drawings:

FIG. 2A is a diagram showing a schematic view of a power source control system according to Embodiment 1 of the present disclosure;

FIG. 5 is a diagram showing an example of power consumption data measured by the power consumption measurement device according to Embodiment 1;

FIG. 6 is a diagram showing an example of power consumption data stored in a power consumption history storage unit according to Embodiment 1;

FIG. 9 is a diagram showing an example of utilization interval data stored by a utilization interval data storage unit according to Embodiment 1;

FIG. 12 is a diagram showing an example of prediction interval information stored by a prediction result storage unit according to Embodiment 1;

FIG. 13 is a table illustrating an example of a plurality of prediction results calculated by varying a value of duration $\Delta T1$;

FIG. 15 is a table showing an example of user load information stored in the prediction result storage unit according to Embodiment 1;

FIG. 16 is a table showing an example of appliance information stored by the prediction result storage unit according to Embodiment 1;

FIG. 18B is a diagram showing an example of power saving effect information stored by the prediction result storage unit according to Embodiment 1;

FIG. 19A is a table showing another example of user load information stored by the prediction result storage unit according to Embodiment 1;

FIG. 19B is a table showing another example of power saving effect information stored in the prediction result storage unit according to Embodiment 1;

FIG. 31 is a diagram showing an example of a calculation result of the number of starts by a prediction interval prediction unit according to Embodiment 2;

FIG. 32 is a diagram showing an example of a calculation result of a probability showing a size of a start relationship between appliances by the prediction interval prediction unit according to Embodiment 2;

FIG. 36A is a diagram for explaining prediction interval prediction processing according to Modification 5 of Embodiment 2;

FIG. 36B is a table for explaining the prediction interval prediction processing according to Modification 5 of Embodiment 2;

FIG. 36C is a table for explaining the prediction interval prediction processing according to Modification 5 of Embodiment 2;

FIG. 40 is a diagram showing an example of a calculation result of the number of starts by a prediction interval prediction unit according to Embodiment 3;

FIG. 41 is a diagram showing a result of comparison between a probability showing a size of a start relationship between appliances and a threshold value by the prediction interval prediction unit according to Embodiment 3;

FIG. 42 is a diagram showing a determination result of a prediction scheme by the prediction interval prediction unit according to Embodiment 3;

Figure 1:
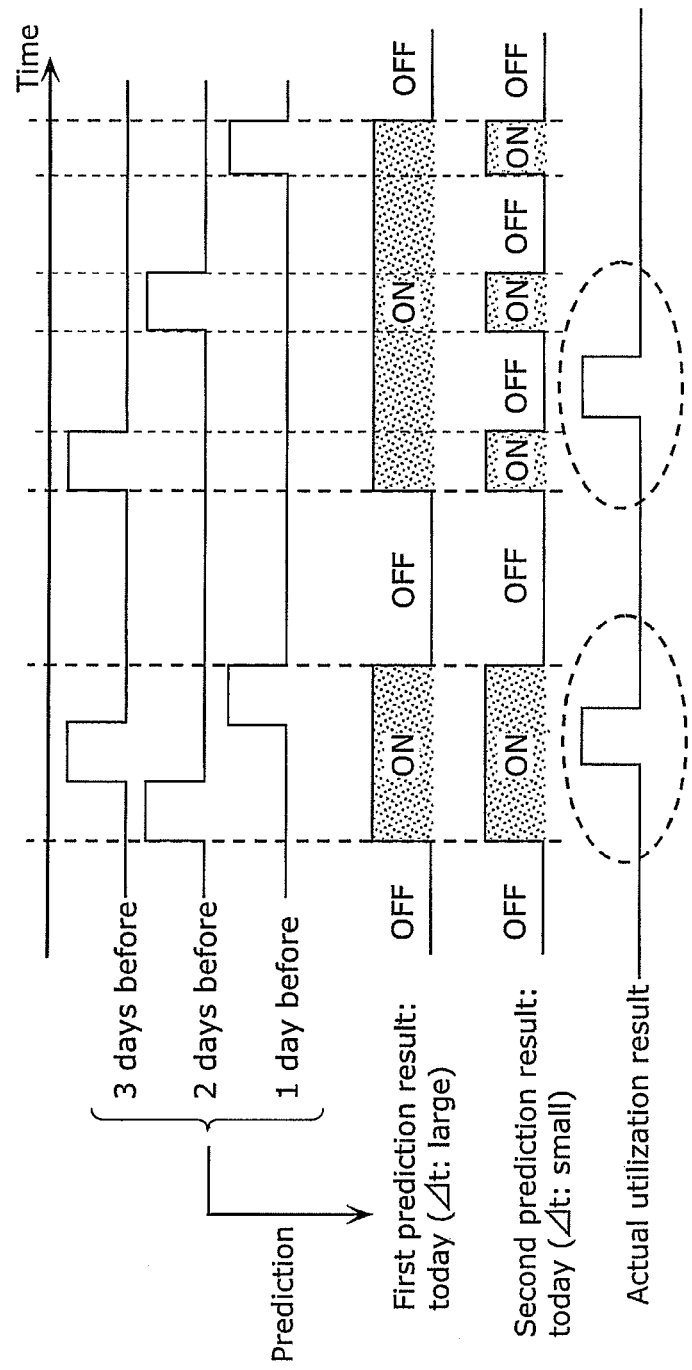
FIG. 1 is a diagram for explaining a relationship between user load and power saving effect.

DESCRIPTION OF EMBODIMENTS (Underlying Knowledge Forming the Basis of this Disclosure)

If power supply to an appliance can be cut off when the appliance is not used, it is possible for standby power consumption of the appliance to be decreased. Against the backdrop, it can be considered that based on a past utilization history of an appliance, a time interval having a high possibility of the appliance being utilized is predicted as a prediction interval, and electric power is supplied to the appliance only in the time interval.

However, if a user tries to utilize the appliance in a period in which power supply is cut off, the user must perform an operation such as a cutoff of power supply, with a result that user load is eventually increased. Therefore, it is desirable that prediction accuracy of a prediction interval is enhanced such that an increase in the user load is controlled. Therefore, in the case where a prediction interval is predicted to be long so as to enhance the prediction accuracy, the user load is decreased but power supply is performed for an appliance for a longer time, with a result that power saving effect is decreased. In other words, there is a trade-off relationship between decreasing the user load and increasing the power saving effect.

It should be noted that the prediction accuracy refers to an accuracy in which utilization of an appliance is started within a prediction interval. For example, when a probability is higher that an appliance is used in a period other than the prediction period, the prediction accuracy is lower.

In other words, in the case where prediction accuracy is intended to be enhanced in a prediction scheme using a utilization history of an appliance (in the case where a probability that utilization of an appliance in other than a prediction interval is started is intended to be decreased), the prediction interval must be extended. In other words, electric power must be supplied for a longer time. With this, in the case where electric power is supplied to an appliance according to the prediction interval, an amount of power consumption or an electric bill which can be saved through a cutoff of power supply (power saving effect) is decreased.

Meanwhile, in the case where the prediction interval is reduced for enhancing the power saving effect, the possibility is high that power supply is cut off when a user tries to utilize the appliance. In this case, it is necessary for the user to start utilizing the appliance after a switch or the like for supplying power to the appliance is turned on, the user trouble (user load) is increased.

Therefore, a utilization start interval prediction device according to an aspect of the present disclosure is a utilization start interval prediction device for predicting, for each of a plurality of appliances consuming electric power, a prediction interval which is a time interval predicted to have a high possibility that utilization of the appliances is started, comprising: a utilization interval data storage unit configured to store, for each of the appliances, history data of a utilization interval which is a time interval in which the appliance has been used; and a prediction interval prediction unit configured to predict a prediction interval at least for each of the appliances based on the history data of the utilization interval, wherein the prediction interval prediction unit includes: a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is an other appliance until a passage of predetermined time; and a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance.

With this configuration, according to history data of a utilization interval, at least one of the first prediction scheme and the second prediction scheme can be determined as a prediction scheme for each of the appliances. If power supply to each of the appliance is controlled by using a prediction interval predicted according to the determined prediction scheme, a decrease in power saving effect can be controlled and user load can be decreased.

For example, the history data of the utilization interval may include data showing whether the utilization is automatically started or manually started, and the evaluation unit may be configured to calculate the evaluation value by using only the utilization interval in which the utilization is manually started among the utilization intervals included in the history data of the utilization interval.

For example, the utilization start interval prediction device may further comprise a utilization interval specification unit configured to specify a utilization interval by using history data of electric power consumed by each of the plurality of the appliances, and store the specified utilization interval in the utilization interval data storage unit, the utilization interval being a time interval in which the appliance is used.

For example, the prediction interval prediction unit may be further configured to calculate, as a backward probability, a probability that in the history data of the utilization interval, the start time of the utilization interval of the second appliance is included in a period from the start time or the end time of the utilization interval of the first appliance to a passage of the predetermined time, and record the first appliance in the start relationship data, in association with the second appliance, in the case where the backward probability is equal to or greater than a threshold value.

For example, the prediction interval prediction unit may be further configured to calculate a backward probability and a forward probability, and record the first appliance in the start relationship data in association with the second appliance, in the case where a score obtained from the backward probability and the forward probability is equal to or greater than a threshold value, the backward probability being a probability that in the history data of the utilization interval, the start time of the utilization interval of the second appliance is included in a period from the start time or the end time of the utilization interval of the first appliance to a passage of the predetermined time, and the forward probability being a probability that the start time or the end time of the utilization interval of the first appliance is included in a period starting from the start time or the end time of the utilization interval of the second appliance to ending before the predetermined time.

For example, in the case where the second prediction scheme is determined, the prediction unit may be further configured to: (i) calculate a first probability and a second probability, the first probability being a probability that in the history data of the utilization interval, the start time of the utilization interval of the second appliance is included in a period from the start time or the end time of the utilization interval of the first appliance to a passage of the predetermined time, and the second probability being a probability that the start time of the utilization interval of the second appliance is included in a period from the end time of the utilization interval of the first appliance to a passage of the predetermined time; and (ii) predict, as the prediction interval for the second appliance, a time interval of a second duration including the start time of the utilization interval of the first appliance in the case where a difference value between the first probability and the second probability is equal to or greater than a predetermined value, and predict, as the prediction interval for the second appliance, a time interval of a third duration including the end time of the utilization interval of the first appliance in the case where the difference value between the first probability and the second probability is less than the predetermined value, the third duration being shorter than the second duration.

For example, the utilization start interval prediction device may further comprise: (i) a user load prediction unit configured to calculate, by using the prediction interval and the history data of the utilization interval, a user load value for each of predetermined variable values necessary to predict by the first prediction scheme or the second prediction scheme, the user load value indicating a size of a load on the user utilizing each of the appliances in the case where electric power is supplied to the appliance based on the prediction interval; (ii) a power saving effect prediction unit configured to calculate, by using the prediction interval and the history data of the utilization interval, a power saving effect value for each of the predetermined variable values, the power saving effect value indicating a size of a power saving effect in the case where electric power is supplied to each of the appliances based on the prediction interval; and (iii) a display control unit configured to cause a display unit to display, as electric power information, a combination of the user load value and the power saving effect value both corresponding to each of the variable values.

For example, the user load prediction unit may be configured to calculate the user load value such that the user load value indicates a greater load when a start time of a utilization interval included in the history data of the utilization interval is not included in the prediction interval.

For example, the user load prediction unit is configured to calculate the user load value such that an appliance indicates a greater load when a time from a start of power supply to an appliance to a start of utilization of the appliance is longer.

For example, the user load prediction unit may be configured to calculate the user load value such that a load of an appliance which can start utilization by remote control is greater than a load of an appliance which cannot start utilization by remote control.

For example, in the case where a predetermined user load value is selected by the user, the display control unit may be configured to cause the display unit to display, as the electric power information, a combination having the power saving effect value indicating the greatest power saving effect among combinations having predetermined user load values.

For example, the display control unit may be configured to determine whether or not to display the electric power information for each of the appliances or for each of the time periods, based on a distribution of evaluation values for each of the appliances and for each of the time periods which is determined by at least one of the user load value and the power saving effect value.

For example, the display control unit may be configured to: (i) display the electric power information for each of the appliances in the case where a variance of evaluation values for each of the appliances is greater than a variance of evaluation values for each of the time periods; and (ii) display the electric power information for each of the appliances in the case where the variance of evaluation values for each of the appliances is smaller than the variance of evaluation values for each of the time periods.

For example, in the case where the electric power information is displayed for each of the time periods, the display control unit may be configured to display the electric power information for each of the time periods which is set to include a time period in which the user load value is equal to or less than a predetermined value.

For example, the utilization start interval prediction device may further comprise a power source control unit configured to control power supply to each of the appliances based on the prediction interval.

For example, the evaluation unit may be configured to calculate the evaluation value for each of the appliances and each of the time intervals, and the determination unit may be configured to determine, for each of the appliances and each of the time intervals, at least one of the first prediction scheme and the second prediction scheme as the prediction scheme of the prediction interval for the appliance.

Moreover, a utilization start interval prediction device according to an aspect of the present disclosure is a utilization start interval prediction device for predicting, for each of a plurality of appliances consuming electric power, a prediction interval which is a time interval predicted to have a high possibility that utilization of the appliances is started, comprising: a utilization interval data storage unit configured to store, for each of the appliances, history data of a utilization interval which is a time interval in which the appliance has been used; and a prediction interval prediction unit configured to predict a prediction interval at least for each of the appliances based on the history data of the utilization interval, wherein the prediction interval prediction unit includes: an evaluation unit configured to calculate, by using the history data of the utilization interval, an evaluation value for determining a prediction scheme of the prediction interval, the prediction scheme being for each of the appliances; a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is an other appliance until a passage of predetermined time; and a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance, wherein the evaluation unit is configured to calculate, as the evaluation value, a data amount of the history data of the utilization interval, and the determination unit is configured to determine the second prediction scheme as the prediction scheme for the appliance in the case where the evaluation value is equal to or greater than a predetermined value, and determine the first prediction scheme as a prediction scheme for the appliance in the case where the evaluation value is less than the predetermined value.

Moreover, a utilization start interval prediction device according to an aspect of the present disclosure is a utilization start interval prediction device for predicting, for each of a plurality of appliances consuming electric power, a prediction interval which is a time interval predicted to have a high possibility that utilization of the appliances is started, the utilization start interval prediction device comprising: a utilization interval data storage unit configured to store, for each of the appliances, history data of a utilization interval which is a time interval in which the appliance has been used; and a prediction interval prediction unit configured to predict a prediction interval at least for each of the appliances based on the history data of the utilization interval, wherein the prediction interval prediction unit includes: an evaluation unit configured to calculate, by using the history data of the utilization interval, an evaluation value for determining a prediction scheme of the prediction interval, the prediction scheme being for each of the appliances; a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is an other appliance until a passage of predetermined time; and a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance, wherein the evaluation unit is configured to calculate the evaluation value, for each of the prediction result of the prediction interval by the first prediction scheme and the prediction result of the prediction interval by the second prediction scheme which are predicted by using history data of a part of the time interval among the history data of the utilization interval, by using history data of another part of the time interval, and the determination unit is configured to determine, as the prediction scheme for the appliance, one of the first prediction scheme and the second prediction scheme for which the evaluation value is higher.

Moreover, a utilization start interval prediction method according to an aspect of the present disclosure is a utilization start interval prediction method for predicting, for each of a plurality of appliances consuming electric power, a prediction interval which is a time interval predicted to have a high possibility that utilization of the appliances is started, comprising: (i) calculating, by using the history data of the utilization interval, an evaluation value for determining a prediction scheme of a prediction interval, the utilization interval being a time interval in which each of the appliance is used and being stored in the utilization interval data storage unit, and the prediction scheme being for each of the appliances; (ii) determining, based on the evaluation value at least for each of the appliances, at least one of a first prediction scheme and a second prediction scheme as a prediction scheme of the prediction interval of the appliance, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is another appliance to a passage of a predetermined time; and (iii) predicting, as a prediction interval, a time interval of a first duration in the case where the first prediction scheme is determined and, as a prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data showing the first appliance corresponding to the second appliance, wherein, in the calculating, in the history data of the utilization interval, a probability is calculated for each of the first appliances, and a numeral value is calculated as the evaluation value, the probability being that the start time or the end time of the first appliance is included in a period from the start time of the utilization interval of the second appliance to before a predetermined time, and the numeral value being the number of the first appliances equal to or greater than a first threshold value, and in the determining, the second prediction scheme is determined as a prediction scheme for the second appliance in the case where the evaluation value is equal to or greater than a second threshold value, and the first prediction scheme is determined as a prediction scheme for the second appliance in the case where the evaluation value is less than the second threshold value.

Moreover, an aspect of the present disclosure may be a non-transitory computer-readable recording medium having a program recorded thereon for causing a computer to execute the above utilization start interval prediction scheme.

Hereafter, the utilization start interval prediction device and the utilization start interval prediction scheme according to an aspect of the present disclosure will be specifically described with reference to the drawings.

It should be noted that each of the embodiments to be described hereafter shows a desirable example of the present disclosure. The numerical values, shapes, materials, structural elements, the arrangement and connection of the structural elements, steps, the processing order of the steps etc. shown in the following exemplary embodiments are mere examples, and therefore do not limit this disclosure which is defined according to the claims. Moreover, among constituent elements in the following embodiments, constituent elements which are not indicated in an independent claim showing the most generic concept will be described as optional constituent elements.

Embodiment 1

A user's sense of values is various, which means that there is a user who wants to avoid load imposition while there is also a user who wants to save power as much as possible. Therefore, in Embodiment 1, a method of displaying, to a user, a relationship between user load and power saving effect, with respect to a plurality of prediction results obtained by predicting a prediction interval by varying a variable value which is a parameter used for predicting a prediction interval, will be described with reference to specific examples.

As described above, in the case where power supply is controlled for an appliance based on a prediction scheme using the past utilization history, there is a trade-off relationship between the power saving effect and the user load. The example will be specifically described with reference to FIG. 1.

FIG. 1 is a diagram for explaining a relationship between the user load and the power saving effect. In FIG. 1, an example will be shown where a prediction interval for the current day is predicted by using a utilization history of an electrical appliance in the past three days.

In the prediction scheme, a time interval which is created through a combination of time intervals in which an appliance was utilized in the past is predicted as a prediction interval. Here, when in the prediction scheme, time intervals are combined in which the appliance was utilized in the past, adjacent time intervals are combined when the adjacent time intervals are within a variable value Δt. In other words, in the case where a prediction interval is predicted with use of the prediction scheme, a length is different for the prediction interval which is predicted by the scale of the variable value Δt.

For example, in the case where the variable value Δt is set large, as shown in the first prediction result, the prediction interval becomes longer, with a result that prediction accuracy becomes higher. In other words, because a probability of a user manually canceling a cutoff of power supply becomes lower, a possibility of a decrease in the user load becomes higher. However, because power supply is performed for the appliance for a long hour, power saving effect is decreased as a result.

Meanwhile, in the case where the variable value Δt is set small, as shown in the second prediction result, the prediction interval become shorter, with a result that prediction accuracy becomes lower. However, because a time for power supply to the appliance is reduced, power saving effect is greater.

Specifically, in the case where there is an actual utilization result as shown in FIG. 1, two utilization start times, in the first prediction result, are both included in the prediction interval. Therefore, there is no need for the user to manually cancel a cutoff of power supply and the user load is small. In the second prediction result, however, a second-time utilization start time is not included in the prediction period. Therefore, there is need for the user to manually cancel a cutoff of power supply once and the user load is large.

Meanwhile, as obvious from FIG. 1, power saving effect is greater for power supply to the appliance based on the second prediction result than for power supply to the appliance based on the first prediction result.

In this way, because there is a trade-off relationship between the user load and the power saving effect, the problem is on which degree of a variable value Δt is set.

In the present embodiment, the first prediction scheme will be described which uses a property that an appliance is utilized in a predetermined cycle is used.

Figure 2B:
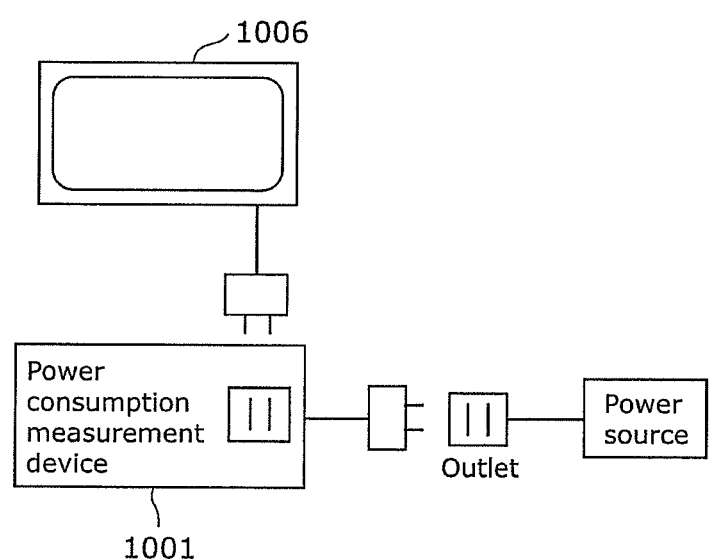
FIG. 2B is a diagram showing an example where a power consumption measurement device according to Embodiment 1 is installed.

FIG. 2A is a diagram showing a schematic view of a power source control system 100 according to Embodiment 1. Moreover, FIG. 2B is a diagram of an example where a power consumption measurement device 1001 according to Embodiment 1 is installed.

The power source control system 100 includes one or more appliances 1006 such as a digital television or a laundry machine, the power consumption measurement device 1001, and a power source control device 101.

The appliance 1006 is an electrical appliance which consumes electric power. Specifically, the appliance 1006 is, for example, a household electrical appliance installed in households.

The power consumption measurement device 1001, for each of the appliances 1006, measures power consumption of the appliance 1006 in a predetermined time interval (for example, 10 seconds). Moreover, the power consumption measurement device 1001, as shown in FIG. 2B, is electrically connected between power source and the appliances 1006 and controls power supply to the appliance 1006.

The power source control device 101 displays, in a display unit 1007, electric power information for determining a time interval in which electric power is supplied to the appliances which consume electric power.

Specifically, the power source control device 101 collects, as power consumption data, time-series data of power consumption of the appliances 1006 which are measured by the power consumption measurement device 1001. In other words, the power source control device 101 collects, as power consumption data, history data of power consumption for each of the appliances 1006.

Moreover, the power source control device 101 predicts, based on the collected power consumption data, a prediction interval in which a possibility is high that utilization of the appliance 1006 is predicted to be started, with respect to a plurality of variable values. Furthermore, the power source control device 101 displays, in the display unit 1007, a prediction result with respect to each of the variable values, based on a relationship between user load and power saving effect. Then, the power source control device 101 controls power supply to the appliances according to an input from the user in response to the display result.

Hereafter, details of the power source control device 101 and the power consumption measurement device 1001 both included in the power source control system 100 will be described.

Figure 3:
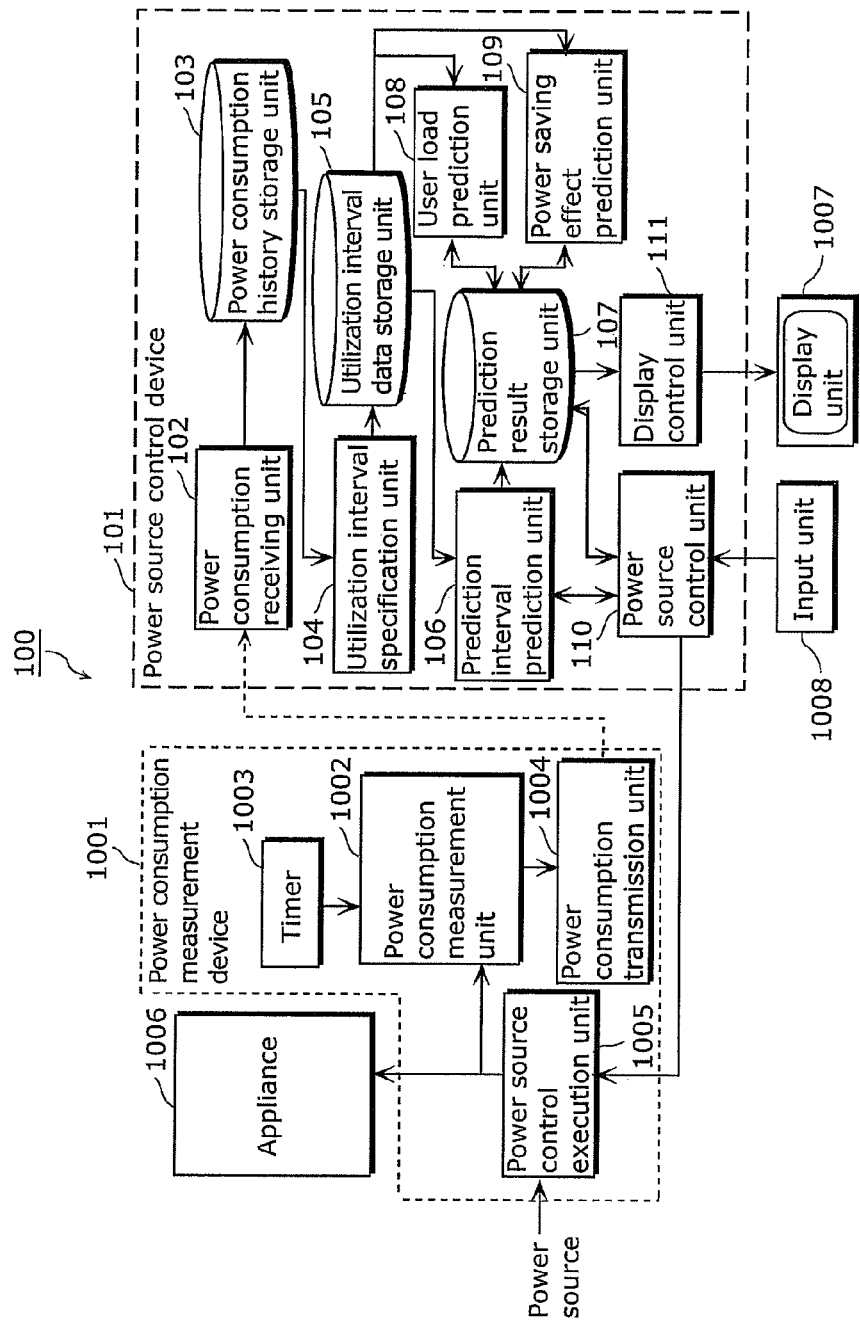
FIG. 3 is a block diagram showing functional configurations of a power consumption measurement device and a power source control device included in the power source control system according to Embodiment 1.

FIG. 3 is a block diagram showing the functional configurations of the power consumption measurement device 1001 and the power source control device 101 both included in the power source control system according to Embodiment 1.

The power consumption measurement device 1001 includes a power consumption measurement unit 1002, a timer 1003, a power consumption transmission unit 1004, and a power source control execution unit 1005. The power consumption measurement device 1001 is electrically connected between power source and the appliances 1006.

The power source control execution unit 1005 is, for example, installed between the power source and a power plug for each of the appliances 1006. The power source control execution unit 1005, according to an instruction from the power source control device 101 or a user operation, can cut off power supply from the power source to the appliance 1006 and cancel the cutoff.

The power consumption measurement unit 1002 is connected to the appliance 1006 which is a measurement target, and measures electric power consumed by the appliance 1006 (hereafter only described as power consumption). Power consumption is, for example, calculated by a product of multiplying a value of electrical voltage imposed on the appliance 1006 by a value of electrical current running into the appliance 1006. The power consumption measurement unit 1002 jointly transmits, to the power consumption transmission unit 1004, the measured power consumption value and a measurement time obtained by the timer 1003. It should be noted that a time interval for measuring power consumption is set in advance and the timer 1003 is also used for measuring the time interval.

The power consumption transmission unit 1004 transmits, to the power source control device 101, data of the measured appliance 1006 including the measured value of power consumption and measurement time (hereafter only described as power consumption data). It should be noted that a data transmission method may be a method using radio waves or may be a method using a fixed line.

The power source control device 101 includes a power consumption receiving unit 102, a power consumption history storage unit 103, a utilization interval specification unit 104, a utilization interval data storage unit 105, a prediction interval prediction unit 106, and a prediction result storage unit 107. Furthermore, the power source control device 101 includes a user load prediction unit 108, a power saving effect prediction unit 109, a power source control unit 110, and a display control unit 111.

The power consumption receiving unit 102 receives, from the power consumption measurement device 1001 installed on each of the appliances 1006, power consumption data measured at a predetermined time interval and then stores the power consumption data in the power consumption history storage unit 103.

The utilization interval specification unit 104 specifies, using the power consumption data for each of the appliances stored in the power consumption history storage unit 103, a utilization interval which is a time interval in which each of the appliances is used. Then, the utilization interval specification unit 104 stores, in the utilization interval data storage unit 105, utilization interval data including history data of the specified utilization interval and various pieces of information about the utilization interval.

It should be noted that a state in which an appliance is used indicates a state in which a predetermined amount or more of electric power is consumed within a predetermined time. Meanwhile, a state in which an appliance is not used indicates a state in which a less than predetermined amount of electric power is consumed.

Specifically, for example, the state in which an appliance is used indicates a state in which the power is on for the appliance, as indicated by a state in which video is reproduced by a Digital Versatile Disc (DVD) player, and the user is utilizing the appliance. In addition, the state in which an appliance is used includes, as indicated by a state in which the power is on for the DVD player but a state in which video is not reproduced, a state in which the power is on and the user is not using the appliance but is ready to use the appliance soon after the user decides to do so. Meanwhile, the state in which an appliance is not used, for example, indicates a state in which the power is off for the appliance or a state (for example, a standby state) in which although the power is on for the appliance, a less than predetermined amount of electric power is consumed within a predetermined time (so called standby power consumption).

The prediction interval prediction unit 106 predicts a prediction interval by using a utilization interval for each of the appliances and variable values that are stored in the utilization interval data storage unit 105. It should be noted that the prediction interval prediction unit 106 predicts, varying the variable values to be used, a prediction interval corresponding to each of the variable values. Then, the prediction interval prediction unit 106 stores, in the prediction result storage unit 107, a plurality of prediction results corresponding to a plurality of variable values.

In other words, the prediction interval prediction unit 106 predicts, according to a predetermined prediction scheme, a prediction interval corresponding to each of the variable values for each of the appliances 1006.

It should be noted that the predetermined prediction scheme is a prediction scheme for predicting a prediction interval by using a specified utilization interval. Moreover, the predetermined prediction scheme is also a scheme of making it possible to vary a length of a prediction interval by varying an input variable value.

In the present embodiment, the predetermined prediction scheme is a scheme of predicting, as a prediction interval, a time interval which includes a start time of the utilization interval for the target appliance and has a length corresponding to a scale of variable value. In other words, the prediction scheme according to the present embodiment is a prediction scheme using periodicity, in which an appliance is used at around the same time as the time when the appliance was used in the past.

The user load prediction unit 108 and the power saving effect prediction unit 109 predict, for each of the prediction results corresponding to each of the variable values stored in the prediction result storage unit 107, user load and power saving effect and then stores the result in the prediction result storage unit 107.

Specifically, the user load prediction unit 108 calculates, for each of the variable values, a user load value which indicates a size of user load in the case where electric power is supplied to each of the appliances based on the predicted interval, by using the prediction interval and the utilization interval.

Moreover, the power saving effect prediction unit 109 calculates, for each of the variable values, a power saving effect value which indicates a size of power saving effect in the case where electric power is supplied to each of the appliances based on the predicted interval, by using the prediction interval and the utilization interval.

The display control unit 111 determines a method of presenting a user with a prediction result of user load and power saving effect and then displays, in the display unit 1007, information about setting a power saving method. In other words, the display control unit 111 displays, in the display unit 1007, by designating, as electric power information, a combination of the user load and the power saving effect value both corresponding to each of the variable values.

The user puts, based on a content displayed in the display unit 1007, an input into an input unit 1008 so as to select any one of the prediction results. For example, the user changes or approves the setting of a power saving method in response to the display result. In other words, the input unit 1008, according to the electric power information displayed in the display unit 1007, receives an input of a combination of the user load value and the power saving effect value both selected by the user.

The power source control unit 110 obtains, in accordance with the user input received by the input unit 1008, prediction results by the prediction interval prediction unit 106 from the prediction result storage unit 107. Then, the power source control unit 110 controls electric power to be supplied to the appliances 1006 by controlling the power source control execution unit 1005 with use of the obtained prediction results.

In other words, the power source control unit 110 controls the power source control execution unit 1005 such that electric power is supplied to each of the appliances in a prediction interval indicated by the prediction result. To put it another way, the power source control unit 110 controls the power source control execution unit 1005 such that power supply to each of the appliances 1006 is cut off in a time interval other than a prediction interval indicated by the prediction result and in a time interval other than the utilization interval in which the appliance is actually used.

Next, each of the operations of the above configured power source control device 101 will be described.

Figure 4:
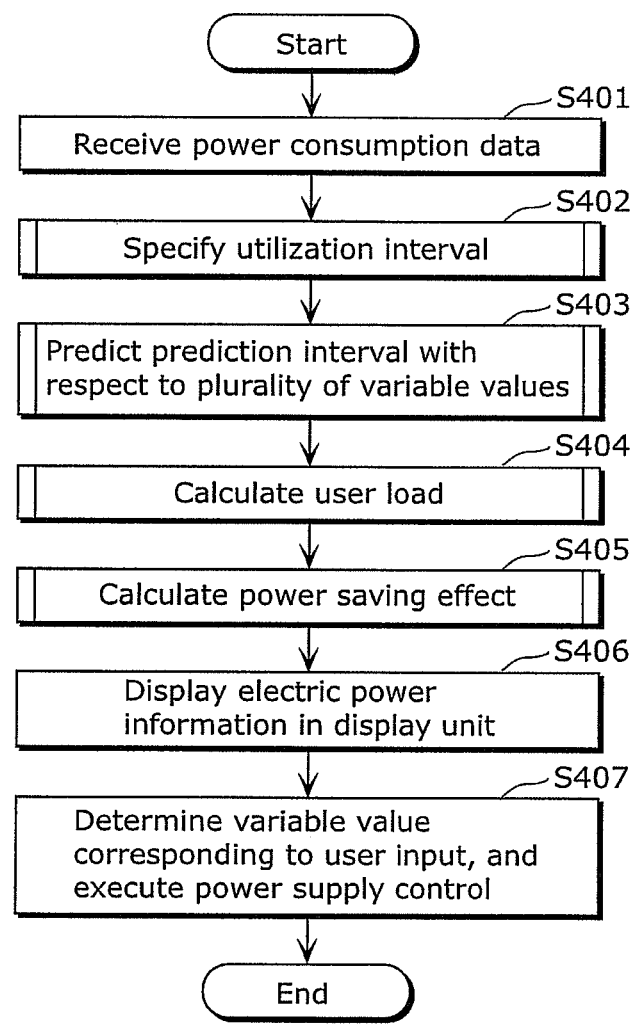
FIG. 4 is a flowchart showing a flow of overall processing implemented by the power source control device according to Embodiment 1.

FIG. 4 is a flowchart showing a flow of the overall processing performed by the power source control device according to Embodiment 1.

Hereafter, the processing of the power source control device 101 will be described with reference mainly to the flowchart of FIG. 4. Moreover, the processing will be described by including an example of a recording appliance as an example of a specific appliance 1006.

First, the power consumption measurement device 1001, installed on each of the appliances 1006, measures power consumption for each of the appliances 1006 in a predetermined time interval. Then, power consumption data in association with measurement time and date and power consumption are transmitted to the power source control device 101 via the power consumption transmission unit 1004. In other words, the power consumption receiving unit 102 receives, from the power consumption measurement device 1001, power consumption data which indicate a temporal change in power consumption of each of the appliances 1006 (S401).

FIG. 5 is a diagram showing an example of power consumption data measured by the power consumption measurement device. Specifically, FIG. 5 is a diagram showing an example of power consumption data measured in a 10-second interval by the power consumption measurement device 1001 installed on a recording appliance having appliance identification (ID) "2".

An item 501 shows an appliance ID of the target appliance of the measured power consumption data. Items 502, 503, and 504 indicate a date, a day of the week, and a time when power consumption is measured, respectively. An item 505 shows measurement results for power consumption of an appliance indicated by the items 502, 503, and 504 at the measurement time and the measurement date.

The power consumption receiving unit 102 stores, in the power consumption history storage unit 103, the received power consumption data for each of the appliances 1006.

FIG. 6 is a diagram showing an example of power consumption data stored in a power consumption history storage unit 103 according to Embodiment 1. The power consumption data stored in the power consumption history storage unit 103 include measurement times of power consumption and values of power consumption for each of the appliances.

In other words, items 601, 602, and 603 indicate a date, a day of the week, and a time when power consumption is measured for each of the appliances 1006, respectively. An item 604 and other subsequent items show power consumption for each of the appliances 1006. It should be noted that each of the appliances 1006 is specified by an appliance ID.

The items 604 and 605 show respective power consumptions of the appliances 1006 having appliance IDs "1" and "2" that are measured at measurement times indicated by the items 601, 602, and 603. For example, it is shown that in FIG. 6, at a measurement time "19:00:10" (10 seconds past 19 o'clock), power consumption of a laundry machine having the application ID "1" is "125 W". Moreover, for example, it is shown that in FIG. 6, at a measurement time "19:00:10" (10 seconds past 19 o'clock), power consumption of a recording appliance having the application ID 2 is "0 W".

It should be noted that in FIG. 6, an item of a measurement time is determined to be only the item 601 by assuming that power consumptions of all the appliances 1006 are measured at the same time. However, in the case where power consumptions for a plurality of appliances 1006 are measured at mutually different times, power consumption data may be stored in the power consumption history storage unit 103, for each of the appliances 1006, in a form corresponding to power consumption and a measurement time.

Return to the description of FIG. 4.

Next, the utilization interval specification unit 104 specifies, from power consumption data of the appliance 1006 in a certain period that are stored in the power consumption history storage unit 103, an interval utilized by the appliance 1006 as the utilization interval (S402).

Figure 7A:
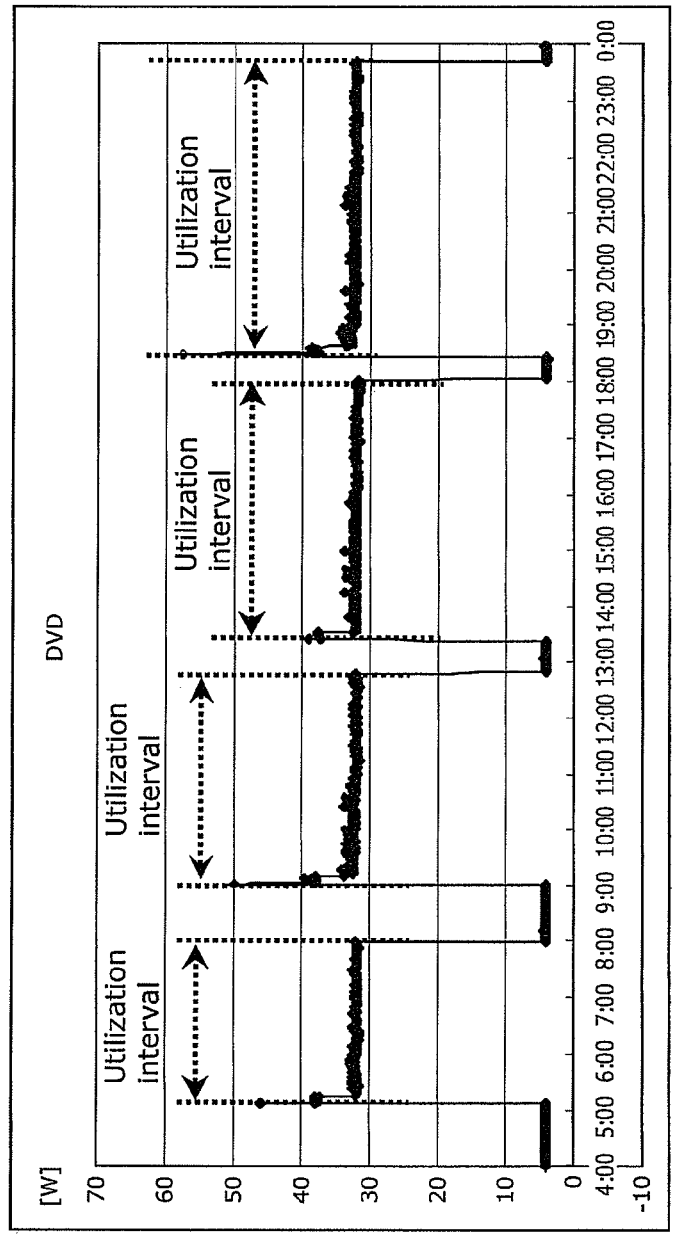
FIG. 7A is a graph showing a transition of power consumption indicated by the power consumption data.
Figure 7B:
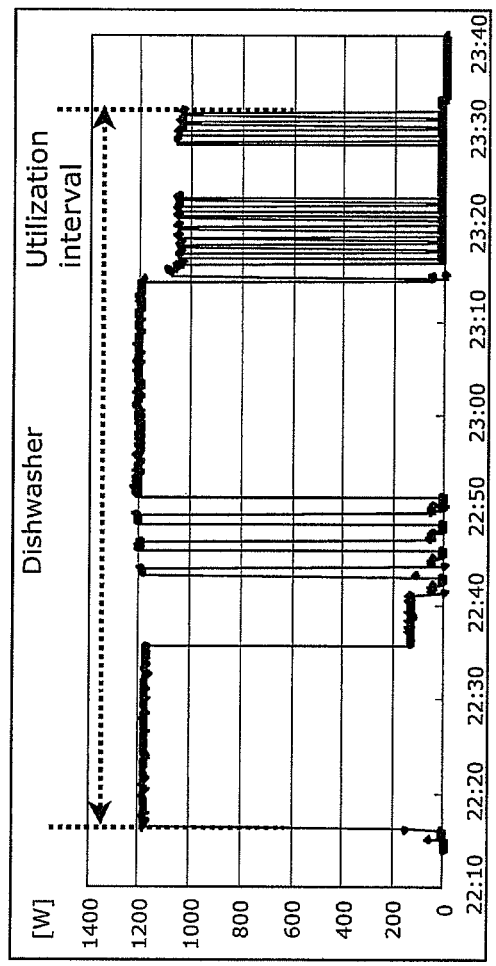
FIG. 7B is a graph showing a transition of power consumption indicated by the power consumption data.
Figure 7C:
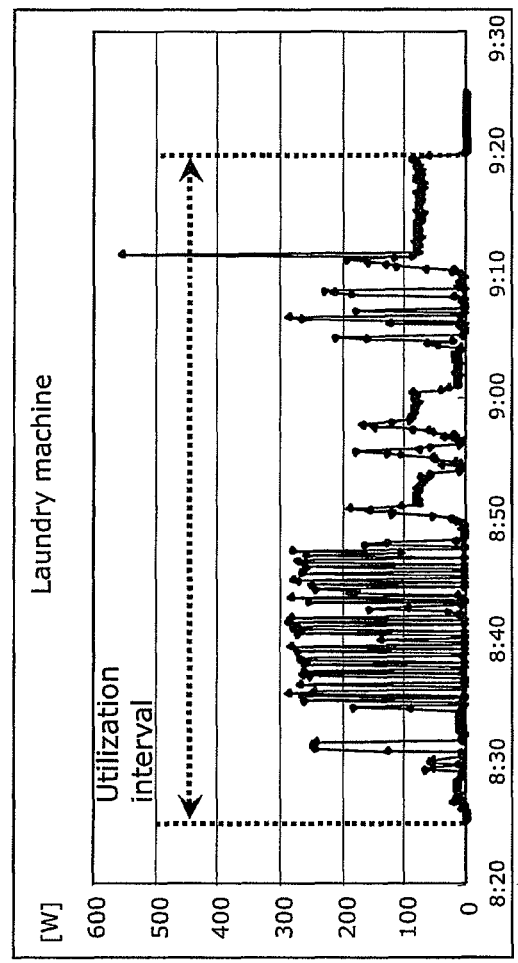
FIG. 7C is a graph showing a transition of power consumption indicated by the power consumption data.

FIGS. 7A to 7C are graphs each showing a transition of power consumption indicated by power consumption data. Moreover, in the graphs, an interval in which an appliance is used (hereafter described as a utilization interval) is shown.

In such a recording appliance such as a DVD recorder shown in FIG. 7A, in utilization intervals in which the main functions of the appliance (DVD reproduction, or recording and viewing a program) are performed, there is little variation in power consumption. In such an appliance, a state in which the appliance is utilized can be determined by whether or not power consumption is greater than a predetermined value at a certain time (measurement timing).

Meanwhile, as shown in FIG. 7B or FIG. 7C, in such an appliance as a dish washing and drying machine (hereafter described as dishwasher) or a laundry machine, there is a large variation in power consumption in a utilization interval from performing a function of a user purpose (for example, washing function) to ending the function. In such an appliance, it is difficult to determine whether or not an interval is utilized by only determining whether or not power consumption is greater than a predetermined value. Therefore, so as to specify a utilization interval also with respect to the power consumption data of such an appliance, the utilization interval specification unit 104 specifies a utilization interval as shown in FIG. 8.

Figure 8:
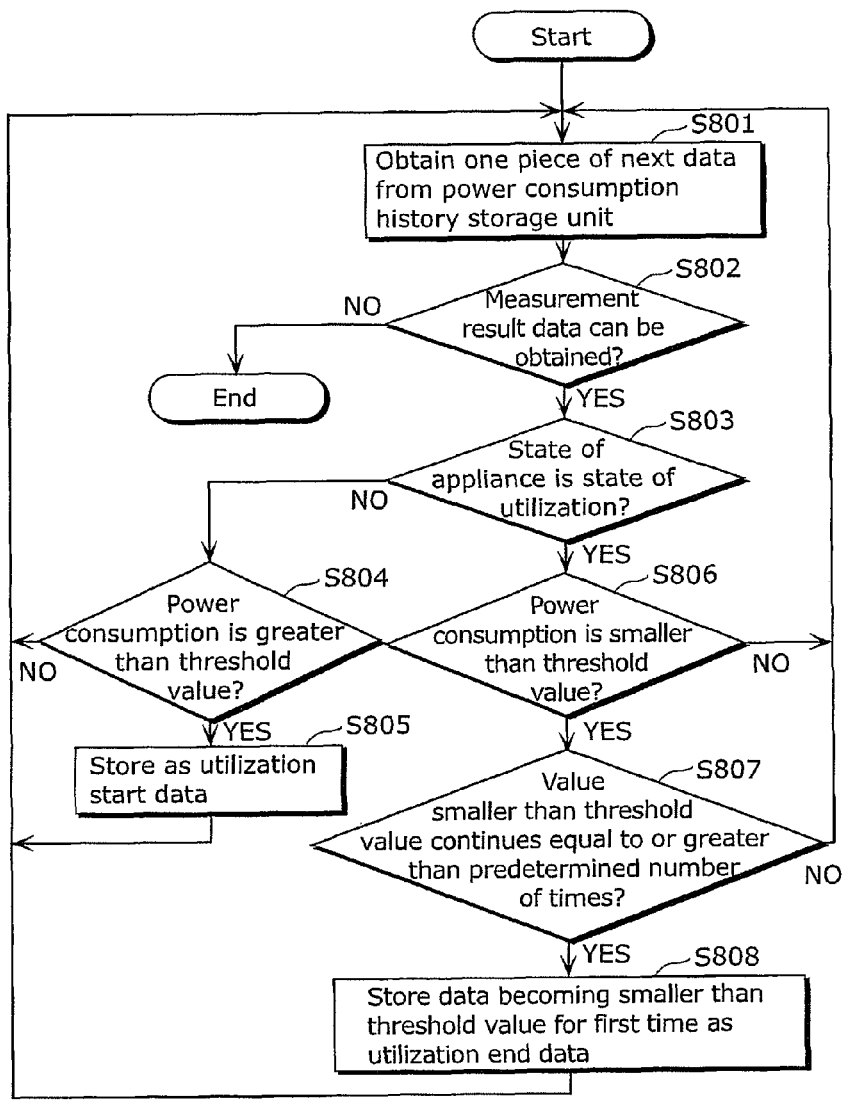
FIG. 8 is a flowchart showing a flow of utilization interval specification processing according to Embodiment 1.

FIG. 8 is a flowchart showing a flow of the utilization interval specification processing according to Embodiment 1. In other words, FIG. 8 is a flowchart showing details of the processing of Step S402 shown in FIG. 4.

First, the utilization interval specification unit 104 obtains, from power consumption data of the appliances 1006 stored in the power consumption history storage unit 103, measurement result data at a certain time (S801). For example, the utilization interval specification unit 104 obtains, from power consumption data shown in FIG. 6, power consumption "0" which is measured at "19:00:30 on Sep. 2 in 2009" as measurement result data of the appliance ID "2" at a certain time. Here, the utilization interval specification unit 104 stores the information that until which data are obtained and then a utilization interval is determined, and obtains data which come on and after data already time sequentially obtained when the unit obtains measurement result data. In other words, the utilization interval specification unit 104 obtains the measurement result data for each of the appliances 1006 in a time-series order.

Here, in the case where the measurement result data cannot be obtained (NO in S802), the utilization interval specification unit 104 ends specification processing of a utilization interval. In other words, all of the measurement result data included in a predetermined time interval are already obtained, the utilization interval specification unit 104 ends specification processing of a utilization interval.

Meanwhile, in the case where the measurement result data can be obtained (YES in S802), the utilization interval specification unit 104 determines whether or not a state of each of the appliances 1006 is in a state of being utilized, based on held information which is held at a time when the measurement result data are obtained (S803). Here, the held information is information which indicates whether or not a state in which the appliance 1006 performs specification processing of a utilization interval is in a state of being utilized. In other words, the utilization interval specification unit 104 determines whether or not the processing target appliance is used at a time corresponding to measurement result data which are processed by one piece of data before the measurement result data of the processing target.

Here, in the case where it is determined that a state of the appliance is not in a state of being utilized (NO in S803), the utilization interval specification unit 104 determines whether or not a power consumption value indicated by the obtained measurement result data is greater than a threshold value (S804). In the case where the power consumption value is greater than the threshold value (YES in S804), the utilization interval specification unit 104 stores, in the utilization interval data storage unit 105, the measurement result data for the processing target as utilization start data (S805). In other words, the utilization interval specification unit 104 determines, as a start time of a utilization interval, a time when measurement result data of the processing target are measured. Meanwhile, in the case where power consumption indicated by the measurement result data is equal to or less than the threshold value (No in S804), the utilization interval specification unit 104 returns to Step S801 and then obtains the next measurement result data. For example, the utilization interval specification unit 104 obtains, from the power consumption data shown in FIG. 6, power consumption "52" which is measured at "19:00:40 on Sep. 2 in 2009" as the next measurement result data of the above mentioned recording appliance having the appliance ID "2".

Meanwhile, in the case where it is determined that a state in which the appliance is in a state of being utilized, the utilization interval specification unit 104 determines whether or not power consumption indicated by the measurement result data of the processing target is smaller than the threshold value (S806).

Here, in the case where it is determined that power consumption is equal to or greater than the threshold value (NO in S806), the utilization interval specification unit 104 holds information that the utilization state is continued, and then returns to Step S801. In other words, the utilization interval specification unit 104 does not determine, as an end time of a utilization interval, a time when measurement result data of the processing target are measured.

Meanwhile, in the case where it is determined that power consumption is smaller than the threshold value (YES in S806), the utilization interval specification unit 104 determines whether or not a state in which power consumption is smaller than the threshold value successively occurs equal to or greater than a predetermined number of times (for example, equal to or greater than 10 times) (S807).

Here, in the case where a state in which power consumption is smaller than the threshold value does not successively occurs equal to or greater than the predetermined number of times (NO in S807), the utilization interval specification unit 104 returns to Step S801 and then obtains the next measurement result data.

Meanwhile, in the case where a state in which power consumption is smaller than the threshold value (YES in S807) successively occurs equal to or more than the predetermined number of times, measurement result data at a time when a value smaller than the threshold value starts continuing are stored as utilization end data in the utilization interval data storage unit 105 (S808). Furthermore, the utilization interval specification unit 104 updates the held information to show that the appliance is not in a state of being utilized. Moreover, the utilization interval specification unit 104 further stores, in the utilization interval data storage unit 105, as utilization interval data, various pieces of information about the measurement result data from the utilization start data to the utilization end data, then returns to Step S801.

In this way, the utilization interval specification unit 104 specifies, as a utilization interval, a time interval from a time when the utilization start data are measured to a time when the utilization end data are measured.

FIG. 9 is a diagram showing an example of utilization interval data stored in the utilization interval data storage unit according to Embodiment 1. As shown in FIG. 9, utilization interval data are stored in the utilization interval data storage unit 105 by the utilization interval specification unit 104.

An item 901 shows that utilization interval data indicated by items 902 to 910 are utilization interval data of which appliance ID. For example, in FIG. 9, utilization interval data of the appliance 1006 having the appliance ID "1" are shown.

The item 902 is an interval number for identifying a utilization interval and the following items are values of the utilization interval with respect to the interval number. The items 903 and 904 show a utilization date and a utilization day of the week, respectively. The items 905 and 906 show a utilization start time and a utilization end time, respectively. The item 907 shows a length of a utilization interval (utilization period). The item 908 shows an amount of electric power consumed in the utilization interval (amount of power consumption).

The item 909 shows the number of times when electric power is low in the utilization interval (number of times of low electric power). The number of times of low electric power is the number showing how many times an amount of power consumption falls below a predetermined threshold value. For example, the number of times of low electric power is "0" in a utilization interval for a DVD recorder shown in FIG. 7A. Meanwhile, the number of times of low electric power increases for the dishwasher in FIG. 7B or the laundry machine in FIG. 7C.

The item 910 shows a start and end kind representing information about whether the start and end of the utilization interval is manual or automatic. As a method of determining whether or not the start and end kind of the utilization interval stored in the item 910 is automatic, for example, if there is the start and end at the same time in the past, it may be determined that the start and end kind of the utilization interval is automatic. Moreover, if a variation in the size of the utilization interval is within the threshold value, it may be determined to be an automatic end.

Return to the description of FIG. 4.

The prediction interval prediction unit 106, by using utilization interval data for a day or multiple days stored in the utilization interval data storage unit 105, predicts a prediction interval of each of the appliances 1006 with respect to a plurality of variable values (S403). Then, the prediction interval prediction unit 106 stores the prediction results in the prediction result storage unit 107.

Hereafter, prediction processing in the prediction interval prediction unit 106 will be described with reference to FIGS. 10 and 11. It should be noted that in FIGS. 10 and 11, the prediction processing for one of the appliances 1006 will be described, but the prediction processing is performed for all target appliances.

Figure 10:
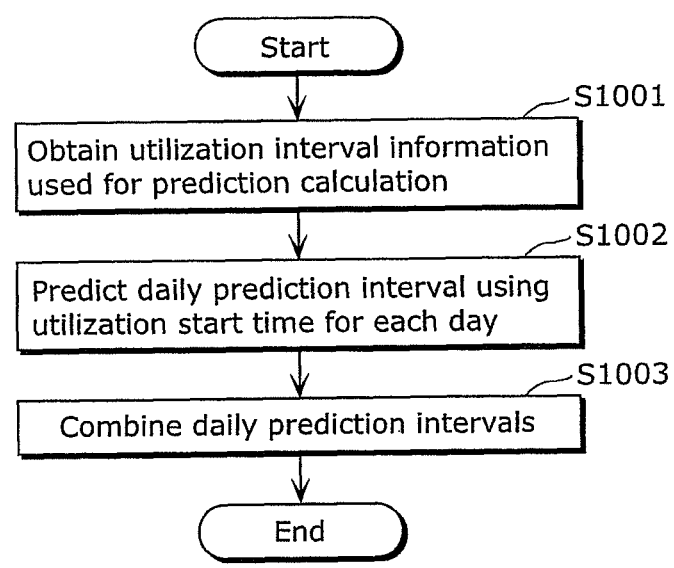
FIG. 10 is a flowchart showing a flow of prediction interval prediction processing according to Embodiment 1.

FIG. 10 is a flowchart showing a flow of utilization interval prediction processing according to Embodiment 1. In other words, FIG. 10 is a flowchart showing details of the processing of Step S403 shown in FIG. 4. Moreover, FIG. 11 is a flowchart for explaining the utilization interval prediction processing according to Embodiment 1. It should be noted that in FIGS. 10 and 11, a case where a predetermined cycle is one day will be described.

First, the prediction interval prediction unit 106 obtains, as input data for use in prediction calculation, utilization interval data stored in the utilization interval data storage unit 105 (S1001). For example, the prediction interval prediction unit 106 obtains each of the daily utilization interval data for three days stored in the utilization interval data storage unit 105.

Then, the prediction interval prediction unit 106 predicts, from the obtained utilization interval data, a prediction interval for each of the days (hereafter only described as daily prediction interval) (S1002). Specifically, the prediction interval prediction unit 106, for example, as shown in FIG. 11, calculates the daily prediction interval by using a utilization start time and a duration $\Delta T1$ both included in the obtained utilization interval data. The duration $\Delta T1$ is equivalent to the first duration.

Figure 11:
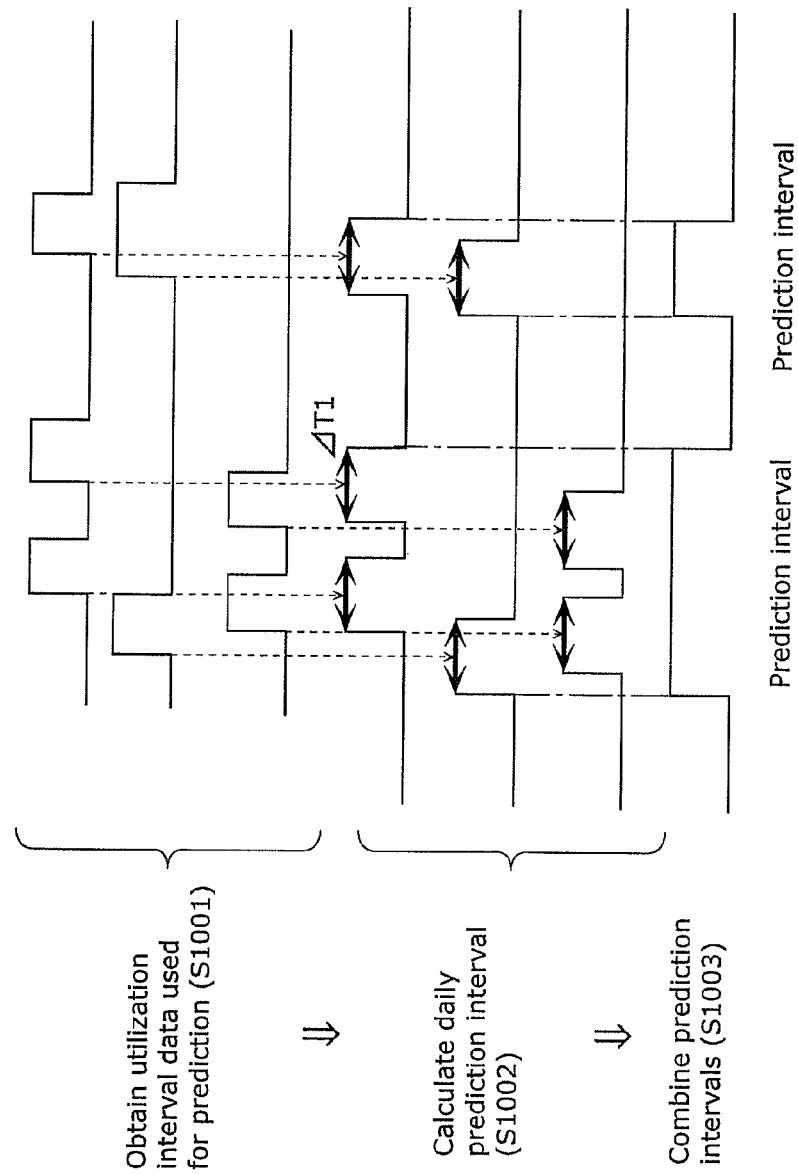
FIG. 11 is a diagram for explaining the prediction interval prediction processing according to Embodiment 1.

It should be noted that in FIG. 11, the prediction interval prediction unit 106 calculates, as a daily prediction interval, a time interval of the duration $\Delta T1$ in which a utilization start time of utilization interval data is the center, but it is not especially necessary to calculate the daily utilization interval in this way. For example, the prediction interval prediction unit 106 may calculate, as a daily prediction interval, a time interval of the duration $\Delta T1$ in which utilization start time becomes an end time. Moreover, for example, the prediction interval prediction unit 106 may calculate, as a daily prediction interval, a time interval of the duration $\Delta T1$ in which a utilization start time becomes a start time.

Next, the prediction interval prediction unit 106 generates a prediction interval (S1003) by combining temporally corresponding daily prediction intervals (calculating sum of sets). For example, the prediction interval prediction unit 106 overlaps daily prediction intervals as shown in FIG. 11, and then calculates the overlapped interval as a prediction interval using utilization interval data for three days. In other words, the prediction interval prediction unit 106 predicts a prediction interval by combining temporally corresponding prediction intervals among prediction intervals of periodic units predicted with respect to prediction data for each of the cycles.

The prediction interval prediction unit 106 stores the prediction results calculated in this way in the prediction result storage unit 107.

It should be noted that the prediction interval prediction unit 106 must not necessarily predict a prediction interval by combining prediction intervals of periodic units. For example, in the case where power consumption data for a day is used for predicting a prediction interval, the prediction interval prediction unit 106 may directly predict, as a prediction interval, a daily prediction interval. In other words, the prediction interval prediction unit 106 may predict, as a prediction interval, a time interval which includes a start time for a utilization interval for the target appliance.

FIG. 12 is a diagram showing an example of prediction interval information stored in the prediction result storage unit 107 according to Embodiment 1. An item 1201 indicates an appliance ID. An item 1202 indicates a number for identifying a prediction interval. Items 1203 to 1206 are information corresponding to the prediction interval identified by the item 1201. Specifically, the item 1203 indicates a date, the item 1204 indicates a day of the week, the item 1205 indicates a start time, and the item 1206 indicates an end time.

Here, as obvious from FIG. 11, if a duration $\Delta T1$ is extended, a length of daily prediction intervals and a length of a prediction interval calculated through combining daily prediction intervals are extended. An extension of the prediction interval represents that a time for supplying electric power to the appliance 1006 is extended. Therefore, a probability is high that utilization of the appliance 1006 is started while electric power is supplied to the appliance 1006. In other words, when the duration $\Delta T1$ is extended, the user load is decreased but the power saving effect is also decreased.

Here, the user load is a load to be used by a user who utilizes the appliance when a prediction result is not correct. For example, in the case where power supply is cut off when the user wants to utilize the appliance (prediction result is not correct), the user must manually cancel the cutoff of power supply to the appliance by operating a switch or the like installed in the power consumption measurement device 1001. Such an act of manual cancellation of the cutoff of power supply to the appliance leads to an increase in user load.

The prediction interval prediction unit 106 calculates a plurality of prediction results by varying the value of the duration $\Delta T1$ which is a variable value when a prediction interval is predicted by a periodic unit, and then stores the prediction results in the prediction result storage unit 107.

FIG. 13 is a diagram showing an example of a plurality of prediction results calculated by varying the value of the duration $\Delta T1$. In FIG. 13, the item 1207 is added which indicates the value of the duration $\Delta T1$ inputted in FIG. 12, and then each pieces of information about a prediction interval corresponding to the value of the duration $\Delta T1$ (hereafter only described as prediction interval data) is stored.

Return to the description of FIG. 4.

The user load prediction unit 108 calculates, by using plural pieces of prediction interval data stored in the prediction result storage unit 107, the user load value corresponding to the value of duration $\Delta T1$ and then stores the user load value in the prediction result storage unit 107 (S404).

Now, assuming that the plurality of prediction interval data obtained by varying every 10 minutes ranging from 10 minutes to 100 minutes are stored as the value of the duration $\Delta T1$ in the prediction result storage unit 107, details of the user load prediction processing will be described hereafter.

Figure 14:
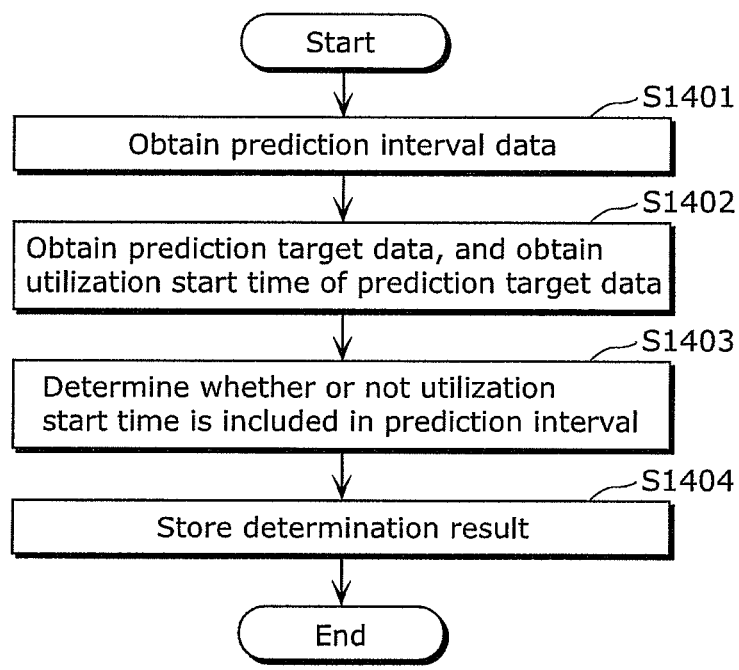
FIG. 14 is a flowchart showing a flow of user load prediction processing according to Embodiment 1.

FIG. 14 is a flowchart showing a flow of the user load prediction processing according to Embodiment 1. In other words, FIG. 14 is a flowchart showing a detailed flow of the processing of Step S404 as shown in FIG. 4.

The user load prediction unit 108 performs, for each of the values of the duration $\Delta T1$ and for each of the appliances, the processing shown in the flowchart of FIG. 14 with respect to prediction interval data.

The user load prediction unit 108 obtains, from the prediction result storage unit 107, prediction interval data in which the duration $\Delta T1$ is 10 minutes, for example (S1401).

Next, the user load prediction unit 108, from the utilization interval data storage unit 105, obtains, as prediction target data, utilization interval data for a day or multiple days from the utilization interval data of days which are not used in predicting the prediction interval. Furthermore, the user load prediction unit 108 obtains a start time of a utilization interval included in the obtained prediction target data (S1402).

The user load prediction unit 108 determines whether or not the start time of the obtained prediction target data is included in the prediction interval of the obtained prediction interval data (S1403).

The user load prediction unit 108, by using a determination result, calculates a user load value. Then, the user load prediction unit 108 stores, in the prediction result storage unit 107, user load information including the calculated user load value (S1404).

FIG. 15 is a diagram showing an example of the user load information stored in the prediction result storage unit 107 according to Embodiment 1.

An item 1501 shows an appliance ID in which user load is predicted. An item 1502 shows the value of the duration $\Delta T1$ which is a variable value.

An item 1503 and an item 1504 show the number of times of correct answers and the number of times of failures, respectively, that are determination results in the value of the duration $\Delta T1$ of the item 1502. In other words, the item 1503 shows the number of times when it is determined that the start time included in the prediction target data in Step S1403 is included in the prediction interval. Moreover, the item 1504 shows the number of times when it is determined that the start time included in the prediction target data in Step S1403 is not included in the prediction interval.

An item 1505 shows a user load value. It should be noted that in FIG. 15, the user load value is the same as the number of times of failures. In other words, the user load prediction unit 108 calculates, as the user load value, the number of times when it is determined that the start time is not included in the prediction interval.

It should be noted that the user load value must not necessarily be the same value as the number of times of failures. For example, the user load value may be a ratio of the number of times of failures to the number of times of predictions (sum of the number of times of correct answers and the number of times of failures). Moreover, in FIG. 15, the items 1503 to 1505 show values with respect to all utilization intervals included in the prediction target data, but may represent average value per day, for example.

In this way, the user load prediction unit 108 calculates the user load value so as to show that a load is greater when the start time of the utilization interval included in the prediction target data is not included in the prediction interval.

It should be noted that it is possible to reflect a difference in load for each of the appliances in the user load value calculated in this way. For example, the user load prediction unit 108 may calculate the user load by using information about the appliances (hereafter only described as appliance information) stored in the prediction result storage unit 107.

FIG. 16 is a diagram showing an example of the appliance information stored in the prediction result storage unit 107.

An item 1601 shows a name of an appliance and an item 1602 shows an appliance ID.

An item 1603 shows a start time of an appliance. The start time of the appliance is a time from the start of power supply to the appliance until the start of being able to utilize the function of the appliance. In other words, the start time of the appliance is a time from when the power supply to the appliance is started to when it is possible to start utilization of the appliance. A start time is generally short for such appliances as a laundry machine and a dishwasher. Meanwhile, a start time is generally long for such an appliance as a DVD recorder having a hard disk or a printer. For example, there is an appliance which takes about several dozen seconds from when the power supply to the appliance is started to when it is possible to start utilization of the function. Because when the user tries to utilize the appliance having a long start time and electric power is not supplied to the appliance, the user cannot immediately utilize the appliance and a large load is generated.

Therefore, it is desirable that the user load prediction unit 108 calculates the user load value such that when the start time is longer, the user load is greater. Specifically, it is desirable that the user load prediction unit 108, for example, multiplies a coefficient which is greater corresponding to a length of a start time by the user load value as shown in FIG. 15. With this, the user load prediction unit 108 can appropriately calculate the user load value corresponding to the load of the user utilizing the appliance in the case where power supply is cut off to the appliance which the user starts utilization.

An item 1604 shows whether or not a remote control is used when the utilization of the appliance is started. In the case where the remote control is used for the start of the utilization of the appliance, the user usually utilizes the appliance by being away from the appliance. But in the case where the power consumption measurement device 1001 is installed near the appliance, the user must go near to the appliance so as to manually cancel a cutoff of power supply when the prediction ends in failure. For example, in the case where the power consumption measurement device 1001 is installed on a television, the user must go near to the television when the prediction ends in failure. Then, the user must, after manually canceling the power supply cutoff, turn on the television with use of the remote control. In other words, the users load is great in the case where the user must manually cancel the power supply cutoff for the appliance in which utilization is started by remote operation with use of a remote control or the like.

Meanwhile, in the case where the utilization of the laundry machine is started, the user usually operates the laundry machine with use of a user interface embedded in the laundry machine. Therefore, even in the case where the user must cancel the power supply cutoff after the prediction ends in failure, the user load is relatively small.

Therefore, it is desirable that the user load prediction unit 108 calculates the user load value to show that a load for the appliance in which utilization can be started with remote operation is greater than a load for the appliance in which utilization cannot be started with remote operation. With this, the user load prediction unit 108 can appropriately calculate the user load value corresponding to the load of the user utilizing the appliance in the case where power supply is cut off to the appliance which the user starts utilization.

An item 1605 shows standby power consumption of the appliance. The standby power consumption of the appliance is used in power saving effect prediction processing to be described later.

It should be noted that values may be inputted in advance into the start time of the item 1603 and the standby power consumption of the item 1605. Alternately, the start time of the item 1603 and the standby power consumption of the item 1605 may be calculated from power consumption data by the utilization interval specification unit 104.

Moreover, in Step S1404, the user load prediction unit 108 may store, in the prediction result storage unit 107, information about items 1506 to 1508 of FIG. 15 as information about the prediction target data used in the calculation of the user load information. Here, the item 1506 shows an appliance ID which is used as prediction target data, the item 1507 shows the number of days of the prediction target data history, and the item 1508 shows the number of utilization intervals in the prediction target data.

In a prediction scheme performed in Step S403, a prediction interval is longer when the value of duration $\Delta T1$ is greater, with a result that the number of times of correct answers is increased while the number of times of failures is decreased. Therefore, the user load value shown in the item 1505 is also smaller when the duration $\Delta T1$ is greater.

Return to the description of FIG. 4.

The power saving effect prediction unit 109 calculates, by using plural pieces of prediction interval data stored in the prediction result storage unit 107, a power saving effect value corresponding to the value of the duration $\Delta T1$ and then stores the power saving effect value in the prediction result storage unit 107 (S405).

The power saving effect value is a value having a correlation with the amount of power consumption of the appliance 1006 which can be reduced by using power supply control using the prediction interval. The power saving effect prediction unit 109 performs, for each of the values of the duration $\Delta T1$ and for each of the appliances, the processing shown in the flowchart of FIG. 17.

Figure 17:
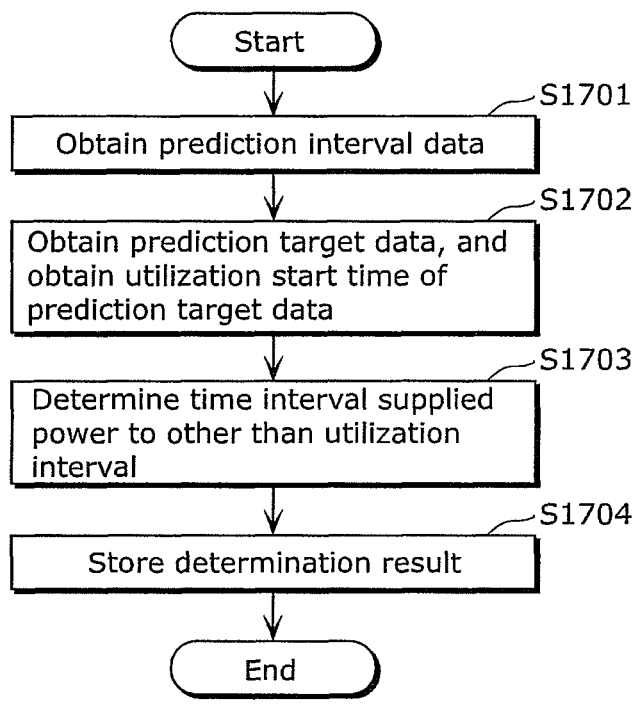
FIG. 17 is a flowchart showing a flow of power saving effect prediction processing according to Embodiment 1.

FIG. 17 is a flowchart showing a flow of the power saving effect prediction processing according to Embodiment 1. In other words, FIG. 17 is a flowchart showing a detailed flow of the processing of Step S405 as shown in FIG. 4.

First, the power saving effect prediction unit 109 obtains, from the prediction result storage unit 107, prediction interval data in which the duration $\Delta T1$ is 10 minutes, for example (S1701).

Next, the power saving effect prediction unit 109 obtains, from the utilization interval data storage unit 105, as prediction target data, utilization interval data for a day or multiple days from utilization interval data of days which are not utilized in predicting the prediction interval (S1702). Here, in Step S1701 and Step S1702, the power saving effect prediction unit 109 obtains the same data as prediction interval data and prediction target data both obtained in the processing (S1401 and S1402) of the user load prediction unit 108.

Moreover, the power saving effect prediction unit 109 obtains a start time of a utilization interval included in the obtained prediction target data.

Figure 18A:
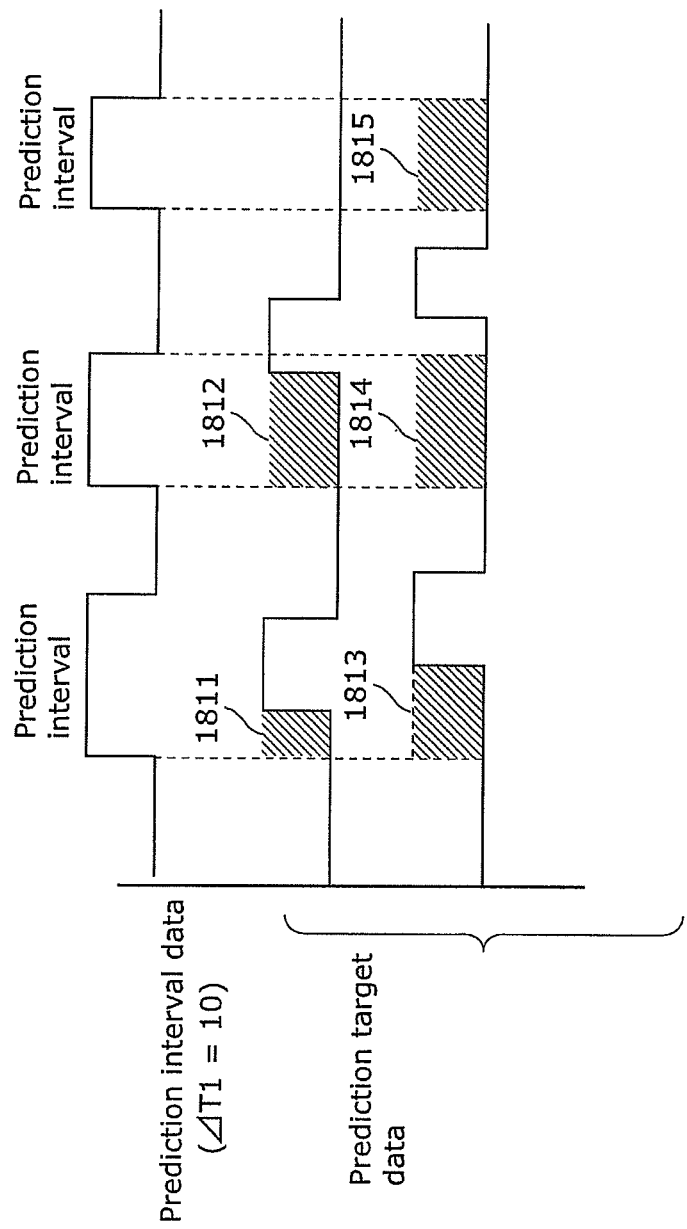
FIG. 18A is a diagram for explaining power saving effect.

The power saving effect prediction unit 109, in the case where electric power is supplied to the appliance based on the prediction interval, determines a time interval in which electric power is supplied to other than the utilization interval (hereafter described as waste power supply interval) (S1703). Specifically, the power saving effect prediction unit 109 determines the waste power supply interval with respect to the prediction target data for a day or multiple days. With reference to FIG. 18A, the processing of Step S1703 will be more specifically described.

FIG. 18A is a diagram for explaining the power saving effect. The power saving effect prediction unit 109 compares each of the prediction intervals included in the prediction interval data with the utilization start time obtained in Step S1702.

Then, in the case where the utilization start time is included in the prediction interval, as shown in time intervals 1811 to 1813 of FIG. 18A, the power saving effect prediction unit 109 determines, as a waste power supply interval, a time interval between the start time of the prediction interval and the utilization start time.

Moreover, in the case where the utilization start time is not included in the prediction interval, as shown in time intervals 1814 and 1815 of FIG. 18A, the power saving effect prediction unit 109 determines that the whole prediction interval is a waste power supply interval.

The power saving effect prediction unit 109 calculates the power saving effect value by using the determination results. Then, the power saving effect prediction unit 109 stores, in the prediction result storage unit 107, power saving effect information including the calculated power saving effect value (S1704).

FIG. 18B is a diagram showing an example of the power saving effect information stored in the prediction result storage unit 107 according to Embodiment 1. It should be noted that in FIG. 18B, the power saving effect value shows an average daily value.

An item 1801 shows an appliance ID in which power saving effect is predicted. An item 1802 shows the value of the duration $\Delta T1$ which is a variable value. An item 1803 is a daily average of the sum of waste power supply intervals in the case where the utilization start time is included in the prediction interval. An item 1804 is a daily average of the sum of waste power supply intervals in the case where the utilization start time is not included in the prediction interval.

An item 1805 is a power saving effect value in the case where power supply is controlled with use of the prediction interval data with respect to the appliance utilized in the utilization interval included in the prediction target data. In FIG. 18B, an example is shown where a duration in which power saving can be accomplished is stored as a power saving effect value. The duration in which power saving can be accomplished is a duration in which the sum of waste power supply intervals (the item 1803+the item 1804) is subtracted from the duration in other than the utilization interval in the prediction target data. In other words, the duration in which power saving can be accomplished is a duration which is not included in the prediction interval and the utilization interval. More specifically, a daily power saving effect value "15.5" in a duration $\Delta T1$. "10" is calculated by a daily hour "24"—the utilization interval "4.5" (the item 1807)—the sum of waste power supply intervals "4=(1.5+2.5)" (the item 1803+the item 1804). The power saving effect value calculated in this way is equivalent to the duration in which standby power consumption can be reduced in the case where power supply to the appliance is controlled based on the prediction interval.

In other words, the power saving effect prediction unit 109 calculates, for each of the variable values, a power saving effect value in the case where electric power is supplied to each of the appliances based on the predicted interval, by using the prediction interval data and the prediction target data. Specifically, the power saving effect prediction unit 109, for example, calculates, as a power saving effect value, a length of time which is not included in the prediction interval and the utilization interval.

It should be noted that the power saving effect value must not necessarily be a duration in which standby power consumption can be reduced as described above. For example, the power saving effect value may be an amount of standby power consumption obtained through multiplying the duration in which standby power consumption can be reduced by the standby power consumption corresponding to each of the appliances as shown in an item 1605 of FIG. 16. Furthermore, the power saving effect value may be, for example, an electric rate corresponding to the amount of standby power consumption. In this case, for example, the power saving effect prediction unit 109 may calculate an electric rate from the amount of standby power consumption by using a held relationship between an amount of electric power and an electric rate.

Moreover, the power saving effect prediction unit 109 may store, in the prediction result storage unit 107, information such as the items 1506 to 1508, an item 1806, and an item 1807 as information about the prediction target data used for the calculation of the power saving effect value. Here, the item 1806 represents the total sum of time of a utilization interval in the prediction target data. Moreover, the item 1807 represents the average daily total sum of time which is generated by the division of the total sum of a utilization interval by the number of prediction days of the item 1507.

In a prediction scheme performed in Step S403, a prediction interval is longer when the value of the duration $\Delta T1$ is greater, with a result that a waste power supply time period is extended. Therefore, the power saving effect value shown in the item 1805 is also smaller when the duration $\Delta T1$ is greater.

Figure 18C:
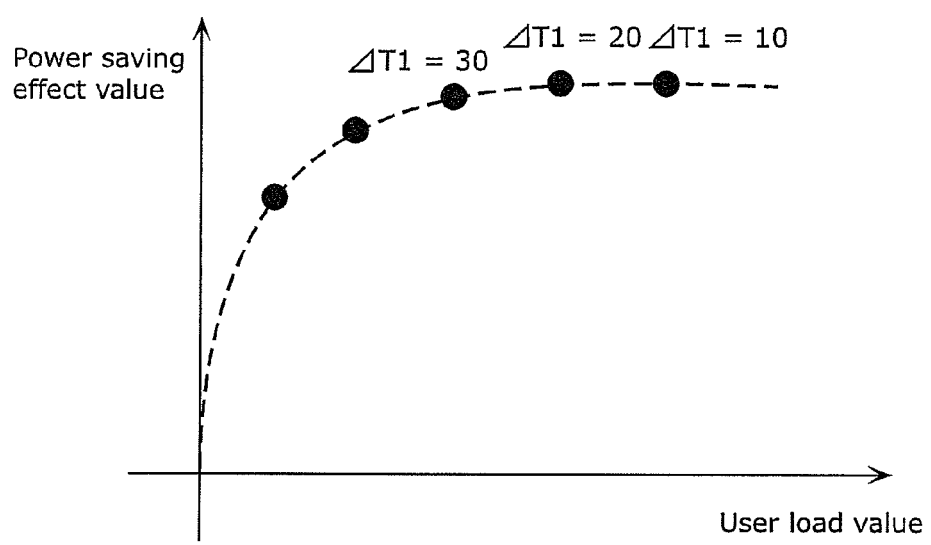
FIG. 18C is a schematic view showing a relationship between the power saving effect and the user load when the value of the duration $\Delta T1$ is varied.

FIG. 18C is a schematic view showing a relationship between the user load and the power saving effect when the value of the duration $\Delta T1$ is varied. As shown in FIG. 18C, when the value of the duration $\Delta T1$ is greater, the user load value is smaller but the power saving effect value is also smaller. Conversely, when the value of the duration $\Delta T1$ is smaller, the power saving effect value is greater but the user load value is also greater. In this way, the user load value and the power saving effect value have a positive correlation.

It should be noted that in the above description, the user load prediction unit 108 and the power saving effect prediction unit 109, for each of the values of the durations $\Delta T1$ which are variable values and for each of the appliances, calculates the user load value and the power saving effect value, and may further calculate the user load value and the power saving effect value for each of the time periods. In this case, as shown in FIGS. 19A and 19B, for each of the values of the durations $\Delta T1$ which are variable values, each of the appliances, and each of the time periods, the user load information including the user load value or the power saving effect including the power saving effect value is stored in the prediction result storage unit 107.

FIG. 19A is a diagram showing another example of the user load information stored in the prediction result storage unit 107 according to Embodiment 1. Moreover, FIG. 19B is a diagram showing another example of the power saving effect information stored in the prediction result storage unit 107 according to Embodiment 1. In FIGS. 19A and 19B, an item 1901 shows an appliance ID which is designated as prediction target data. An item 1902 shows the value of the duration $\Delta T1$ which is a variable value. An item 1903 shows an average daily user load value. An item 1904 shows an average daily user load value for each of the time periods. An item 1905 shows an average daily power saving effect. An item 1906 shows an average daily power saving effect value for each of the time periods.

Return to the description of FIG. 4.

The display control unit 111 displays, in the display unit 1007, electric power information about a setting condition of power supply control (hereafter only described as setting information) (S406). In the present embodiment, the display control unit 111 is characterized by displaying, in the display unit 1007, by designating, as electric power information, a combination of the user load value and the power saving effect value. This is because there is a difference for the user between the importance of the user load being small and the importance of the power saving effect being great. In other words, the display control unit 111 displays electric power information in the display unit 1007 so as to correspond to the difference of a desired user load from a desired power saving effect according to users.

Figure 20:
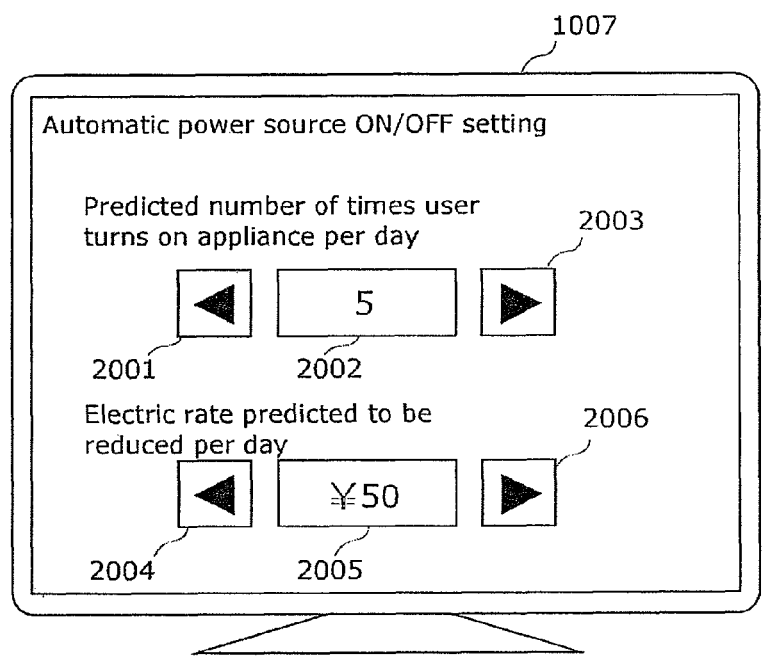
FIG. 20 is a diagram showing an example of setting information displayed in a display unit by a display control unit according to Embodiment 1.

FIG. 20 is an example where the setting information is displayed in the display unit 1007 by the display control unit 111 according to Embodiment 1. As shown in FIG. 20, the combination of the user load value and the power saving effect value with respect to a value of a certain duration $\Delta T1$ is displayed in the display unit 1007. In FIG. 20, the user load value shows the number of times that the user turns on a power source (the number of time that the user must cancel the power supply cutoff to the appliance). Moreover, the power saving effect value shows an electric rate which can be reduced through controlling power supply based on the prediction interval. It should be noted that the display control unit 111 displays a value for a day as the user load value and the power saving effect value, but may display a value for a week or a value for a month.

In FIG. 20, in the case where the user pushes a button 2001 via the input unit 1008, the user load value displayed in a display area 2002 becomes smaller. Moreover, in the case where the user pushes a button 2003 via the input unit 1008, the user load value displayed in the display area 2002 becomes greater.

Likewise, in the case where the user pushes a button 2004 via the input unit 1008, the power saving effect value displayed in a display area 2005 becomes smaller. Moreover, in the case where the user pushes a button 2006 via the input unit 1008, the power saving effect value displayed in the display area 2002 becomes greater.

Changes in the user load value and the power saving effect value are internally equivalent to a change in the value of the duration $\Delta T1$. Moreover, the user load value displayed in the display area 2002 and the power saving effect value displayed in the display area 2005 correspond to the value of the same duration $\Delta T1$. In other words, the combination of the user load value and the power saving effect value corresponding to the value of the duration $\Delta T1$ are displayed in the display areas 2002 and 2005.

Therefore, of the display area 2002 and the display area 2005, if there is a variation in a numerical value displayed in one of the display areas, a numerical value displayed in the other area is also varied. As shown in FIG. 18C, because there is a positive correlation between the user load value and the power saving effect value, for example, when the user load value displayed in the display area 2002 is greater, the power saving effect value displayed in the display area 2005 is also greater. In other words, if the number of times that the user cancels a power supply cutoff per day is increased, an amount of an electric rate which can be reduced is also greater.

It should be noted that in FIG. 20, in the case where the value of the duration $\Delta T1$ is varied, the power saving effect value is varied. But there is a case where the user load value is not varied. For example, even if the user varies a value displayed in the display area 2005 from "50 yen" to "100 yen" so as to vary the value of the duration ΔT1, there is a case where the value displayed in the display area 2002 is not varied from "5". It should be noted that for the user, the user load value is more desirable when the value is smaller, and the power saving effect value is more desirable when the value is greater.

Therefore, it is desirable that the display control unit 111 displays, among combinations of the user load value and the power saving effect value having the same user load value, the combination having the greatest power saving effect value in the display unit 1007. With this, the display control unit 111 can avoid displaying the combination of the user load value and the power saving effect value having a low possibility of being selected by the user. As a result, the user can easily select a desired combination of the user load value and the power saving effect value.

Specifically, for example in FIG. 20, the power saving effect value with respect to the user load value "5" ranges from "50 yen" to "100 yen", it is desirable that the display control unit 111 displays that the power saving effect value is "100 yen" when the user load value is varied to "5". Moreover, the power saving effect value with respect to the user load value "6" ranges from "101 yen" to "150 yen", it is desirable that the display control unit 111 displays that the power saving effect value is "150 yen" when the user load value is varied to 6".

Likewise, in the case where the power saving effect value shows "100 yen" and the button 2006 is pushed, even if there is the value of the duration ΔT1 corresponding to the power saving effect value "110 yen", it is desirable that "150 yen" is displayed as a combination of maximum saving values in the same user load value.

Figure 21:
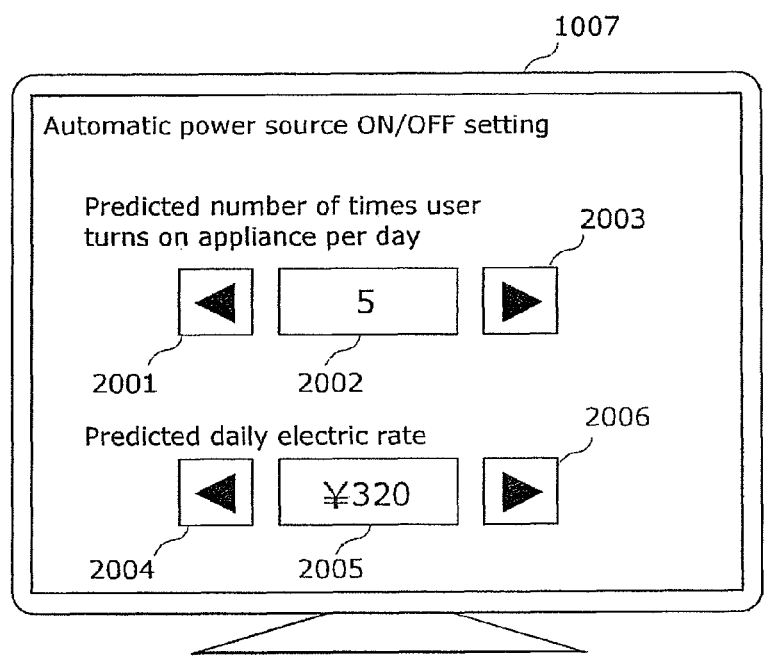
FIG. 21 is a diagram showing another example of setting information displayed in the display unit by the display control unit according to Embodiment 1.

It should be noted that the predicted electric rate, as shown in FIG. 20, which can be reduced for a day is a power saving effect with respect to the case where electric power supply is not controlled based on the prediction interval. Therefore, before the power supply control is introduced based on the prediction interval, an effective value is shown as a power saving effect value. However, after the power supply control is introduced based on the prediction interval, as long as the user load value displayed in the display area 2002 is not greater, the predicted electric rate which cane be reduced for a day is zero yen. Therefore, the display control unit 111 may calculate and display, as the power saving effect value displayed in the display area 2005, like FIG. 21, the predicted daily electric rate based on the power saving effect value. It should be noted that in this case, when the user load value displayed in the display area 2002 is greater, the power saving effect value displayed in the display area 2005 is smaller.

Figure 22:
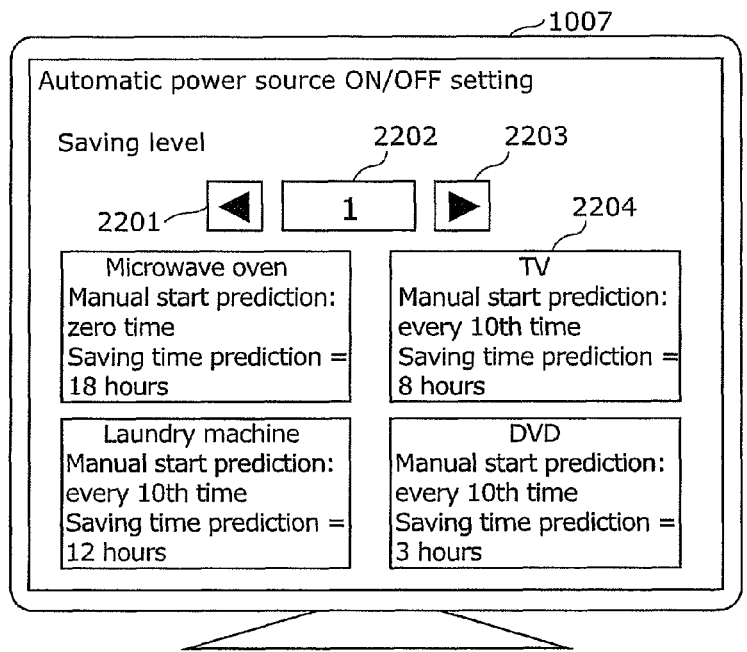
FIG. 22 is a diagram showing another example of setting information displayed in the display unit by the display control unit according to Embodiment 1.

FIG. 22 is a diagram showing another example of setting information displayed in the display unit 1007. Specifically, FIG. 22 is a diagram showing an example of a setting screen for each of the appliances.

In a display area 2202, a power-saving level value is displayed.

When the user pushes a button 2201 via the input unit 1008, the power-saving level value is smaller. Moreover, when the user pushes a button 2203 via the input unit 1008, the power-saving level value is greater.

The power-saving level value internally corresponds to the value of the duration ΔT1. In other words, the power-saving level value is associated with the value of the duration ΔT1 such that when the power-saving level value is greater, the value of the duration ΔT1 is smaller.

In a button 2204, the user load value and the power saving effect value for each of the appliances are displayed corresponding to the value of the duration ΔT1 corresponding to the power-saving level value displayed in the display area 2202. The user can, by pushing the button 2204, select a combination of the user load value and the power saving effect value for each of the appliances.

It should be noted that it is desirable that the display control unit 111 disposes the buttons 2204 corresponding to at least one of the user load value and the power saving effect value. Specifically, the display control unit 111, for example, may arrange and display the buttons 2204 in an order from the appliance having a small user load value. Moreover, for example, the display control unit 111 may arrange and display the buttons 2204 in an order from the appliance having a great power saving effect value. Moreover, for example, the display control unit 111 may arrange and display the buttons 2204 corresponding to a score using both the user load value and the power saving effect value. By displaying the buttons 2204 through the display control unit 111 in this way, the user finds it easier to understand the appliance having a great power saving effect based on the prediction interval and finds it easier to select the appliance when the effect is greater.

Figure 23:
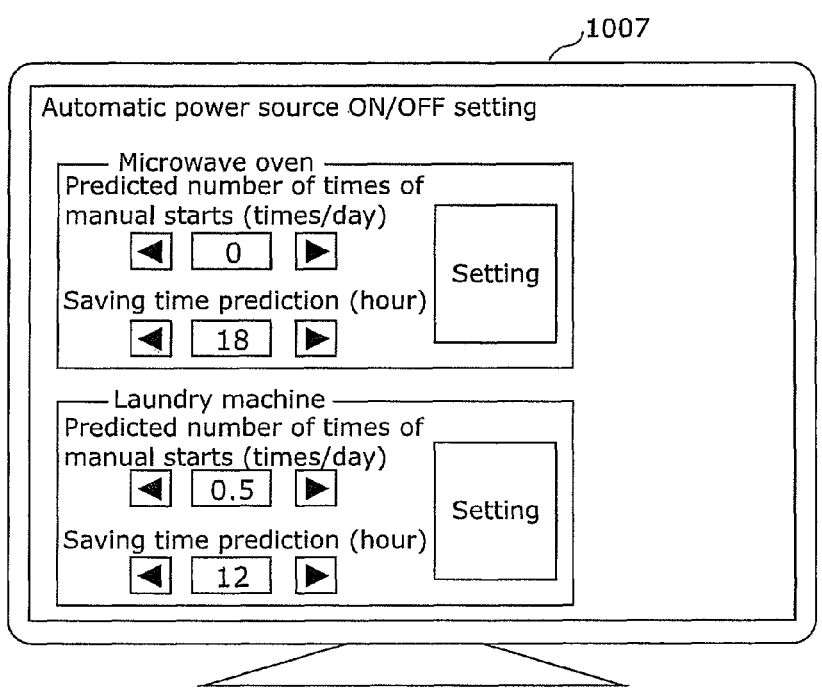
FIG. 23 is a diagram showing another example of setting information displayed in the display unit by the display control unit according to Embodiment 1.

Moreover, in FIG. 22, the display control unit 111 displays the power-saving level value such that the user can vary the value to the same duration ΔT1 with respect to the all the appliances, but may dispose buttons or the like such that the duration ΔT1 can be varied for each of the appliances as shown in FIG. 23. In that case, the display control unit 111, after allowing the user to vary the user load value and the power saving effect value as shown in FIG. 20 or in FIG. 21, may allow the user to select the combination of the user load value and the power saving effect value for each of the appliances. Moreover, the display control unit 111 may display the setting information for each of the appliance groups which are similar to each other in a relationship between the user load value and the power saving effect value.

Figure 24:
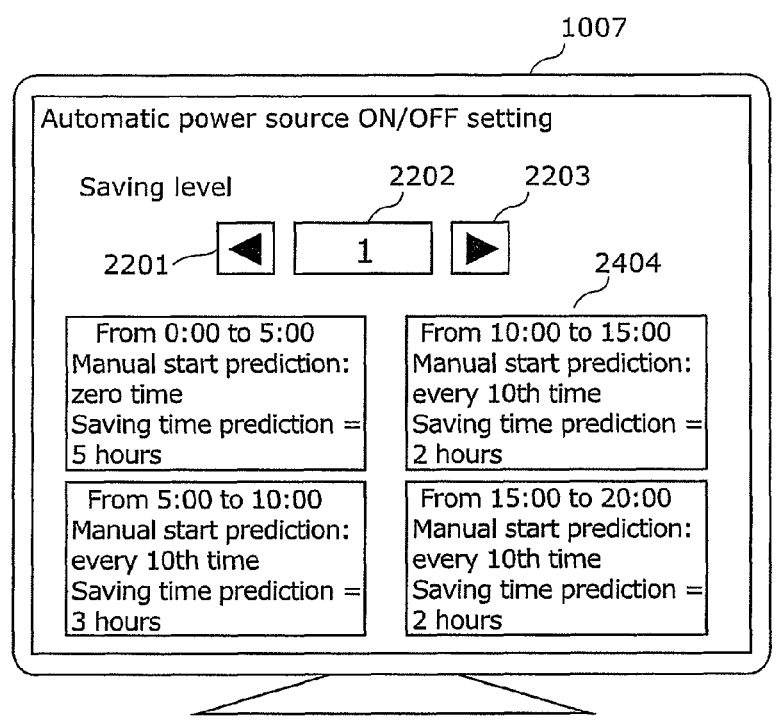
FIG. 24 is a table showing another example of setting information displayed in the display unit by the display control unit according to Embodiment 1.

FIG. 24 is a diagram showing another example of the setting information displayed in the display unit 1007. Specifically, FIG. 24 is a diagram showing an example of a setting screen for each of the time periods. It should be noted that in FIG. 24, the same constituent elements as those in FIG. 22 are given the same reference codes, and their descriptions will be omitted.

In a button 2404, the user load value and the power saving effect value for each of the time periods are displayed corresponding to the duration ΔT1 corresponding to the power-saving level value displayed in the display area 2202. The user can, by pushing the button 2404, select a combination of the user load value and the power saving effect value for each of the time periods.

It should be noted that it is desirable that the display control unit 111, like in FIG. 22, disposes the buttons 2404 corresponding to at least one of the user load value and the power saving effect value. Specifically, the display control unit 111, for example, may arrange and display the buttons 2404 in an order from the time period having a small user load value. Moreover, for example, the display control unit 111 may display the buttons 2404 in an order from the time period having a great power saving effect value. Moreover, for example, the display control unit 111 may arrange and display the buttons 2404 corresponding to a score using both the user load value and the power saving effect value. By displaying the buttons 2404 through the display control unit 111 in this way, the user finds it easier to understand the time period having a great power supply control effect based on the prediction interval and finds it easier to select the time period when the effect is greater.

Moreover, like FIG. 23, the display control unit 111 may dispose buttons and the like such that the duration ΔT1 can be variable for each of the time periods. Specifically, the display control unit 111, after allowing the user to vary the user load value and the power saving effect value in a setting screen for each of the time periods, may allow the user to select the combination of the user load value and the power saving effect value for each of the time periods.

Furthermore, the display control unit 111 may also automatically determine a method of determining a time period such as a length of time period according to the user load value and the power saving effect value. For example, the display control unit 111, in a certain saving level, generates, as another button, a time period having the user load value equal to or less than a predetermined value. However, because the establishment of excessive time periods results in a large number of buttons and a lower probability of making correct predictions, the display control unit 111, for example, may designate, as another button, a time period which satisfies a condition of setting the minimum duration as one hour. Moreover, the display control unit 111, by dividing a day's time with the minimum duration, in the same saving level, may display, as a button, a bundle of the time periods similar in a relationship between the user load value and the power saving effect value.

Figure 25:
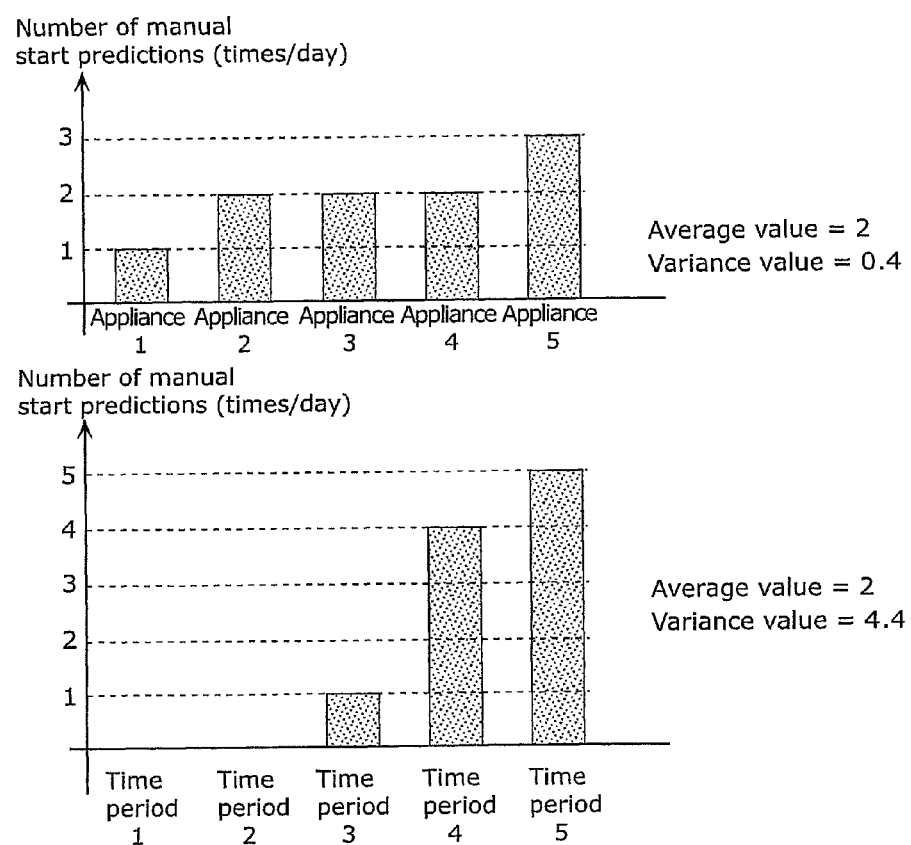
FIG. 25 is a diagram for explaining operations of the display control unit according to Embodiment 1.

It should be noted that, like in FIGS. 22 and 24, the user can be allowed to select whether to set the setting information for each of the appliances or whether to display the setting information for each of the time periods, but the display control unit 111 may automatically select one of the two. The distribution of the user load value or the power saving effect value for each of the appliances is different from the distribution of the user load value or the power saving effect value for each of the time periods. Therefore, the display control unit 111 may decide which piece of the setting information is displayed corresponding to a distribution of a score using the user load value and the power saving effect value (evaluation value). More specifically, in the case where the score is the user load value (the number of times of manual start predictions), assume that a result is like FIG. 25 for calculating the score for each of the appliance and the score for each of the time periods. In this case, because a variance value is greater in the score for each of the time periods than in the score for each of the appliances, the display control unit 111 displays the setting information for each of the time periods. This is based on a belief that when the variance value is greater, it is easier for a person to determine whether or not to control power supply with use of a prediction.

In other words, the display control unit 111 determines, based on a distribution of evaluation values for each of the appliances and each of the time periods determined by at least one of the user load value or the power saving effect value, whether to display electric power information for each of the appliances or for each of the time periods. Specifically, the display control unit 111 displays setting information for each of the appliances in the case where the distribution of the evaluation values for each of the appliances is greater than the distribution of the evaluation values for each of the time periods. Meanwhile, the display control unit 111 displays setting information for each of the appliances in the case where the distribution of the evaluation values for each of the appliances is smaller than the distribution of the evaluation values for each of the time periods. With this, the user can easily select a desired combination of the user load value and the power saving effect value.

Figure 26A:
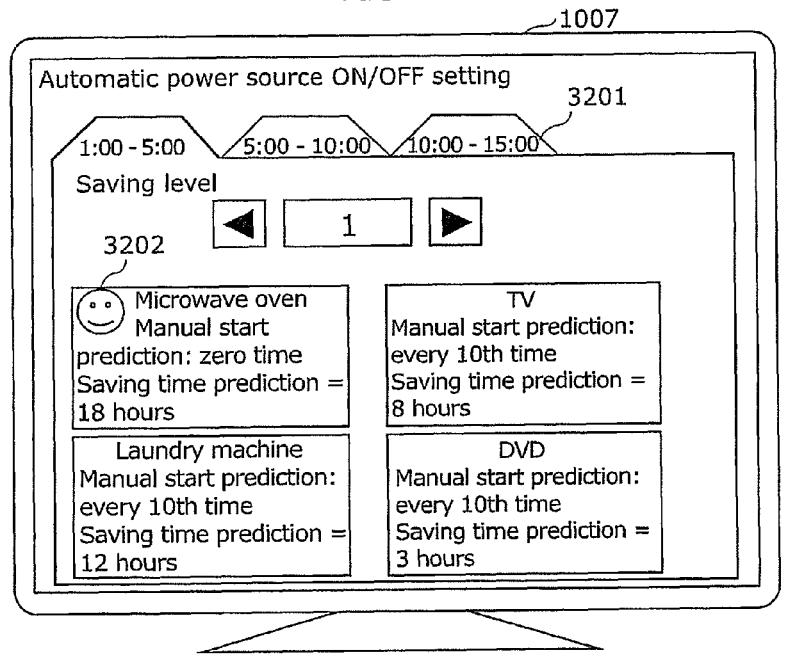
FIG. 26A is a diagram showing another example of setting information displayed in the display unit by the display control unit according to Embodiment 1.

Moreover, like in FIG. 26A, the display control unit 111 may simultaneously display the setting information for each of the appliances and the setting information for each of the time periods. The user can, by selecting a tab 3201, select a time period. The display control unit 111 displays, in the selected time period, the user load value and the power saving effect value for each of the appliances such that the two values can be selected. It should be noted that the display control unit 111 displays a mark 3202 in a button of an appliance in which the user load value is small and the power saving effect value is great. With the mark 3202, the user can easily select the appliance having a small user load value and a great power saving effect value.

Figure 26B:
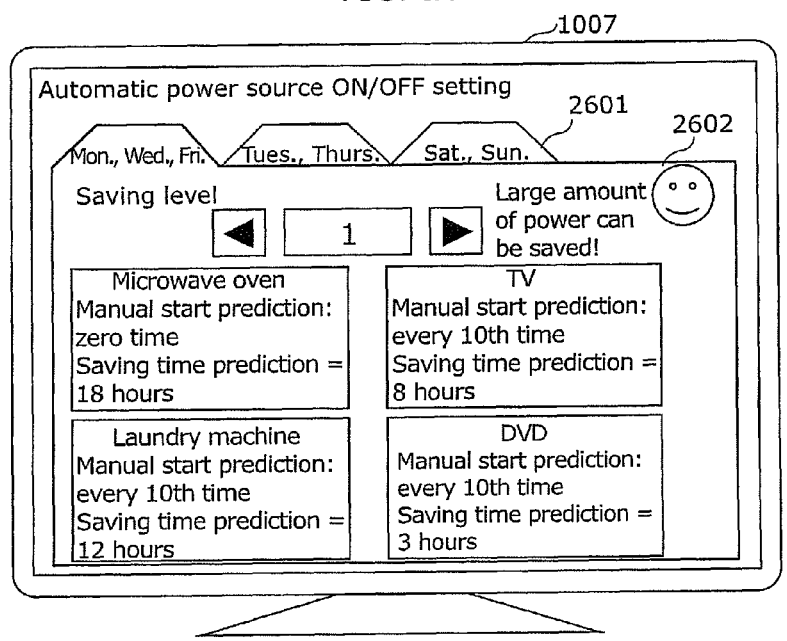
FIG. 26B is a diagram showing another example of setting information displayed in the display unit by the display control unit according to Embodiment 1.

Moreover, the display control unit 111 may, by using at one of the user load value and the power saving effect value in the value of the same duration ΔT1 for each of the appliances or each of the time periods, calculate a degree of similarity for each of the days of the week, group days of the week having a similar trend, and display the setting information like in FIG. 26B. The user can, by selecting a tab 2601, simultaneously display setting information of the grouped days of the week. Moreover, the display control unit 111 may display a mark 2602 showing evaluation information of the user load value or the power saving effect value for the grouped days of the week. By displaying the evaluation information in this way, the user can immediately understand a group of days of the week having small user load values or a group of great power saving effect values, and can easily select the value of the duration ΔT1. It should be noted that the display control unit 111 can determine whether or not there is the same trend by using a clustering scheme (for example, refer to R de Manabu Kurasuta Keiseki (Cluster Analysis: Tutorial with R): Ohmsha Limited, p. 62 "Kaisouteki Shuhou (Hierarchical Approach)").

Return to the description of FIG. 4.

According to the setting information displayed in the display unit 1007, the user inputs a desired condition via the input unit 1008. In other words, the power source control unit 110 determines the value of the duration ΔT1 corresponding to the combination of the user load value and the power saving effect value which are selected by the user according to the displayed setting information. Then, the power source control unit 110, based on the prediction period predicted with use of the determined value of the duration ΔT1, supplies electric power to each of the appliances (S407).

Specifically, the power source control unit 110, for example, obtains a combination of the user load value displayed in the display area 2002 and the power saving effect value displayed in the display area 2005 which are selected by the user in FIG. 20. Then, the power source control unit 110, with reference to the prediction result storage unit 107, determines the value of the duration ΔT1 corresponding to the obtained combination of the user load value and the power saving effect value (a condition desired by the user). Then, the power source control 110 obtains, from the prediction interval prediction unit 106, the prediction result corresponding to the value of the determined duration ΔT1.

Then, the power source control unit 110 controls the power source control execution unit 1005 based on the prediction result. Specifically, the power source control unit 110 controls the power source control execution unit 1005 such that electric power is supplied to an appliance in a prediction interval. In other words, the power source control unit 110 controls the power source control execution unit 1005 such that power supply is cut off to the appliance in a time interval other than the prediction interval and other than the utilization interval.

As described above, the power source control device 101 according to the present embodiment can, by using the past appliance utilization history, calculate a plurality of predictions results by varying the variable values and present the user with a plurality of relationships between user load and power saving effect. With this, the user can easily set a favorite control of power supply from the presented relationship between the user load and the power saving effect.

Embodiment 2

Next, Embodiment 2 will be described.

In the above Embodiment 1, the prediction interval prediction unit 106 uses the utilization history of the target appliance so as to predict a prediction interval which is a time interval which is predicted to have a high possibility that the appliance is utilized. More specifically, the prediction interval prediction unit 106 predicts, as a prediction interval, a time interval around the start time of the past utilization interval of the target appliance. The first prediction scheme is a prediction scheme using a property that an appliance is utilized in a predetermined cycle. The prediction scheme using such periodicity is effective for an appliance in which daily utilization intervals are concentrated on the same time to some extent. In other words, the prediction scheme using the periodicity is effective for the case where the start time of the utilization interval of the appliance has periodicity. However, the prediction scheme using periodicity is not effective for an appliance in which there is a great temporal variation in daily utilization intervals and a utilization frequency is high. This is because the prediction interval is longer and the power saving effect is decreased in the case where electric power is supplied to an appliance based on a prediction interval.

Figure 27:
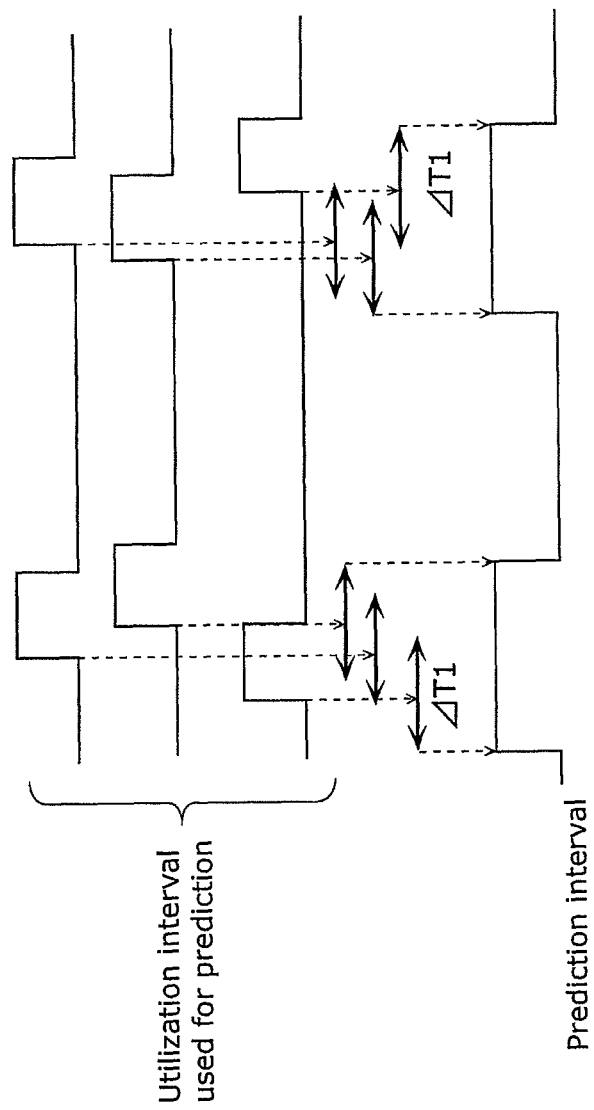
FIG. 27 is a diagram for explaining a problem with a prediction scheme using periodicity.
Figure 28:
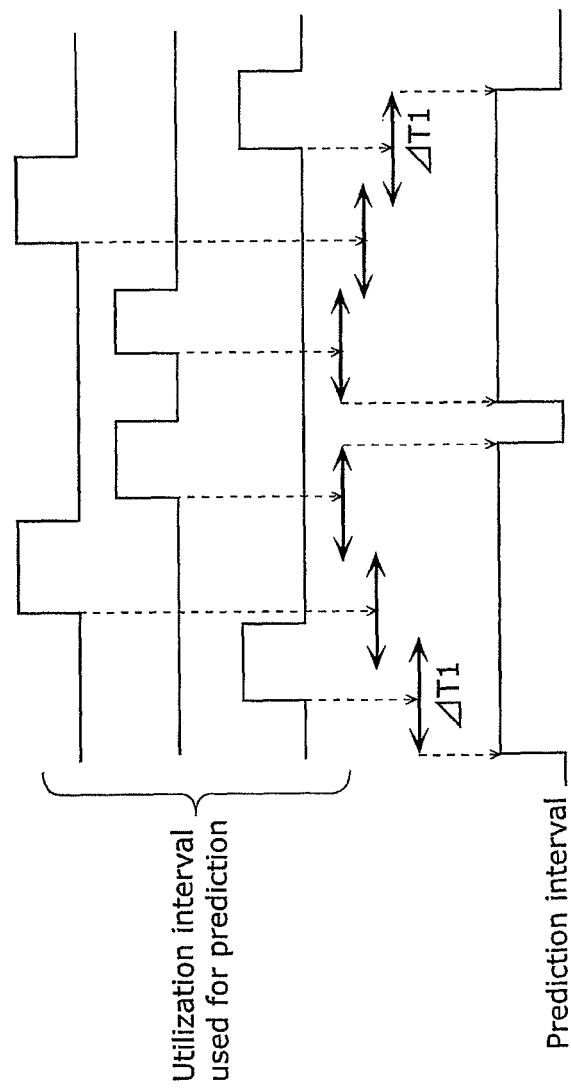
FIG. 28 is a diagram for explaining the problem with the prediction scheme using periodicity.

FIGS. 27 and 28 are diagrams for explaining a problem with the prediction scheme using periodicity. Specifically, FIG. 27 is a diagram showing an example of a prediction interval in the case where there is a small temporal variation in the utilization intervals. Moreover, FIG. 28 is a diagram showing an example of a prediction interval in the case where there is a great temporal variation in the utilization intervals.

From FIGS. 27 and 28, it can be seen that in the case where there is a variation in utilization intervals even if the number of times of utilizations is the same, the prediction intervals are longer and power saving effect is smaller. Moreover, in the case where a toaster which is used around 8 a.m. every morning is used at 9 a.m. because the user's wake time is delayed on the prediction target day, the prediction scheme cannot allow for a power supply at 9 a.m.

The prediction scheme using periodicity, as described above, has the problem that in the case where there is a great variation in utilization intervals of an appliance, prediction accuracy is deteriorated. Furthermore, the prediction scheme using periodicity has a problem that if there is no utilization interval of the target appliance in the past, it is impossible to predict, as a prediction interval, a time interval around the interval.

Therefore, in the present embodiment, based on the assumption that power consumption is measured for a plurality of appliances, a prediction scheme of resolving the problems with the scheme using periodicity (hereafter described as a prediction scheme using a start relationship between the appliances) will be described. The prediction scheme using the start relationship between the appliances is equivalent to a second prediction scheme which is a prediction scheme using a property that a second appliance is utilized in a period from the start or end of utilization of a first appliance to a passage of a predetermined time.

The prediction scheme using the start relationship between the appliances is a prediction scheme based on the assumption that when the user utilizes the appliances, an order of utilization is regular to some extent. Therefore, the prediction scheme using the start relationship between the appliances predicts a prediction interval of one of the appliances based on a utilization start time of the other appliance or a utilization end time of the other appliance. It should be noted that hereafter a start of utilization of an appliance also represents that the appliance starts. It should be noted that the start relationship represents a temporal dependence relationship between utilization intervals of the appliances.

For example, there is a trend in which a toaster is used after a microwave oven is used, electric power is supplied to the toaster at a timing when power supply is started for the microwave oven. Here, an appliance which is considered to be a source of starting another appliance (in the above example, the microwave oven) is described as a former appliance or a first appliance, and an appliance which is believed to be start after the start of the former appliance is described as a latter appliance or a second appliance (in the above example, the toaster).

The use of the scheme makes it possible to predict utilization time of an appliance regardless of the usual utilization time, thus resolving the above-mentioned problems.

It should be noted that in the prediction scheme using the start relationship between the appliances, a relationship between the start and the end between the appliances may be not only a relationship between other appliances but also a relationship between the target appliance and the target appliance. For example, for a user who tends to successively use a toaster, it is the toaster that has a high probability of starting after the start or the end of the toaster, and therefore a prediction interval is predicted by using the relationship between the start and the end of the toaster, and the start of the toaster.

A configuration of the power source control device according to the present embodiment is the same as that of FIG. 3, and therefore an illustration is omitted. Moreover, the overall processing flow is the same as that of FIG. 4, and therefore an illustration is omitted. It should be noted that in the present embodiment, parts of the functions of the prediction interval prediction unit 106 and the power source control unit 110 are different from those according to Embodiment 1. Moreover, in the present embodiment, of the flowchart of FIG. 4, the contents of processing in Step S403 and Step S407 are different from those according to Embodiment 1. Hereafter, description of the difference from Embodiment 1 will be mainly made for the power source control device according to the present embodiment.

The prediction interval prediction unit 106 determines whether or not there is a temporal dependence relationship between the start time or the end time of the utilization interval of the first appliance and the start time of the utilization interval of the second appliance. Then the prediction interval predicting unit 106 predicts, based on the determination result, the prediction interval of the second appliance by using the utilization interval of the first appliance.

The power source control unit 110 controls power supply to an appliance based on the presence or absence of a temporal dependence relationship determined by the prediction interval prediction unit 106.

Next, each of the operations by the above configured power source control device 101 will be described according to the flowchart shown in FIG. 4.

After the utilization interval is specified for each of the appliances (S402), the prediction interval prediction unit 106 predicts, according to the prediction scheme using the start relationship between the appliances, the prediction intervals by using the utilization intervals of a plurality of the appliances (S403).

Figure 29:
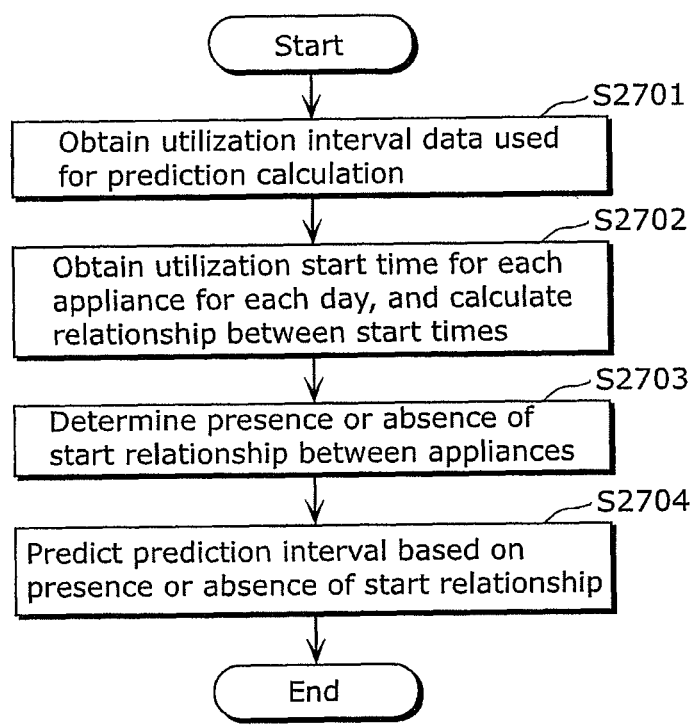
FIG. 29 is a flowchart showing a flow of prediction interval prediction processing according to Embodiment 2 of the present disclosure.
Figure 30:
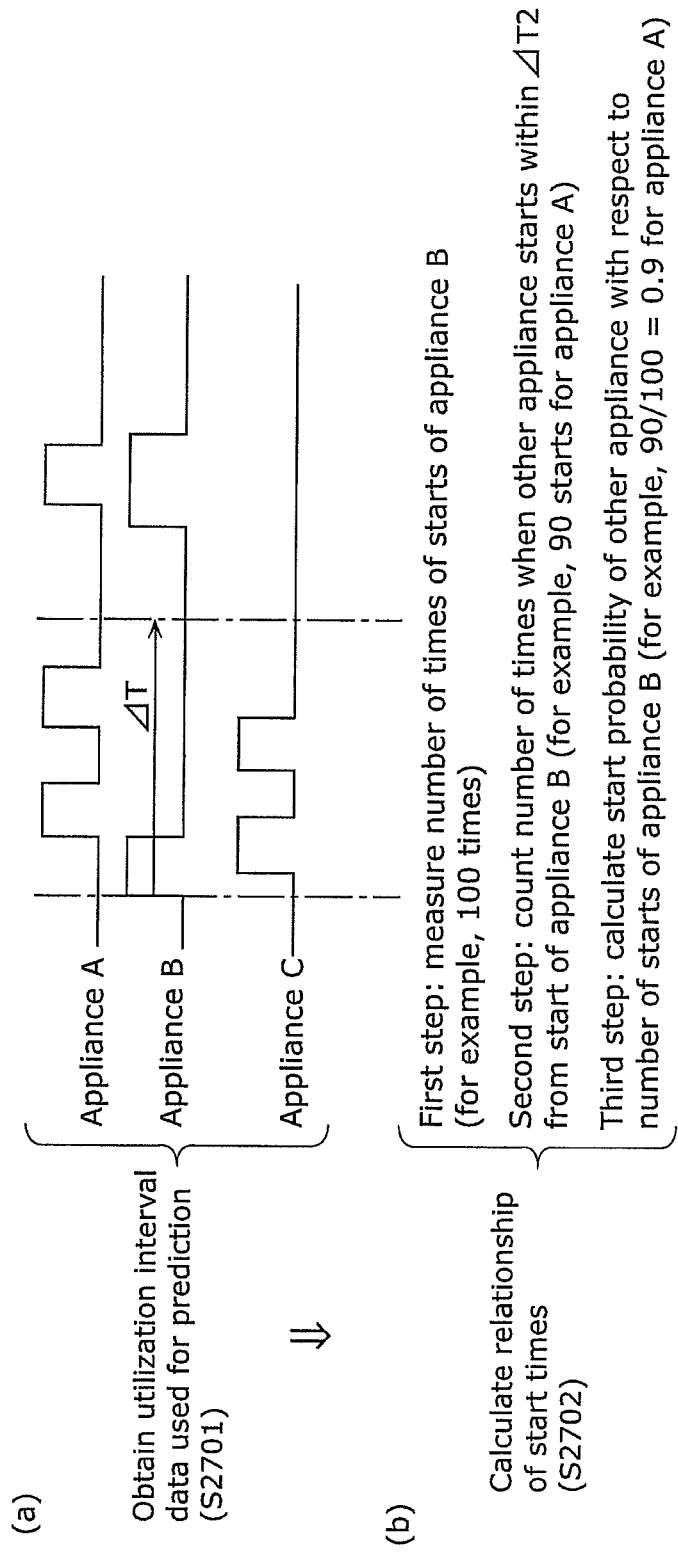
FIG. 30 is a diagram for explaining the prediction interval prediction processing according to Embodiment 2.

FIG. 29 is a flowchart showing a flow of prediction interval prediction processing according to Embodiment 2. In other words, FIG. 29 is a flowchart showing details of processing in Step S403 shown in FIG. 4. Moreover, FIG. 30 is a diagram for explaining a flow of prediction interval prediction processing according to Embodiment 2.

The prediction interval prediction unit 106 obtains, as data for use in prediction calculation, utilization interval data in predetermined periods of a plurality of appliances stored in the utilization interval data storage unit 105 (S2701). For example, the prediction interval prediction unit 106, as shown in (a) of FIG. 30, obtains utilization data for a week for each of the appliances and each of the days.

Next, the prediction interval prediction unit 106 obtains the utilization start time for each of the appliances and calculates a probability showing a size of a start relationship between each of the appliances (S2702). Specifically, the prediction interval prediction unit 106, for example, calculates, for each of the appliances, a probability that after a start of a certain appliance, another appliance starts within a predetermined time $\Delta T2$. In other words, the prediction interval prediction unit 106 calculates a probability that the start time of the utilization interval of the second appliance is included in the predetermined time from the start time of the utilization interval of the first appliance.

For example, assume that by using the weekly utilization data, utilization interval data are obtained for an appliance A, an appliance B, and an appliance C. In this case, a method in which the prediction interval prediction unit 106 calculates a start probability within the predetermined time $\Delta T2$ for the other appliance A and the other appliance C by setting the appliance B as a standard will be described with reference to (b) of FIG. 30.

First, the prediction interval prediction unit 106 counts how many times the appliance starts within the utilization interval data (the first step). In other words, the prediction interval prediction unit 106 obtains the number of utilization intervals of the appliance B included in the utilization interval data. For example, the prediction interval prediction unit 106 obtains "100 times" by counting the number of times of starts of the appliance B.

Next, the prediction interval prediction unit 106 counts the number of starts for each of the appliances by determining whether or not another appliance starts within the predetermined time $\Delta T2$ (one hour) after the start of the appliance B (the second step). In other words, the prediction interval prediction unit 106 counts, for each of the appliances, within the predetermined time $\Delta T2$ from the start time of the utilization period of the appliance B, the number of times in which the start times of the utilization intervals of the appliance A and the appliance C are included. For example, the prediction interval prediction unit 106 obtains "90 times" by counting the number of times when the appliance A starts within one hour after the start of the appliance B.

It should be noted that the count here is a count with respect to the number of kinds. For example, also in the case where the appliance A starts a plurality of times within one hour after the start of the appliance B, the prediction interval prediction unit 106 counts the start of the appliance A as once. In other words, the prediction interval prediction unit 106 counts, as once, even a case where a plurality of start times of the utilization intervals of the appliance A are included in the predetermined time $\Delta T2$ from the start time of the utilization period of the appliance B.

Finally, the prediction interval prediction unit 106 calculates a probability that the appliance A starts within one hour following the start of the appliance B (the third step). In other words, the prediction interval prediction unit 106 determines whether there is a temporal dependence relationship based on a probability, with respect to the utilization interval of the first appliance, that the start time of the utilization interval of the second appliance is included in a time interval of a passage of a predetermined time $\Delta T2$ from the start time of the utilization interval of the first appliance. Specifically, the prediction interval prediction unit 106 calculates a probability, with respect to the utilization interval of the appliance B, that the start time for each of the utilization intervals of the appliance A and the appliance C is included in the predetermined time $\Delta T2$ from the start time of the utilization period of the appliance B.

More specifically, the prediction interval prediction unit 106, for example, calculates a probability of "0.9" by the division of "90 times" which is the number of times when the appliance starts within one hour after the start of the appliance B by "100 times" which is the number of times of starts of the appliance B. In the same way also for the appliance C, the prediction interval prediction unit 106 calculates a probability that the appliance C starts within one hour from the start of the appliance B.

It should be noted that description is made for the appliance B as a standard, but similarly also for the appliance A and the appliance C, the prediction interval prediction unit 106 calculates a probability that the appliance B and the appliance C start within one hour after the start of the appliance A and a probability that the appliance A and the appliance B start within one hour after the start of the appliance C.

FIG. 31 is a diagram showing an example of a calculation result of the number of times of starts by the prediction interval prediction unit according to Embodiment 2. Moreover, FIG. 32 is a diagram showing an example of a calculation result of a probability showing a size of a start relationship between the appliances by the prediction interval prediction unit according to Embodiment 2.

An item 2901 shows an appliance which is a prediction target. An item 2902 shows the total number of times when the appliances indicated by the item 2901 start. In other words, the item 2902 shows the total number of utilization intervals for each of the appliances in the utilization interval data used for prediction.

An item 2903 shows the total number of times when the appliances indicated by the uppermost line start within the predetermined time $\Delta T2$ from the starts of the appliances indicated by the item 2901. An item 2904 shows a probability that the appliances indicated by the uppermost line start within the predetermined time $\Delta T2$ from the starts of the appliances indicated by the item 2901. Specifically, the item 2904 is a value which is generated by the division of a value indicated by a location to which the item 2903 corresponds by a value indicated by a line to which the item 2902 corresponds.

Return to the description of FIG. 29.

The prediction interval prediction unit 106 determines whether or not there is a start relationship between the appliances (S2703). In other words, the prediction interval prediction unit 106 determines whether or not electric power, in a conjunction with a start of an appliance, is supplied to another appliance.

For example, if a probability indicated in the item 2904 is equal to or greater than a threshold value Th, the prediction interval prediction unit 106 determines that there is a start relationship between the appliance indicated in a line to which the item 2901 corresponds and the appliance indicated in the uppermost line of the rows to which the item 2904 corresponds.

Then, the prediction interval prediction unit 106 generates and stores, in the prediction result storage unit 107, start relationship data which indicate a start relationship between the appliances determined in this way.

Figure 33:
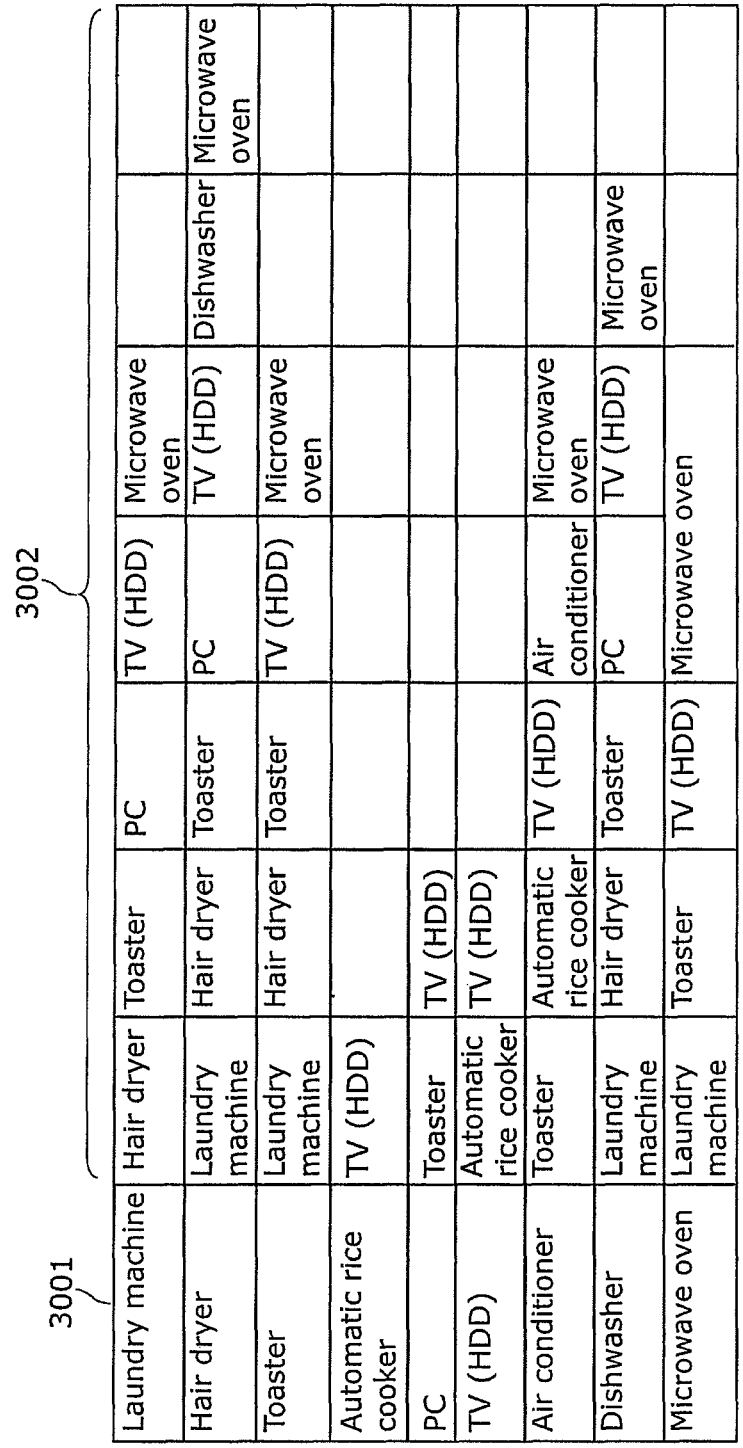
FIG. 33 is a diagram showing an example of start relationship data showing the presence or absence of a start relationship stored in the prediction result storage unit according to Embodiment 2.

FIG. 33 is a diagram showing an example of start relationship data showing the presence or absence of a start relationship stored in the prediction result storage unit 107. It should be noted that FIG. 33 shows start relationship data when the prediction interval prediction unit 106 determines the presence or absence of a start relationship with use of the probability shown in FIG. 32 and a threshold value Th "0.1".

An item 3001 shows the names of the first appliances and an item 3002 shows the presence or absence of a start relationship between the first appliances indicated in the item 3001 and the second appliances indicated in the uppermost line. It should be noted that the prediction interval prediction unit 106 stores, in the prediction result storage unit 107, the presence or absence of the start relationship between the appliances.

Finally, the prediction interval prediction unit 106 predicts, based on the start relationship data, a prediction interval for each of the appliances (S2704). For example, in the case where the start relationship data show that there is a start relationship between the first appliance and the second appliance, the prediction interval prediction unit 106 predicts a prediction interval of the second appliance in which the start time of the utilization interval of the second appliance is identical to the start time of the utilization interval of the first appliance. At this time, the duration of the prediction interval, for example, may be a predetermined duration (a second duration).

Specifically, the prediction interval prediction unit 106, for example, predicts a prediction interval by using the prediction target data used by the user load prediction unit 108 and the power saving effect prediction unit 109.

More specifically, the prediction interval prediction unit 106, for example as below, predicts a prediction interval by using the prediction target data. First, the prediction interval prediction unit 106 obtains, from the prediction target data, a start time of a utilization interval in a time-series order. Then, the prediction interval prediction unit 106, with reference to the start relationship data, specifies the appliance corresponding to the obtained start time (the first appliance) and the appliance having the start relationship (the second appliance). Finally, in the specified appliance (the second appliance), the prediction interval prediction unit 106 predicts, as a prediction interval, a time interval of the duration determined in advance from the obtained start time.

It should be noted that the prediction interval prediction unit 106 executes the above mentioned prediction interval prediction processing with respect to a plurality of values of duration £T2 or a threshold value Th.

In the prediction scheme according to the present embodiment, the predetermined time ΔT2 and the threshold value Th with respect to a probability used for determining the start relationship between the appliances are equivalent to a variable value. When the predetermined time ΔT2 is longer, the number of appliances starting within the predetermined time ΔT2 is greater, with a result that a probability value of the item 2904 is increased. Therefore, because it is determined that there is a start relationship between many appliances, the number of prediction intervals is increased or each of the prediction intervals is longer. Moreover, when the threshold value Th with respect to a probability is smaller, the number of intervals is greater similarly to when the predetermined time ΔT2 is longer. By making the predetermined time ΔT2 longer or making the threshold value Th of a probability smaller, the user load value is smaller but the power saving effect value is also smaller. Therefore, the prediction interval prediction unit 106, in the case where the present prediction scheme is used, generates a plurality of prediction results by varying the value of the predetermined time ΔT2 or the threshold value Th with respect to the probability, and then stores the results in the prediction result storage unit 107.

It should be noted that the prediction interval prediction unit 106 must not necessarily predict the prediction interval of the second appliance such that the start time of the prediction interval of the second appliance is identical to the start time of the utilization interval of the first appliance. For example, the prediction interval prediction unit 106, for example, may predict the prediction interval of the second appliance such that the start time of the prediction interval of the second appliance is identical to a time after a passage of a predetermined time ΔT3 from the start time of the utilization interval of the first appliance. With this, the power source control device 101 can enhance power saving because the device can reduce the waste power supply interval shown in FIG. 18A.

Here, the predetermined time ΔT3 may, for example after the start of the appliance, be calculated a distribution of how long it takes for each of the appliances to start after the appliance starts in calculating the number of starts of the other appliances within the predetermined time ΔT2 and may be determined based on the distribution information.

Figure 34:
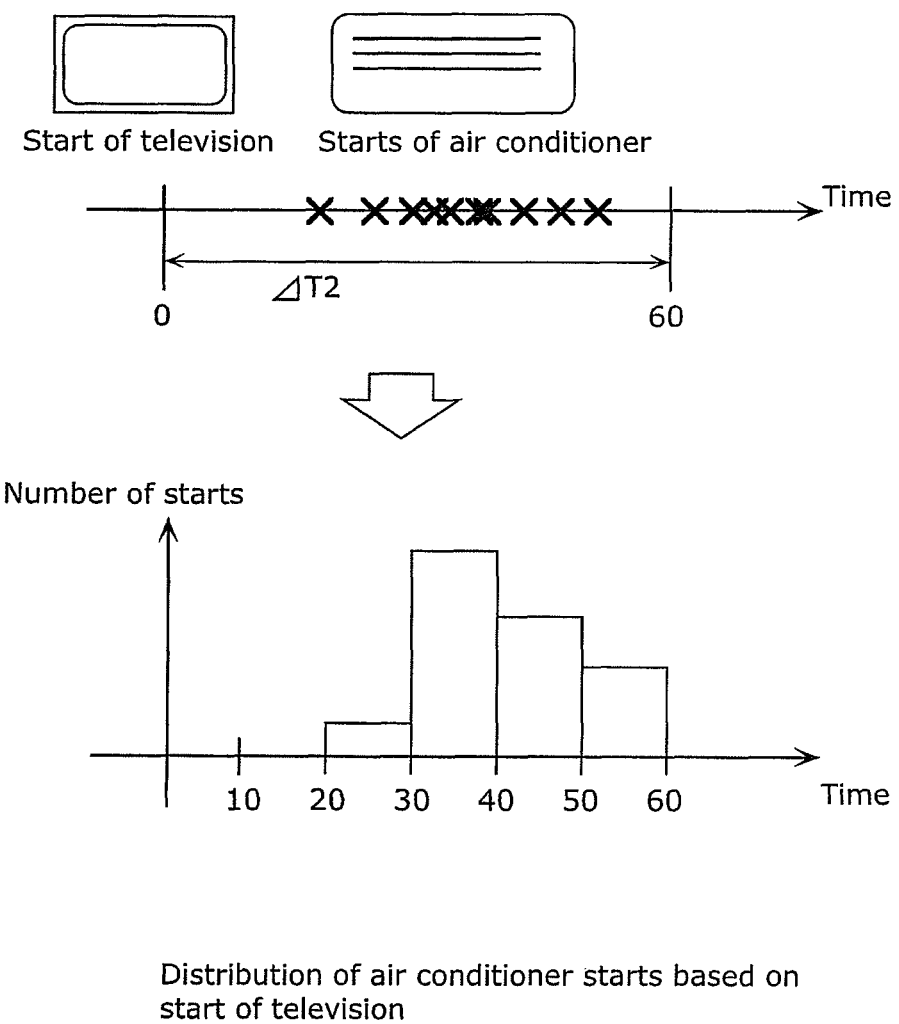
FIG. 34 is a diagram for explaining prediction interval prediction processing according to Embodiment 2.

For example, as shown in FIG. 34, the prediction interval prediction unit 106 generates a distribution by calculating the number of times when an air conditioner starts within the predetermined time ΔT2 after the start of the television (in FIG. 34, 60 minutes). In other words, the prediction interval prediction unit 106 calculates the distribution of elapsed times from the start time of the utilization interval of the first appliance to the start time of the utilization interval of the second appliance.

In FIG. 34, the start times of the air conditioner are only distributed in 20 minutes or after the start time of television. In this case, the prediction interval prediction unit 106, when predicting the prediction interval of the air conditioner based on the start of the television, may designate the start time of the prediction interval as a time when 20 minutes pass after the utilization start time of the television. In other words, the prediction interval prediction unit 106 may predict the prediction interval such that the start time of the prediction interval of the second appliance is identical to a time after a passage of a predetermined time ΔT3 (for example, 20 minutes in the above description) from the start time of the utilization interval of the first appliance.

Moreover, the number of times of air conditioner starts is small in a period from 20 minutes to 30 minutes. Therefore, so as to increase the power saving effect, the prediction interval prediction unit 106 may designate the start time of the prediction interval of the air conditioner as a time when 30 minutes pass after the start of the television. In this case, so as to control an increase in the user load, the prediction interval prediction unit 106 may, for example, determine a predicted elapsed time based on a comparison between cumulative probability calculated from the distribution of the elapsed times and the threshold value.

In this way, the power source control device 101 may calculate a relationship between the user load value and the power saving effect value by varying the variable value inputted in the prediction of the prediction interval over how much time passes after the start time of the other appliance is designated as the start time of the prediction interval. In other words, in the prediction scheme according to the present embodiment, the prediction interval prediction unit 106 may predict the prediction interval by designating the predicted elapsed time as a variable value.

Return to the description of FIG. 4.

After the setting information is displayed in the display unit 1007, the power source control unit 110 determines a variable value (the predetermined time ΔT2, the threshold value, or the like) corresponding to the combination selected by the user. Then, the power source control unit 110 controls power supply to each of the appliances according to the start relationship data calculated with use of the determined variable value (S407).

Specifically, the power source control unit 110, for example, controls power supply to each of the appliances hereafter.

First, the power source control unit 110 obtains, in real time, the start time of the utilization interval of the appliance. For example, the power source control unit 110 obtains, by receiving a utilization start signal, the start time of the utilization interval of the appliance. Moreover, for example, the power source control unit 110 obtains, by using the utilization interval data specified in real time by the utilization interval specification unit 104, the start time of the utilization interval of the appliance.

Then, the power source control unit 110 determines, with reference to the start relationship data, the appliance having the start relationship with the appliance which obtains the start time of the utilization interval. Furthermore, the power source control unit 110 controls the power source control execution unit 1005 such that electric power is supplied to the determined appliance.

In this way, the prediction time by the prediction scheme using the start relationship between the appliances as described in the present embodiment is influenced by the utilization of other appliances. Therefore, in the prediction scheme using the start relationship between the appliances, the prediction time is not determined with respect to a day for the prediction target at a time when the calculation processing is ended.

As described above, the power source control device 101 according to the present embodiment can reduce the user load by determining the start relationship between the appliances from utilization history of a plurality of appliances and by thus making it possible to predict a prediction interval of a time interval different from a prediction interval predicted from the past utilization history of the same appliance.

It should be noted that the power source control device according to an aspect of the present disclosure also includes various modifications of the power source control device 101 according to the present embodiment. Hereafter, modifications of the present embodiment will be described.

Modification 1 of Embodiment 2

In the above described Embodiment 2, the prediction interval prediction unit 106 determines the presence or absence of the start relationship between the appliances by using a temporal dependence relationship between the start times of the appliances. Conversely, a prediction interval prediction unit 106 according to the present modification further determines the presence or absence of the start relationship between the appliances by using a temporal dependence relationship between the start time and the end time of the utilization interval.

In other words, in Step S2702, the prediction interval prediction unit 106 further counts the number of times when an appliance starts within the predetermined time ΔT2 from the end time of a certain appliance and calculates the probability. In other words, the prediction interval prediction unit 106 further calculates a probability that the start time of the utilization interval of the second appliance is included in the predetermined time ΔT2 from the end time of the utilization interval of the first appliance. More specifically, the prediction interval prediction unit 106 calculates a probability with respect to the second appliance in which the start time of the utilization interval of the first appliance is included in a time interval from the start time of the utilization interval of the second appliance to before the predetermined time ΔT2.

In this case, the power source control unit 110, at a time when utilization of a certain appliance is ended, supplies electric power to the appliance having a probability equal to or more than the threshold value of start relationship of between appliances to the appliance. In other words, in the case where the start relationship data show that there is a start relationship between the first appliance and the second appliance, the prediction interval prediction unit 106 predicts a prediction interval of the second appliance such that the start time of the utilization interval of the second appliance is identical to the end time of the utilization interval of the first appliance.

With this, the power source control device 101 can enhance the power saving effect in the case where the utilization of the second appliance is started after the end of the utilization of the first appliance. Moreover, the power source control device 101 can reduce the user load even in the case where the utilization of the second appliance is started after the end of the utilization of the first appliance but the utilization interval of the first appliance is long.

It should be noted that the prediction interval prediction unit 106 may predict a prediction interval by using both the start time and the end time of the utilization interval of the first appliance. With this, the power source control device 101 can reduce the user load which is caused by a cutoff of power supply at the start time of appliance utilization because the device can predict a prediction interval with respect both to the start time and the end time of the utilization interval of the first appliance.

Furthermore, the prediction interval prediction unit 106 may, for each of the first appliances, change whether to utilize the start time or the end time, or whether to utilize the start time and the end time. Specifically, the prediction interval prediction unit 106, for example, when wanting to make the user load smaller, predicts a prediction interval by using both the start time and the end time. Meanwhile, the prediction interval prediction unit 106, for example, predicts a prediction interval by using only the end time in the case where power saving effect is intended to be increased as much as possible.

Moreover, it may be determined as below which of the start time or the end time is used. The prediction interval prediction unit 106, in the utilization interval data, calculates, as a first probability, a probability that the start time of the utilization interval of the second appliance is included in a period from the start time of the utilization interval of the first appliance to the passage of the predetermined time. Furthermore, the prediction interval prediction unit 106, in the utilization interval data, calculates, as a second probability, a probability that the start time of the utilization interval of the second appliance is included in a period from the end time of the utilization interval of the first appliance to the passage of the predetermined time.

Here, in the case where a difference value between the first probability and the second probability is equal to or greater than the predetermined value, the prediction interval prediction unit 106 predicts, as a prediction interval of the second appliance, a time interval of the second duration which includes the start time of the utilization interval of the first appliance. Meanwhile, in the case where a difference value between the first probability and the second probability is less than the predetermined value, the prediction interval prediction unit 106 predicts, as a prediction interval of the second appliance, a time interval of the third duration which includes the end time of the utilization interval of the first appliance.

The third duration can be shorter than the second duration. Therefore, in the case where the first probability and the second probability are less than the predetermined value, it is possible for power saving effect to be enhanced. Moreover, by appropriately setting the predetermined value, it is possible for the user load to be prevented from increasing.

Modification 2 of Embodiment 2

In the above Embodiment 2, the prediction interval prediction unit 106 predicts a prediction interval of the second appliance by using the presence or absence of the start relationship between a single first appliance and a second appliance. Conversely, a prediction interval prediction unit 106 according to the present variation predicts a prediction interval of the second appliance by using the presence or absence of the first appliances and the second appliance.

A specific example will be described with reference to FIG. 35.

Figure 35:
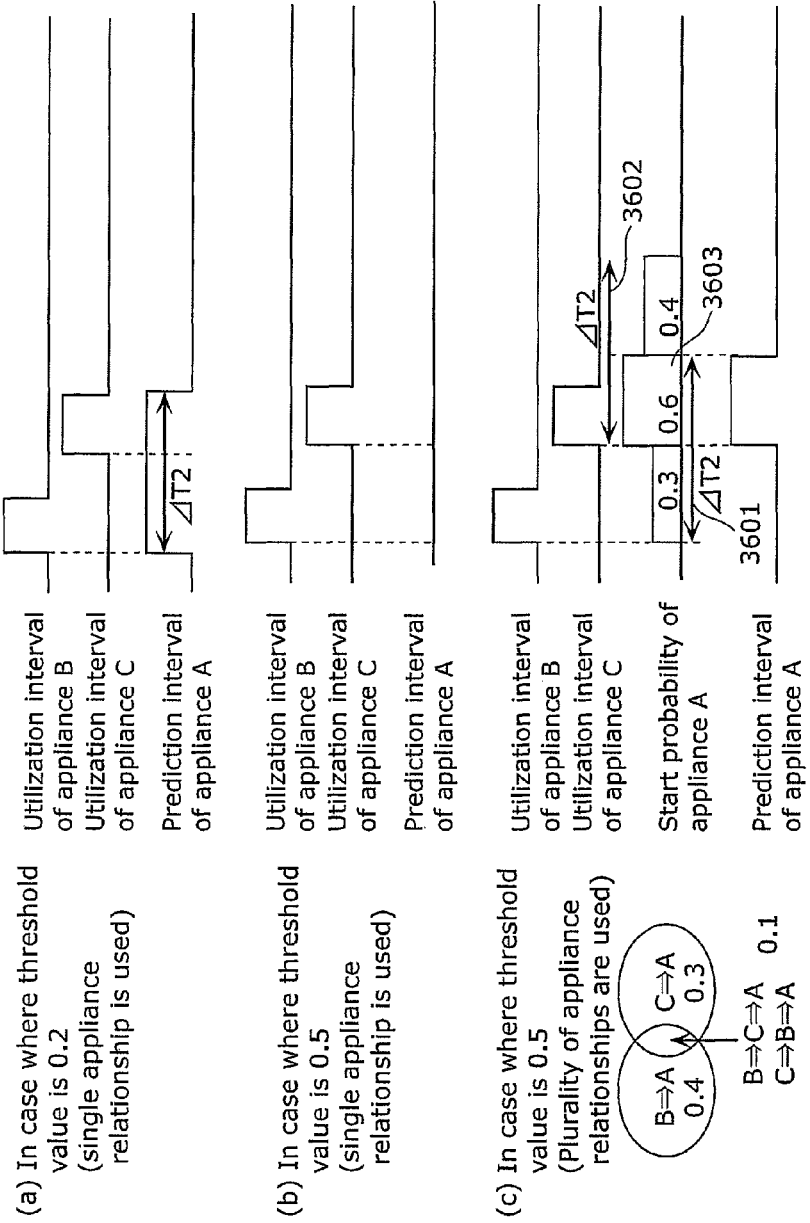
FIG. 35 is a diagram for explaining prediction interval prediction processing according to Modification 2 of Embodiment 2.

FIG. 35 is a diagram for explaining the prediction interval prediction processing according to Modification 2 of Embodiment 2. Specifically, (a) and (b) of FIG. 35 are diagrams each showing a prediction interval predicted by the prediction interval prediction unit according to Embodiment 2. Moreover, (c) of FIG. 35 is a diagram showing a prediction interval predicted by the prediction interval prediction unit according to the present modification of Embodiment 2.

It should be noted that in FIG. 35, a probability is "0.4" that after the start of the appliance B, the appliance A starts within the predetermined time $\Delta T2$. Moreover, a probability is "0.3" that after the start of the appliance C, the appliance A starts within the predetermined time $\Delta T2$.

In the case where the threshold value is "0.2", as shown in (a) of FIG. 35, the prediction interval prediction unit 106 predicts a prediction interval of the appliance A such that the start time of the prediction interval of the appliance A is identical to the start time of the utilization interval of the appliance B and the duration of the prediction interval is identical to the predetermined time $\Delta T2$.

Here, in the case where the threshold value is "0.5", the prediction interval prediction unit 106 determines that there is no start relationship of the appliance B and the appliance C with the appliance A. Therefore, as shown in (b) of FIG. 35, the prediction interval prediction unit 106 does not predict a prediction interval based on the starts of the appliance B and the appliance C.

Therefore, the prediction interval prediction unit 106 according to the present modification determines the presence or absence of a start relationship by using a union of probabilities calculated between each of the first appliances and the second appliance.

Specifically, first, the prediction interval prediction unit 106 calculates a sum of probabilities "0.1" which is a sum of a probability that the appliance B, the appliance C, and the appliance A sequentially start within the predetermined time $\Delta T2$ and a probability that the appliance C, the appliance B, and the appliance A sequentially start within the predetermined time $\Delta T2$.

Then, the prediction interval prediction unit 106 specifies a time interval 3601 in which the predetermined time $\Delta T2$ elapses after the start of the appliance B, and a time interval 3603 in which overlaps a time interval 3602 in which the predetermined time $\Delta T2$ elapses after the start of the appliance C. Furthermore, the prediction interval prediction unit 106 calculates a start probability "0.6" of the appliance A in the specified time interval 3603 by subtracting the sum of probabilities "0.1" from the sum of the start probability "0.3" with respect to the appliance B and the start probability "0.4" with respect to the appliance C. The prediction interval prediction unit 106 predicts, as a prediction interval, the time interval 3603 having a start probability of more than a threshold value "0.5". In this way, by using the start probability between the plurality of the appliances, the prediction interval prediction unit 106 can enhance prediction accuracy of a prediction interval.

It should be noted that in FIG. 35, the prediction interval prediction unit 106 predicts the prediction interval such that the duration of the prediction interval is identical to the predetermined time $\Delta T2$. Moreover, as shown in (a) of FIG. 35, the prediction interval prediction unit 106 does not predict the prediction interval of the appliance A by the start of the appliance C in the case where the prediction interval of the appliance A is predicted by the start of the appliance B. In other words, the prediction interval prediction unit 106 does not predict the prediction interval of the second appliance based on the start time of the utilization interval of the first appliance in the case where the start time of the utilization interval of the first appliance is included in the prediction interval of the second appliance.

However, the prediction interval prediction unit 106 may extend the prediction interval of the appliance A by considering also the start of the appliance C. In other words, the prediction interval prediction unit 106 varies the end time of the prediction interval such that in the case where the start time of the utilization interval of the first appliance is included in the prediction interval of the second appliance, the end time of the prediction interval is a time after a passage from a predetermined time.

Modification 3 of Embodiment 2

In the above Embodiment 2, the prediction interval prediction unit 106 generates a piece of data showing the presence or absence of the start relationship between the appliances with respect to the whole period of the utilization interval data used for determining the presence or absence of the start relationship. Conversely, a prediction interval prediction unit 106 according to the present modification generates start relationship data with respect to a plurality of time intervals according to time interval attributes included in the utilization interval data.

Specifically, the prediction interval prediction unit 106, for example, generates start relationship data for each of the days of the week. In this case, the prediction interval prediction unit 106, corresponding to the prediction target day of the week, predicts a prediction interval by using the start relationship data for the same day of the week.

Furthermore, the prediction interval prediction unit 106 may generate start relationship data for each group of days of the week having the same trend. A group of days of the week may be, for example, a group of weekdays (from Monday to Friday) and a group of weekends (Saturday and Sunday). Moreover, a group of days of the week may be formed by compiling Tuesday and Thursday.

Moreover, the prediction interval prediction unit 106, for example, may generate start relationship data for each of the time periods. For example, the prediction interval prediction unit 106 may generate start relationship data for each of the time periods by using the utilization interval data for each of the one-hour time periods. Moreover, for example, the prediction interval prediction unit 106 may generate start relationship data for each of the three time periods of the morning, noon, and the evening.

Calculation of the start relationship between the appliances corresponding to the time interval attributes may be specified by a system developer or a user, or may be automatically performed. In the case where the calculation is automatically performed, for example, in the past history data, prediction is performed with a period of calculating the start relationship between the appliances and the calculated start relationship between the appliances, and then may be grouped based on the prediction accuracy. Alternately, calculation is performed for average information volume (entropy) in the case of not being classified according to the attributes and for average information volume (entropy) in the case of being classified according to the attributes, and compilation may be performed based on an information gain which is the difference value.

Modification 4 of Embodiment 2

In the above Embodiment 2, the prediction interval prediction unit 106 calculates a probability that the second appliance starts within the predetermined time ΔT2 after the start of the first appliance. Conversely, a prediction interval prediction unit 106 according to the present modification calculates a probability that the second appliance starts next to the start of the first appliance.

Specifically, the prediction interval prediction unit 106 obtains, from the utilization interval data for a week, the utilization start time for each of the appliances. Then, for example, the prediction interval prediction unit 106 calculates the number of times when each of the appliances (the second appliances) starts next to the television (the first appliance). Then, the prediction interval prediction unit 106, for each of the appliances, calculates, by the division of the calculated number of times by the number of times of television starts, a probability that each of the appliances (the second appliance) starts next to the television (the first appliance). In this way, the prediction interval prediction unit 106 calculates, with respect to all the appliances (the first appliances) for each of the appliances (the second appliances), a probability of starting next to the start of the first appliances. The prediction interval prediction unit 106 generates the start relationship data by comparing the calculated probability with the threshold value.

For example, assume that a probability that the television starts and a recording appliance starts next is set at "0.5", and a probability that the television starts and the laundry machine starts next is set at "0.1". Assuming that the threshold value is 0.3, the prediction interval prediction unit 106 predicts a prediction interval of the recording appliance such that the start time of the prediction interval of the recording appliance is identical to the start time of the utilization interval of the television. Meanwhile, the prediction interval prediction unit 106 does not predict a prediction interval of the laundry machine based on the utilization interval of the television.

It should be noted that when calculating a probability for each of the appliances, the prediction interval prediction unit 106 may calculate, for each of the appliances, a probability of starting next to the first appliance and starting within the predetermined time after the start of the first appliance. Specifically, in the case where the predetermined time is 30 minutes, the prediction interval prediction unit 106 calculates the probabilities of "zero" for all the appliances in the case where no appliance starts within 30 minutes after the start of the television. By calculating in this way, the prediction interval prediction unit 106 can prevent itself from determining that the appliance which starts temporally away from the start of the first appliance has a start relationship with the first appliance even though the appliance starts next to the first appliance.

It should be noted that the present scheme may calculate a probability of starting after the starts of several appliances, as indicated by which of the appliances start after the latter appliance B of the appliance A starts, in addition to an appliance which starts next.

Modification 5 of Embodiment 2

A power source control device 101 according to the present modification, as shown in FIG. 36A, may generate a series by including a time interval existing between the series (hereafter described as a start interval) in a start sequence of successive appliances, may calculate a probability, and may predict the start of the appliance. Specifically, the prediction interval prediction unit 106 predicts a prediction interval by designating the start time or the end time of the utilization interval of the first appliance as the start time of the prediction interval of the second appliance, but when determining that there is no start of an appliance in a predetermined time after the start time or the end time of the utilization interval of the first appliance, the prediction interval prediction unit 106 predicts the prediction interval by designating the time as the start time of the prediction interval of the second appliance.

More specific description will be given.

First, from the utilization history of the appliances, as shown in FIG. 36A, the prediction interval prediction unit 106 measures a start interval between the appliances and chronologically arranges the intervals along with the starts of the appliances. In this case, the start interval is represented by a predetermined time unit. Here, the start interval is equivalent to the above described time interval. For example, in the case of being represented by a 10-minute unit, zero minute represents the start interval from zero minute to 4 minutes, 10 minutes represent the start interval from 5 minutes to 14 minutes, and 20 minutes represent the start interval from 15 minutes to 24 minutes.

Next, the prediction interval prediction unit 106 calculates which of the start interval units occurs after the start of a certain appliance and represents, by a probability, a relationship between the start of the appliance and the start interval.

For example, assume that the appliance A starts 100 times. Assume that when the number of the start intervals of the appliance A is calculated, the number of times of 10-minute start intervals is 50, the number of times of 20-minute start intervals is 30, and the number of times of one-hour start intervals is 20. In this case, the prediction interval prediction unit 106 calculates a possibility of 0.5 (=50/100) that the 10-minute start interval occurs after the start of the appliance A. FIG. 36B is a diagram showing an example of a calculation result of a probability corresponding each to the first appliances and the start intervals.

In the same way, in the case where the 10-minute interval occurs 100 times and the appliance B starts 30 times after the 10-minute start interval, the prediction interval prediction unit 106 calculates a probability of 0.3 that the appliance B starts after the 10-minute start interval. In other words, the prediction interval prediction unit 106 calculates a probability of 0.3 that the appliance B corresponds to the second utilization interval. FIG. 36C is a diagram showing an example of a calculation result of a probability corresponding to the start intervals and the second appliances.

When power supply to an appliance is controlled, as similarly as before, the power source control unit 110 supplies electric power to the appliance after determining that there is a dependence relationship between the appliance and the start interval in the case where a probability representing a relationship between the appliance and the start interval is equal to or greater than a threshold value. More specifically, in the case where the threshold value is set at 0.1, the power source control unit 110 measures a time when the appliance is not started by the timer from a time when a certain appliance starts.

At a time of when 10 minutes are elapsed, the power source control unit 110 supplies electric power to the appliances starting after the 10-minute start interval and having a probability equal to or greater than 0.1 (for example, the appliance B). In other words, the prediction interval prediction unit 106 predicts a point of time when 10 minutes are elapsed after the start time of the utilization interval as the start time of the prediction interval of the appliance starting after the 10-minute start interval and having a probability equal to or greater than 0.1 (for example, the appliance B).

In the case where all the appliances including the appliance B do not start and 20 minutes are elapsed, the power source control unit 110, at the point of time, stops power supply to the appliance B and supplies electric power to the appliance having a probability, equal to or greater than 0.1, of starting after the 20-minute start interval.

Here, if the start time for a day which is calculated by dividing utilization history on a daily basis is included in a measurement trigger of the start interval, the prediction interval prediction unit 106 can calculate a probability of an appliance which starts after a predetermined time after the start time of the day. For example, in the case where the start time of the day is 2:00 and a family wakes up at 6 o'clock and starts activities, the start of the appliance can be confirmed after the start interval for around 4 hours, and therefore the start probability of 4 hours after the start time of the day is increased. Furthermore, in the case where the same appliance is used after the wake-up, the prediction interval prediction unit 106 can predict, as the start time of the prediction interval of the appliance, 6:00 which is 4 hours after 2:00.

It should be noted that in the above example, 10 minutes are used as a time unit but a unit such as equal to or greater than a predetermined time may be used. For example, in the case where only a unit of equal to or more than 5 hours is used, the prediction interval prediction unit 106 can calculate a probability of an appliance which starts after 5 hours or longer are elapsed when there are no other appliance starts.

Figures 36D, 37:
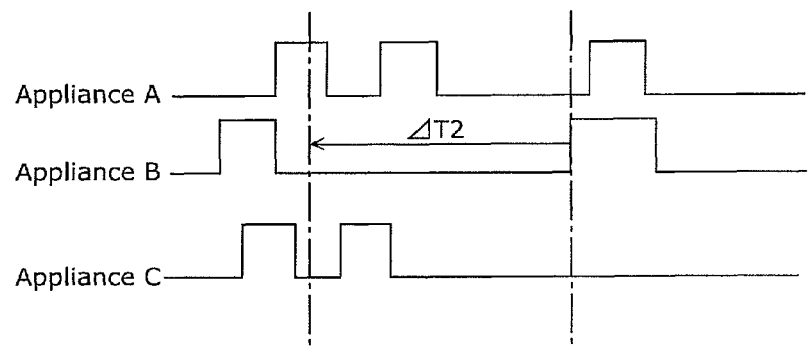
FIG. 36D is a diagram for explaining the prediction interval prediction processing according to Modification 5 of Embodiment 2.
FIG. 37 is a diagram for explaining prediction interval prediction processing according to Modification 6 of Embodiment 2.

In the above example, the prediction interval prediction unit 106, based on the length of the start interval, predicts the start of the appliance starting after the start interval, but may further predict the start of the appliance by using a result of calculating a probability including information about an appliance which starts before the start interval. In other words, as shown in FIG. 36D, the prediction interval prediction unit 106 calculates and stores a probability that how long the start interval occurs after the start of the first appliance and next the second appliance starts, and predicts the start of the appliance based on the result. As a specific example of power supply, the power source control unit 110, in the case where the threshold of probability is set at 0.1, first measures a time when the appliance is not started by the timer from a time when the appliance A starts. At a point of time when 10 minutes are elapsed, the power source control unit 110 predicts that after a 10-minute start interval occurs after the start of the appliance A, the appliance A and the appliance B start with a probability equal to or greater than 0.1, and then supplies electric power to the appliances. In the case where the appliance A starts, power supply to the appliance B is stopped and a time in which the appliance is not started is measured. Meanwhile, in the case where both appliances do not start after 20 minutes are elapsed, the power source control unit 110, at a point of time when 20 minutes are elapsed, stops power supply to the both appliances and supplies electric power to an appliance having a probability, equal to or greater than 0.1, of starting after the 20-minute start interval after the start of the appliance A.

Moreover, the prediction interval prediction unit 106 may calculate the above probability for each of the utilization history attributes such as a time and a day of the week, and may predict by using the probability value compatible with the attribute when it is used. For example, the prediction interval prediction unit 106, hourly calculates a start interval which occurs after the start of the appliance. More specifically, assume that a certain family uses the dishwasher from 8:00 to 8:59 in the morning and from 10:00 to 10:59 in the evening. Assume that a start interval, having the highest possibility, after the start of the dishwasher from 8:00 to 8:59 in the morning is 10 minutes and a probability of a start interval over one hour is zero. Meanwhile, in the case where a probability that the start interval after the start of the dishwasher from 10:00 to 10:59 in the evening is within one hour is not zero, but a probability that the start interval is from one hour to 8 hours is zero, and the highest probability lies in eight hours, it is also possible to predict that the family is sleeping within one hour after the start of the dishwasher from 10:00 to 10:59. In other words, in the case where there is a dependence relationship between the first appliance (for example, the dishwasher) and the time interval (for example, 8 hours), the prediction interval prediction unit 106 prohibits the prediction of the prediction interval in a period of a passage of the time interval (for example, 8 hours) from the start time of the utilization interval of the first appliance. It should be noted that whether or not there is a dependence relationship between the first appliance and the time interval may be determined by comparing the probability with the threshold value.

Modification 6 of Embodiment 2

In the above Embodiment 2, the prediction interval prediction unit 106 calculates a probability with respect to the utilization interval of the first appliance in which the utilization interval of the second appliance starts within the predetermined time $\Delta T2$ from the start time or the end time of the utilization interval of the first appliance. Then, the prediction interval prediction unit 106 determines that there is a start relationship between the first appliance and the second appliance in the case where the calculated probability is greater than the threshold value. In the case where the scheme is used, a probability value of the second appliance having a low utilization frequency is smaller than that of the second appliance having a high utilization frequency, and therefore there are many cases where it is determined that there is no start relationship.

For example, assume when the start relationship between the appliances is calculated based on the utilization interval data of appliances for a week, the number of start times for the television is 100 for a week and the number of start times for the air conditioner is 8. Assuming that the start of the air conditioner (the second appliance) occurs within the predetermined time $\Delta T2$ after the start of the television (the first appliance), a probability that the air conditioner starts after the start of the television is "0.08 (=8/100)". In the case where the threshold value is 0.1, the prediction interval of the air conditioner is not predicted based on the start of the television. If the air conditioner does not start within the predetermined time $\Delta T2$ after the start of another appliance, there is a problem that the prediction interval of the air conditioner is not predicted.

Therefore, the prediction interval prediction unit 106 according to the present modification further calculates a probability with respect to the utilization interval of the second appliance in which the start time or the end time of the utilization interval of the first appliance is included in a time interval from the start time of the utilization interval of the second appliance to before the predetermined time ΔT2.

In other words, the prediction interval prediction unit 106 not only calculates the number of times and the probability of the appliance which starts within the predetermined time after the start of the appliance like Embodiment 2 (hereafter described as backward probability) but also calculates the number of times and the probability of the appliance which starts within the predetermined time before the start of the appliance like FIG. 37 (hereafter described as forward probability). Then, the prediction interval prediction unit 106 predicts the prediction interval based on the threshold value Th with respect to a score calculated from both probability values. For example, when average value of both probability values are used as the score, in the examples of the television and the air conditioner, a probability that the air conditioner starts after the start of the television is "0.08" and a probability that the television starts before the start of the air conditioner is "1.0", with a result that the score is the average value "0.54". Assuming that the threshold value of the score is "0.2", the utilization interval of the air conditioner is predicted based on the start of the television.

The present scheme makes it possible to predict the prediction interval of the air conditioner, but there is a problem that if, with respect to the 100 starts of the air conditioner, the prediction intervals of the air conditioner are predicted with respect to all the starts, power saving effect eventually becomes small.

Therefore, a score calculating method may be varied according to utilization history attributes such as a time and a day of the week. For example, the score calculating method may be varied for each of the times. Specifically, in the case where there is an appliance relationship in which a value of the forward probability is smaller than a predetermined value and a value of the backward probability is greater than a predetermined value, the prediction interval prediction unit 106 may calculate a score after considering the backward probability only for a time period in which the latter appliance is started. In the above example, if the utilization history of eight times of the air conditioner is utilized only from 6:00 to 6:59, from 7:00 to 7:59, from 20:00 to 20:59, and from 21:00 to 21:59, the prediction interval prediction unit 106 predicts the prediction intervals of the air conditioner based on the start of the television only from 6:00 to 6:59, from 7:00 to 7:59, from 20:00 to 20:59, and from 21:00 to 21:59. It should be noted that in the case where it is classified by attributes such as a time, the prediction interval prediction unit 106 may calculate the forward probability and the backward probability according to the attributes and may calculate a score. Moreover, the prediction interval prediction unit 106 may calculate the forward probability and the backward probability according to the attributes and may determine based on the results.

Furthermore, the prediction interval prediction unit 106, so as to decrease a prediction of a wrong prediction interval by the start of the former appliance, may calculate the forward probability with respect to a plurality of appliances instead of with respect to a single appliance in the calculation of the forward probability. Specifically, the prediction interval prediction unit 106 calculates the forward prediction with respect to the plurality of appliances which are started in a time period before the predetermined time ΔT2 from the start of a certain appliance. More specifically, in the case where the forward probability is calculated with respect to two appliances which start within the predetermined time ΔT2 before the start of the air conditioner, the prediction interval prediction unit 106, for example, calculates a probability that the laundry machine and the television start before the start of the air conditioner. In this way, by setting, as a condition, the starts of the plurality of appliances, the prediction interval prediction unit 106 can reduce power supply which is caused by the prediction of more prediction intervals.

In the case where a restriction is further tightened, the prediction interval prediction unit 106 may use the forward probability with respect to the maximum number of the appliances which are commonly included in before the predetermined time ΔT2 from the time of the start of the air conditioner. For example, in the case where all cases in which the air conditioner is started, only the television, the laundry machine, and the automatic rice cooker are commonly started, the prediction interval prediction unit 106 calculates a forward probability with respect to the three appliances. In the case where the threshold value is one, for example, the prediction interval prediction unit 106 predicts the prediction interval of the air conditioner only when the television, the laundry machine, and the automatic rice cooker are utilized.

Embodiment 3

Next, Embodiment 3 will be described.

Like Embodiment 2, in the prediction scheme using the start relationship between the appliances, a prediction interval is not predicted for an appliance or a time period in which no appliance starts within the predetermined time ΔT2.

Therefore, a prediction interval prediction unit 106 according to the present embodiment predicts a prediction interval by using at least one of the prediction scheme using the start relationship between the appliances as described in Embodiment 2 (the second prediction scheme) and the prediction scheme using the periodicity as described in Embodiment 1 (the first prediction scheme).

A whole configuration of a power source control device 101 according to the present embodiment is the same as the configuration of the power source control device 101 according to Embodiment 1 shown in FIG. 3, and therefore an illustration is omitted. It should be noted that part of the functions of a prediction interval prediction unit 106 according to the present embodiment is different from the functions of the prediction interval prediction unit 106 according to Embodiment 1 or Embodiment 2. Therefore, a detailed functional configuration of the prediction interval prediction unit 106 will be shown in FIG. 38.

The prediction interval prediction unit 106 according to the present embodiment predicts a prediction interval for each of the appliances by using at least one of the first prediction scheme and the second prediction scheme. Specifically, the prediction interval prediction unit 106, among a plurality of appliances, selects the first prediction scheme or the second prediction scheme according to the number of the first appliances having a temporal dependence relationship with the second appliance. Then the prediction interval prediction unit 106 predicts a prediction interval of the second appliance by using the selected first prediction scheme or the selected second prediction scheme.

Figure 38:
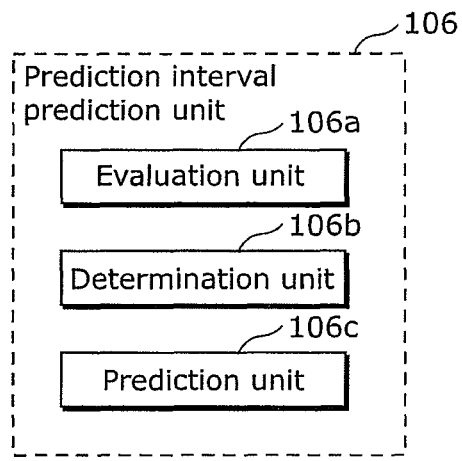
FIG. 38 is a diagram showing a detailed functional configuration of a prediction interval prediction unit according to Embodiment 3 of the present disclosure.

More specifically, the prediction interval prediction unit 106, as shown in FIG. 38, includes an evaluation unit 106a, a determination unit 106b, and a prediction unit 106c.

The evaluation unit 106a calculates, by using history data of the utilization interval, an evaluation value for determining a prediction scheme for each of the appliances. In the present embodiment, the evaluation unit 106a, in the utilization interval data, calculates a probability, for each of the first appliances, that the start time or the end time of the first appliance is included in a period from the start time of the utilization interval of the second appliance to before the predetermined time. Then the evaluation unit 106a calculates, as a evaluation value, the number of the first appliances each having the calculated probability equal to or greater than a threshold value.

The determination unit 106b, based on the calculated evaluation value, at least for each of the appliances, determines at least one of the first prediction scheme and the second prediction scheme as the prediction scheme for the appliance. In the present embodiment, in the case where the calculated evaluation value is equal to or greater than the threshold value, the determination unit 106b determines the second prediction scheme as the prediction scheme for the second appliance. Moreover, in the case where the calculated evaluation value is less than the threshold value, the determination unit 106b determines the first prediction scheme as the prediction scheme for the second appliance.

The prediction unit 106c predicts a prediction interval at least each of the appliances by using the determined prediction scheme. Specifically, in the case where the first prediction scheme is determined, the prediction unit 106c predicts, as a prediction interval, a time interval of the first duration including a time periodically corresponding to the start time of the utilization interval included in the utilization interval data.

Moreover, in the case where the second prediction scheme is determined, the prediction unit 106c predicts, with reference to the start relationship data recording the first appliance corresponding to the second appliance, predicts, as the prediction interval of the second appliance, a time interval of the second duration including a time when the utilization interval of the first appliance is started or is ended. Specifically, the prediction unit 106c, for example, obtains a time when the utilization of the first appliance is started or is ended in real time. Then, the prediction unit 106c specifies, with reference to the start relationship data, the second appliance corresponding to the first appliance. Then, the prediction unit 106c predicts, as the prediction interval of the specified second appliance, the time interval of the second duration including a time when the utilization of the first appliance is started or is ended.

It should be noted that the first prediction scheme is a prediction scheme of predicting a prediction interval based on periodicity of the specified utilization interval for each of the appliances. In other words, the first prediction scheme is equivalent to a prediction scheme using periodicity described in Embodiment 1. In other words, the first prediction scheme is a prediction scheme using a property that an appliance is used in a predetermined cycle.

Moreover, the second prediction scheme is a prediction scheme of predicting a prediction interval based on a temporal dependence relationship between the specified utilization intervals. In other words, the second prediction scheme is a prediction scheme using the start relationship between the appliances as described in Embodiment 2. In other words, the second prediction scheme is a prediction scheme using a property that the utilization of the second appliance is started in a passage of a predetermined time after the utilization of the first appliance is started or is ended.

Next, each of the operations of the above configured power source control device 101 will be described.

It should be noted that in the present embodiment, of the flowchart of FIG. 4, a content of processing in Step S403 is different from that in Embodiment 1. Therefore, hereafter, details of the prediction interval prediction processing (S403) using a prediction interval using the first prediction scheme and the second prediction scheme will be described.

In the prediction scheme using the start relationship between the appliances, a start of another appliance before the start of the appliance is necessary. However, depending on a time period, there is a time period in which the number of appliance starts is small. Therefore, selection is made on whether which one of the prediction schemes is used based on how much an appliance starts before the predetermined time of the start of the appliance from the utilization history. The processing performed by the prediction interval prediction unit 106 will be described with reference to FIGS. 39A and 39B.

Figure 39A:
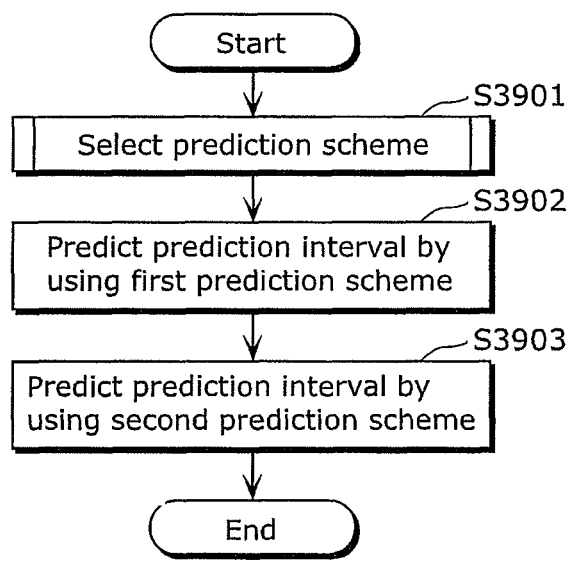
FIG. 39A is a flowchart showing a flow of prediction interval prediction processing according to Embodiment 3.

FIG. 39A is a flowchart showing a flow of the prediction interval prediction processing according to Embodiment 3. In other words, FIG. 39A is a flowchart showing details of the processing of S403 shown in FIG. 4.

First, the prediction interval prediction unit 106, for each of the appliances and each of the time periods, selects one of the first prediction scheme and the second prediction scheme (S3901). It should be noted that details of the prediction interval selection processing will be described hereafter with reference of FIG. 39B.

Next, the prediction interval prediction unit 106 predicts, regarding the appliance and the time interval both in which the first prediction scheme is selected, a prediction interval by using the first prediction scheme (S3902). Specifically, the prediction interval prediction unit 106 predicts a prediction interval according to the flowchart shown in FIG. 10.

Finally, the prediction interval prediction unit 106 predicts, regarding the appliance and the time interval both in which the second prediction scheme is selected, a prediction interval by using the second prediction scheme (S3903). Specifically, the prediction interval prediction unit 106 predicts a prediction interval according to the flowchart shown in FIG. 29.

In this way, the prediction interval prediction unit 106 predicts a prediction interval with respect to a plurality of variable values.

Next, details of the prediction scheme selection processing will be described.

Figure 39B:
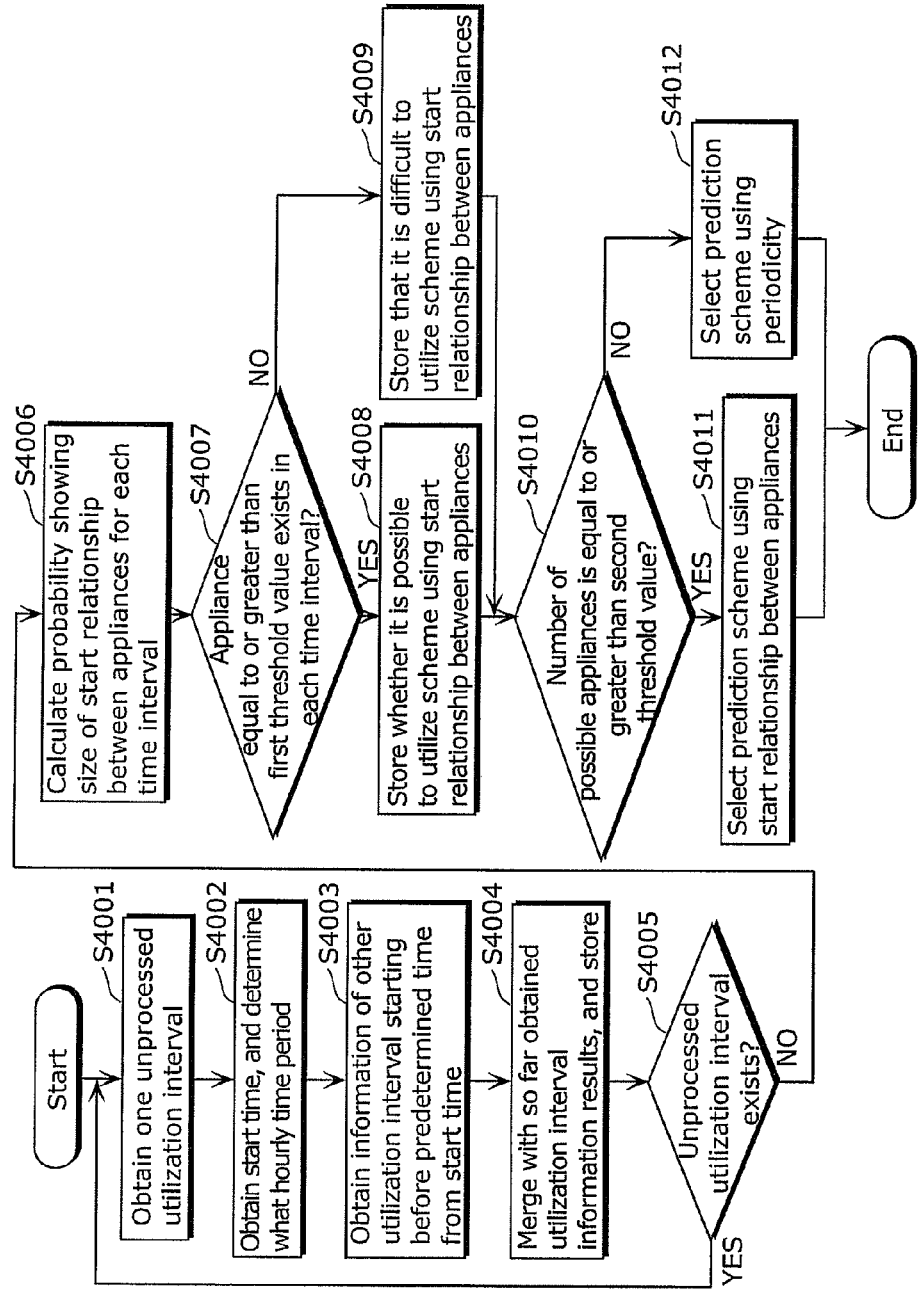
FIG. 39B is a flowchart showing a flow of the prediction scheme selection processing according to Embodiment 3.

FIG. 39B is a flowchart showing a flow of the prediction interval selection processing according to Embodiment 3. In other words, FIG. 39B is a flowchart showing details of the processing of Step S3901 shown in FIG. 39A. Hereafter, as a specific example, description will be made by designating the air conditioner as the target appliance.

First, the prediction interval prediction unit 106 obtains an unprocessed utilization interval among the utilization intervals included in the predetermined period which is a processing target (S4001). It should be noted that the prediction interval prediction unit 106 obtains temporally new utilization intervals in an order from the temporally oldest utilization interval. Therefore, the prediction interval prediction unit 106 obtains the utilization intervals in a time-series order.

Next, the prediction interval prediction unit 106 determines which of the predetermined time periods the start time of the obtained utilization interval belongs to (S4002). Specifically, the prediction interval prediction unit 106 determines what hourly time period the start time of the obtained utilization interval belongs to. More specifically, in the case where the start time of the obtained utilization interval of the air conditioner is 6:15, the prediction interval prediction unit 106 determines that the start time of the utilization interval is from 6:00 to 6:59.

Next, the prediction interval prediction unit 106 obtains information about the utilization interval in which the start time is included within the predetermined time before the start time of the obtained utilization interval (S4003). The information about the utilization interval includes, for example, the number of utilization intervals, the name of the appliance for each of the utilization intervals, the start time, and the like. Specifically, the prediction interval prediction unit 106, for example, extracts the utilization interval in which the start time is included in a period from 5:15, one hour before 6:15, to 6:15, and then obtains the name of the appliances and the start times both corresponding to the extracted utilization intervals.

The prediction interval prediction unit 106 stores, in the prediction result storage unit, the results obtained in Step S4003 through merging with the so far processed results (S4004).

An example of the stored results will be shown in FIG. 40. An item 4101 shows an appliance ID, an item 4102 shows the name of the appliance corresponding to the appliance ID, and an item 4103 is a predetermined time used in S4003. An item 4104 shows the total number of starts for each of the time periods. Specifically, it can be seen that the air conditioner starts 10 times from 6:00 to 6:59.

An item 4105 and an item 4106 show the name of the appliance, as well as the number of times, which starts within the predetermined time before the start time when the target appliance specified by the item 4101 starts. Specifically, the total number of starts of the appliance which starts within 60 minutes before the air conditioner which starts from 6:00 to 6:59 is 34, of which the number of times of television starts is 10. Therefore, the television starts average once within 60 minutes before the start time of the air conditioner which starts from 6:00 to 6:59.

Next, the prediction interval prediction unit 106 determines whether or not there is an unprocessed utilization interval in the utilization interval of the target appliance (S4005). Here, in the case where there is the unprocessed interval (YES in S4005), the processing returns to S4001 and the prediction interval prediction unit 106 obtains the unprocessed utilization interval.

Meanwhile, in the case where there is no unprocessed utilization interval (NO in S4005), the evaluation unit 106a calculates a probability showing a size of a start relationship for each of the time intervals (S4006). In other words, the evaluation unit 106a calculates, for each of the time intervals, a probability showing a size of a start relationship between the appliances as shown in FIG. 32. The probability calculated here is the aforementioned forward probability that within a predetermined time before the start of a certain appliance, another appliance starts. In other words, the evaluation unit 106a, in the utilization interval data, calculates a probability for each of the first appliances that the start time or the end time of the first appliance is included in a period from the start time of the utilization interval of the second appliance to before the predetermined time.

Specifically, the forward probability of the television start with respect to the start of the air conditioner from 6:00 to 6:59 is one because the number of starts of the air conditioner from 6:00 to 6:59 is 10 and the number of starts of the television is also 10. Meanwhile, the forward probability of the start of the television with respect to the start of the air conditioner from 7:00 to 7:59 is zero because the number of starts of the air conditioner from 7:00 to 7:59 is 3 and the number of starts of the television is zero.

Next, the evaluation unit 106a determines whether or not a probability showing a size of a probability of a start relationship between the appliances is equal to or greater than a first threshold value (S4007). Specifically, in the case where the first threshold value is 0.2, the evaluation unit 106a determines that the forward probability "1" of the start of the television with respect to the start of the air conditioner from 6:00 to 6:59 is equal to or greater than the first threshold value. Meanwhile, the evaluation unit 106a determines that the forward probability "0" of the start of the television with respect to the start of the air conditioner from 7:00 to 7:59 is smaller than the first threshold value.

Here, in the case where the probability showing a size of a start relationship between the appliances is equal to or greater than the first threshold value (YES in S4007), the evaluation unit 106a stores, with respect to the time period and the appliance corresponding to the probability, in the prediction result storage unit 107 in which the prediction scheme using the start relationship between the appliances (the second prediction scheme) can be utilized (S4008).

Meanwhile, in the case where the probability showing a size of a start relationship between the appliances is less than the first threshold value (NO in S4007), the evaluation unit 106a stores, with respect to the time period and the appliance corresponding to the probability, in the prediction result storage unit 107 in which the prediction scheme using the start relationship between the appliances (the second prediction scheme) is difficult to be utilized (S4009).

An example of a determination result for each of the time intervals and each of the appliances stored in the prediction result storage unit 107 in Step S4008 and Step S4009 will be shown in FIG. 41.

Items 4201 to 4203 are the same as the items 4101 to 4103 in FIG. 40. The item 4204 is the name of the appliance which starts within the predetermined time before the start time when the target appliance starts, and the item 4205 is a result of comparison between the forward probability and the first threshold value with respect to each of the appliances. FIG. 41 shows that an example where "1" is stored in the case where the forward probability is equal to or greater than the first threshold value and an example where "0" is stored in the case where the forward probability is less than the first threshold value.

The determination unit 106b calculates, by using the determination results for each of the time periods and each of the appliances stored in Step S4008 and Step S4009, the number of appliances which can be applicable to the prediction scheme using the start relationship between the appliances at the same time and then determines whether the calculated number of appliances is equal to or greater than a second threshold value (S4010). The second threshold value is a value which is determined based on the number of appliances in which power consumption data are collected.

Here, in the case where the number of appliances is equal to or greater than the second threshold value (YES in S4010), the determination unit 106b, in the time interval, stores, in the prediction result storage unit 107, information showing the use of the prediction scheme using the start relationship between the appliance (S4011). In other words, the determination unit 106b selects the second prediction scheme. In other words, the determination unit 106b determines the second prediction scheme as a prediction scheme for the second appliance in the case where the number of the first appliances having the calculated probability equal to or greater than the first threshold value is equal to or greater than the second threshold value.

Meanwhile, in the case where the number of appliances is less than the second threshold value (NO in S4010), the determination unit 106b, in the time period, stores, in the prediction result storage unit 107, information showing the use of the prediction scheme (the first prediction scheme)

using periodicity. In other words, the determination unit 106*b* selects the first prediction scheme (S4012). In other words, the determination unit 106*b* determines the first prediction scheme as a prediction scheme for the second appliance in the case where the number of the first appliances having the calculated probability equal to or greater than the first threshold value is less than the second threshold value.

The prediction unit 106*c* predicts a prediction interval as similarly to Embodiment 1 or Embodiment 2 according to the selected prediction scheme.

An example of information stored in Step S4011 and Step S4012 will be shown in FIG. 42. Here, items 4301 to 4303 are the same as the items 4101 to 4103 in FIG. 40. An item 4304 shows which of the prediction schemes is used for each of the time intervals. In FIG. 42, "1" shows the prediction scheme using periodicity (the first prediction scheme) and "2" shows the prediction scheme using the start relationship between the appliances (the second prediction scheme).

An item 4305 shows an appliance which becomes the former appliance (the first appliance) when the prediction scheme using the start relationship between the appliances is used. In other words, the item 4305 shows the first appliance corresponding to the second appliance. Specifically, in FIG. 42, the prediction interval of the air conditioner from 6:00 to 6:59 is predicted based on the prediction scheme using the start relationship between the appliances, and it is predicted that the air conditioner starts after the start of the television, the DVD recorder, or the laundry machine. Meanwhile, the prediction intervals of the air conditioner from 7:00 to 7:59 and from 8:00 to 8:59 are predicted based on the prediction scheme using periodicity.

As described above, the power source control device 101 according to the present embodiment can predict a prediction interval by adaptively using the first prediction scheme and the second prediction scheme, thus making it possible to control a decrease in power saving effect while attain a decrease in the user load in the case where power supply to an appliance is controlled based on the prediction interval.

It should be noted that the prediction using the utilization interval data has a small amount of utilization interval data at the start of the prediction, and when the number of days after collection of power consumption data is started is passed, an amount of the prediction interval data is increased. Therefore, for example, the prediction interval prediction unit 106 may perform the prediction scheme selection processing on a daily basis and may select every day which of the prediction schemes will be used.

Moreover, in the above described embodiment, the power source control device 101 includes the user load prediction unit 108, the power saving effect prediction unit 109, and the power source control unit 110, and the like, but must not necessarily include these processing units. For example, the power source control device 101 may at least include the utilization interval specification unit 104 and the prediction interval prediction unit 106. Moreover, the power source control device 101 must not necessarily predict the prediction interval with respect to a plurality of variable values. In this case, the power source control device 101 is equivalent to the utilization start interval prediction device. Such a utilization start interval prediction device can also predict a prediction interval for each of the appliances by adaptively using the first prediction scheme and the second prediction scheme, thus making it possible to control a decrease in the power saving effect while attain a decrease in the user load in the case where power supply to an appliance is controlled based on the prediction interval.

Moreover, in the above embodiment, the power source control device 101 selects the first prediction scheme or the second prediction scheme for each of the appliances and each of the time periods, but must not necessarily make a selection in this way. For example, the power source control device 101 may select the first prediction scheme or the second prediction scheme for each of the appliances or each of the time periods.

Modification 1 of Embodiment 3

It should be noted that the selection of the prediction scheme is not limited to the aforementioned selection schemes. For example, in the case where data amount is small for the power consumption data or the utilization interval data, a probability accuracy showing a size of a start relationship between the appliances is low.

Therefore, a prediction interval prediction unit 106 according to the present modification selects a prediction scheme using periodicity in the case where the data amount of the power consumption data or the utilization interval data is less than a predetermined value. Meanwhile, the prediction interval prediction unit 106 selects the prediction scheme using the start relationship between the appliances in the case where the data amount of the power consumption data or the utilization interval data is equal to or greater than a predetermined value.

Specifically, the prediction interval prediction unit 106, for example, determines, for each of the appliances, whether or not the data amount of the power consumption data is equal to or greater than the threshold value. Here, in the case where the data amount of the power consumption data is less than the threshold value, the prediction interval prediction unit 106 predicts the prediction interval of the appliance by using the first prediction scheme. Meanwhile, in the case where the data amount of the power consumption data is equal to or greater than the threshold value, the prediction interval prediction unit 106 predicts the prediction interval of the appliance by using the second prediction scheme.

Moreover, for example, the prediction interval prediction unit 106 may determine, for each of the appliances, whether or not the number of utilization intervals included in the utilization interval data (the data amount of the utilization interval data) is equal to or greater than the threshold value. In this case, in the case where the number of utilization intervals is less than the threshold value, the determination unit 106*b* determines the first prediction scheme as the prediction scheme for the appliance. Meanwhile, in the case where the number of utilization intervals is equal to or greater than the threshold value, the determination unit 106*b* determines the second prediction scheme as the prediction scheme for the appliance.

With this, the prediction interval prediction unit 106 can select the prediction scheme using periodicity when an accuracy of probability showing a size of a start relationship between the appliances is low because the number of utilization intervals is small. Moreover, the prediction interval prediction unit 106 can select a prediction scheme using the start relationship between the appliances in the case where power saving effect is decreased because the number of utilization intervals is large. As a result, the prediction interval prediction unit 106 can predict a prediction interval such that the user load is decreased and the power saving effect is increased.

It should be noted that like Embodiment 3, the prediction interval prediction unit 106 can make a selection for each of the time intervals in the above mentioned selection.

Moreover, a switch between both schemes can be performed based on a variation in the number of times of utilization intervals of the appliance for each of the time intervals. This is because in the case where prediction is performed by using periodicity and there is a utilization interval even only once, electric power is always supplied to time periods around the start time and therefore electric power is unnecessarily supplied. Therefore, the prediction interval prediction unit 106 may predict a prediction interval such that in the case where the number of utilization times within a predetermined period is less than a predetermined value, the time interval is not a prediction interval. Furthermore, with respect to the appliance which has time intervals in which the number of utilization times within a predetermined period is less than a predetermined value, the prediction interval prediction unit 106 may, in the time intervals having a small number of the utilization times, use the prediction scheme using the start relationship between the appliances.

For example, in the case where there is a history in which the utilization of the laundry machine was previously started from 11:00 to 11:59 and electric power is supplied to the laundry machine based on the prediction that the utilization of the laundry machine is started from 11:00 to 11:59 but it is learned that the laundry machine is not used from 11:00 to 11:59 for a month, the prediction of the utilization of the laundry machine from 11:00 to 11:59 is canceled. Instead, control is changed such that electric power is supplied to an appliance, as the former appliance, which starts or ends before the start in the utilization from 11:00 to 11:59, corresponding to the start of the appliance. In this case, when the appliance used as the former appliance is used every day from 11:00 to 11:59, electric power is supplied to the laundry machine in the time period corresponding to the start of the appliance, with a result that electric power is unnecessarily supplied. Therefore, the former appliance is determined based on the number of starts. Specifically, the appliance which starts equal to or more than the predetermined number of times is not designated as the former appliance. Moreover, as described in Modification 6 of Embodiment 2, in the case where there is a forward probability equal to or more than the predetermined value with respect to a plurality of appliances, a prediction is performed by using the start relationship between the appliances by using the forward probability with respect to the plurality of appliances.

Modification 2 of Embodiment 3

Moreover, the switch between the prediction schemes may be performed by using the start relationship between the appliances in which the time interval in Modification 5 of Embodiment 2 is also considered. For example, because, in a certain time period, it can be seen that after the start or the end of the utilization interval of one of the appliances, there is no start of the other appliance for a time equal to or more than the predetermined time, the prediction interval prediction unit 106 controls such that the prediction scheme using periodicity is not used for the time period after the start of the appliance. Specifically, in the case where there is a high probability that after the start of the dishwasher from 9:00 to 11:59 in the evening, other appliances do not start for 6 hours or longer, even if the laundry machine has operated in a time period after the start of the dishwasher from 9:00 to 11:59 in the evening, the prediction interval prediction unit 106 does not predict a prediction interval in which the start time is included in from 9:00 to 11:59 by using a prediction scheme using periodicity. With this, the power source control device 101 can stop unnecessary power supply in the time period by predicting a trend of sleep and outing by using the start or the end of the predetermined appliance.

Modification 3 of Embodiment 3

Moreover, the prediction interval prediction unit 106 may, by applying the prediction schemes to the past utilization history, determine which of the prediction schemes is used by using the result. In other words, in the present modification, the evaluation unit 106a calculates, with respect to a prediction interval predicted by each of the first prediction scheme and the second prediction scheme based on the utilization interval data of a part of the time interval of the utilization interval data among the utilization interval data, an evaluation value by using the utilization interval data of another part of the time interval of the utilization interval data among the utilization interval data.

Specifically, the past utilization history, as described in Embodiment 1, is divided between a period in which a prediction interval is generated and a period in which the user load value and the power saving effect value are calculated (the prediction is evaluated). The prediction interval prediction unit 106 predicts a prediction interval for each of the prediction schemes with respect to a period in which the prediction interval is generated. Then, the evaluation unit 106a calculates, with respect to a period in which the evaluation of the prediction interval is performed, the user load value and the power saving effect value by using both schemes. Here, the evaluation unit 106a calculates, by using the user load value and the power saving effect value, a score (evaluation value) for determining which of the schemes is used. Then, the determination unit 106b determines, by using the score, which of the schemes is used.

Specifically, the user load prediction unit 108 calculates, as the user load value, a ratio in which the user manually turns on the appliance with respect to the number of utilizations of the appliance. Then, the user load prediction unit 108 calculates, as prediction accuracy, a numeral which is generated by the subtraction of the ratio from one. The prediction accuracy is a ratio in which the appliance is automatically turned on by prediction with respect to the number of utilizations. Moreover, the power saving effect prediction unit 109 calculates the power saving effect value as a ratio in which the appliance is automatically turned off by prediction with respect to a period other than the utilization interval. Then, the evaluation unit 106a calculates, as the score, a product of multiplication of the prediction accuracy by the power saving effect value. When the prediction accuracy is higher and the power saving effect value is greater, the score is greater in value. Therefore, the determination unit 106b selects the prediction scheme having a greater score by comparing scores of the prediction schemes obtained by calculation results of the user load value and the power saving effect value with respect to the prediction schemes.

It should be noted that the prediction interval prediction unit 106 may predict a prediction interval, and calculate and compare scores using the prediction schemes for each of the attributes of utilization history such as for each of the time intervals and the same day of the week, and may determine which of the prediction schemes is used for each of the compared attributes. For example, the prediction interval prediction unit 106 calculates a score for each of the time intervals with respect to a period in which prediction is evaluated, and determines which of the schemes generates a greater score for each of the time intervals. The prediction interval prediction unit 106 switches from one of the prediction schemes to the other prediction scheme by using the result for each of the time periods.

In other words, the prediction interval prediction unit 106 selects the prediction scheme based on the evaluation value in which evaluation is higher when the user load indicated by the user load value is smaller and in which evaluation is higher when the power saving effect indicated by the power saving effect value is higher.

Modification 4 of Embodiment 3

It should be noted that in the start of the appliance, there are two kinds of starts, that is, a start in which the appliance is automatically started by a timer (automatic start) and a start in which the appliance is started by a direct start request of the user (manual start). Among the starts of the appliance by the timer, for example, there is a start of recording a program by the recording appliance or a start of cooking rice by the automatic rice cooker. The automatic start by the timer may be reflected in the calculation of the start relationship of the appliance.

Specifically, the utilization interval specification unit 104 determines whether or not the utilization interval is an automatic start among the utilization intervals of such appliance as the recording appliance. Then, the prediction interval prediction unit 106 does not use, for the calculation of the start relationship between the appliance, the utilization intervals that are determined to be automatic starts. In other words, the evaluation unit 106*a* calculates the evaluation value by using only the utilization interval in which the start is manually performed among the utilization intervals included in the utilization interval data.

Here, the utilization interval specification unit 104, for example, determines that a utilization interval in which the same time in the predetermined time interval is the start time on a daily basis or on a weekly basis is an automatic start.

Moreover, the utilization interval specification unit 104 may hold the appliance which considers an automatic start and the appliance which does not consider an automatic start. Specifically, the automatic start by a reservation for recording a program may not be used for calculating the start relationship between the appliances, but the automatic start by a reservation for rice cooking by the automatic rice cooker may be used for calculating the start relationship between the appliances. In the case of the reservation for rice cooking, there are many cases where after the rice cooking based on the automatic start, cooked rice is used for a meal. This is based on the belief that this is one of the series of daily life activities and is based on a high possibility that another appliance starts.

Modification 5 of Embodiment 3

Figure 43:
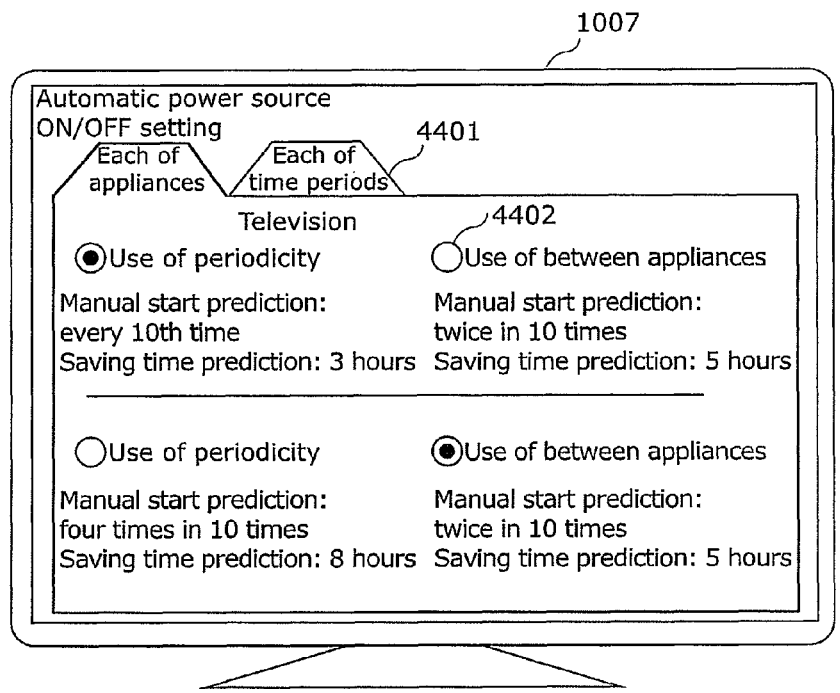
FIG. 43 is a table showing an example of setting information displayed in a display unit by a display control unit according to Modification 5 of Embodiment 3.

Based on the prediction results using the prediction schemes, a combination of the predicted power saving effect value and the predicted user load value will be shown in FIG. 43 as an example of the screen displayed in the display unit 1007. The screen is displayed by a tab form, and it is possible to select, with a tab 4401, whether to display for each of the appliance or for each of the hours.

In FIG. 43, because a tab is selected for displaying each of the appliances, a combination of the power saving effect value and the user load value of a case where the prediction interval is predicted for each of the appliances by using the prediction scheme using periodicity and a case where the prediction interval is predicted by using the start relationship between the appliances is shown. The user selects a favorite prediction scheme, by a checkbox 4402 for an exclusive selection, from the combinations of the displayed power saving effect values and the displayed user load values.

It should be noted that the display control unit 111 may automatically determine the selection of a default. In this case, in the case where, for example, there is a prediction scheme having a small user load value and a great power saving effect value, the display control unit 111 automatically selects the prediction scheme as the default.

Moreover, in FIG. 43, the display control unit 111 displays electric power information such that one of the prediction schemes can be selected, but may display the electric power information such that both of the prediction schemes can be simultaneously selected. Here, in the case where both of the prediction schemes are simultaneously selected, the display control unit 111 displays the combination of the user load value and the power saving effect value in the case where the prediction is performed by using the prediction schemes as described above. As a screen displayed in the display unit 1007, a prediction result of the user load value and the power saving effect value in the case where both prediction schemes are selected may be displayed and may be selectable as similarly to the both schemes, and as a checkbox which allows the user to select both schemes in a screen like that of FIG. 43, the prediction result of the user load and the power saving as written below the both schemes of FIG. 43 may be deleted and the prediction result of the user load and the power saving effect in the case where the both schemes are used may be displayed.

In conclusion, the power source control device 101 according to an aspect of the present disclosure is described based on the embodiments, but other embodiments are also possible. Various modifications conceived by those skilled in the art and applied to the present embodiments or embodiments structured by a combination of constituent elements in different embodiments are possible without materially departing from the novel teachings and advantages of this disclosure. Accordingly, all such modifications are intended to be included within the scope of the present disclosure.

For example, in the embodiments, the power source control device 101 receives power consumption data including an electric power value, but must not necessarily include the electric power value. For example, the power source control device 101 may receive power consumption data including an electric current value instead of the electric power value. Even in this case, the power source control device 101 can specify the utilization interval.

Moreover, in the above embodiments, description is made focusing on the case where the appliance is a household electrical appliance, but the appliance must not necessarily be a household electrical appliance. The appliance, for example, may be an electrical appliance such as lighting equipment or a water heater.

Moreover, in the above described embodiments, the power source control device 101 includes the power source control unit 110 and the like, but must not necessarily include the power source control unit 110 and the like. For example, the power source control device 101 may be a device which includes the utilization interval specification unit 104, the prediction interval prediction unit 106, the user load prediction unit 108, the power saving effect prediction unit 109, and the display control unit 111. In this case, the power source control device 101 is equivalent to an electric power information display device. Such an electric power information display device can also display a combination of the user load value and the power saving effect value with respect to a plurality of variable values, and therefore present the user with information necessary to strike a balance between the user load value and the power saving effect.

Figure 44:
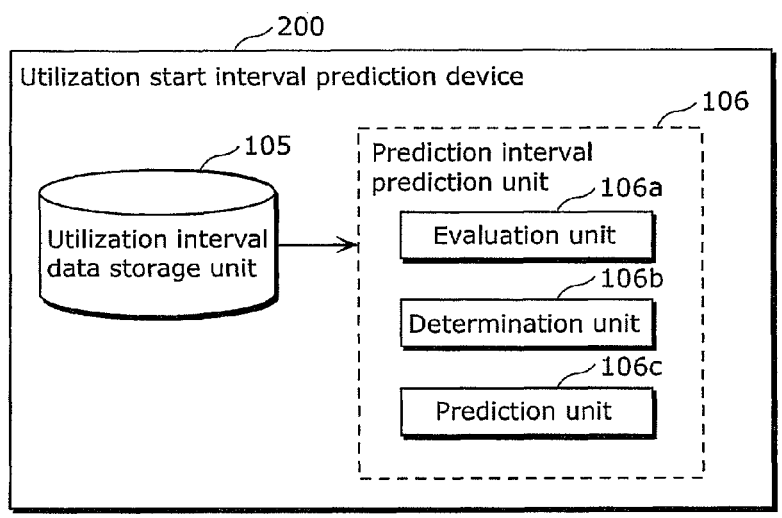
FIG. 44 is a diagram showing a functional configuration of a utilization start interval prediction device according to the present disclosure.

Moreover, the present disclosure can be implemented not only as the power source control device 101 but also a utilization start interval prediction device which includes part of the constituent elements included in the power source control device 101. FIG. 44 is a block diagram showing a functional configuration of the utilization start interval prediction device according to an aspect of the present disclosure.

As shown in FIG. 44, a utilization start interval prediction device 200 includes the utilization interval data storage unit 105 and the prediction interval prediction unit 106. In the utilization interval data storage unit 105, like Embodiments 1, 2 and 3, utilization interval data including the utilization interval history data for each of the appliances are stored. Moreover, the prediction interval prediction unit 106, like Embodiment 3, includes the evaluation unit 106a, the determination unit 106b, and the prediction unit 106c. Such a utilization start interval prediction device 200 can predict, as a prediction scheme for each of the appliance, one of the first prediction scheme and the second prediction scheme corresponding to the utilization interval history data. If electric power supply is controlled for each of the appliances by using the prediction scheme according to the prediction scheme determined in this way, a decrease in power saving effect can be controlled while a user load can be decreased.

It should be noted that in the above embodiments, each of the constituent elements may be implemented by configuring as specialized hardware or by executing a software program suitable for each of the constituent elements. Each of the constituent elements may be implemented by reading a software program recorded on a recording medium such as a hard disk or a semiconductor memory by a program execution unit such as a central processing unit (CPU) or a processor. Here, software for implementing the utilization start interval prediction device according to the above embodiments is the following program.

In other words, the program causes a computer to execute a utilization start interval prediction method for predicting, for each of a plurality of appliances consuming electric power, a prediction interval which is a time interval predicted to have a high possibility that utilization of the appliances is started, comprising: (i) calculating, by using the history data of the utilization interval, an evaluation value for determining a prediction scheme of a prediction interval, the utilization interval being a time interval in which each of the appliance is used and being stored in the utilization interval data storage unit, and the prediction scheme being for each of the appliances; (ii) determining, based on the evaluation value at least for each of the appliances, at least one of a first prediction scheme and a second prediction scheme as a prediction scheme of the prediction interval of the appliance, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is another appliance to a passage of a predetermined time; and (iii) predicting, as a prediction interval, a time interval of a first duration in the case where the first prediction scheme is determined and, as a prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data showing the first appliance corresponding to the second appliance, wherein, in the calculating, in the history data of the utilization interval, a probability is calculated for each of the first appliances, and a numeral value is calculated as the evaluation value, the probability being that the start time or the end time of the first appliance is included in a period from the start time of the utilization interval of the second appliance to before a predetermined time, and the numeral value being the number of the first appliances equal to or greater than a first threshold value, and in the determining, the second prediction scheme is determined as a prediction scheme for the second appliance in the case where the evaluation value is equal to or greater than a second threshold value, and the first prediction scheme is determined as a prediction scheme for the second appliance in the case where the evaluation value is less than the second threshold value.

Although only some exemplary embodiments have been described in detail above, those skilled in the art will readily appreciate that various modifications may be made in these exemplary embodiments without materially departing from the principles and spirit of the inventive concept, the scope of which is defined in the appended claims and their equivalents.

Industrial Applicability

One or more exemplary embodiments of the present disclosure are applicable to a utilization start interval prediction device or a power source control device which can predict a prediction interval having a high possibility that utilization is started by using history data of the utilization interval of an appliance. The target appliance can be used with respect to many electrical appliances in the households regardless of the year and date of production and manufacturers, and therefore applicability is very large.

The invention claimed is:

1. A utilization start interval prediction device for predicting, for each of a plurality of appliances consuming electric power, a prediction interval which is a time interval predicted to have a high possibility that utilization of the appliances is started, said utilization start interval prediction device comprising:

a utilization interval data storage unit configured to store, for each of the appliances, history data of a utilization interval which is a time interval in which the appliance has been used; and a prediction interval prediction unit configured to predict a prediction interval at least for each of the appliances based on the history data of the utilization interval, wherein said prediction interval prediction unit includes:

an evaluation unit configured to calculate, by using the history data of the utilization interval, an evaluation value for determining a prediction scheme of the prediction interval, the prediction scheme being for each of the appliances;

a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is another appliance until a passage of predetermined time; and a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance, wherein said evaluation unit is configured to calculate, for each of the first appliances, a probability that in the history data of the utilization interval, the start time or the end time of the first appliance is included in a period starting from the start time of the utilization interval of the second appliance to ending before a predetermined time, and calculate, as the evaluation value, the number of the first appliances for each of which the calculated probability is equal to or greater than a first threshold value, and said determination unit is configured to determine the first prediction scheme as the prediction scheme for the second appliance in the case where the evaluation value is equal to or greater than a second threshold value, and determine the first prediction scheme as the prediction scheme for the second appliance in the case where the evaluation value is less than the second threshold value.

2. The utilization start interval prediction device according to claim 1, wherein the history data of the utilization interval include data showing whether the utilization is automatically started or manually started, and said evaluation unit is configured to calculate the evaluation value by using only the utilization interval in which the utilization is manually started among the utilization intervals included in the history data of the utilization interval.

3. The utilization start interval prediction device according to claim 1, further comprising a utilization interval specification unit configured to specify a utilization interval by using history data of electric power consumed by each of the plurality of the appliances, and store the specified utilization interval in said utilization interval data storage unit, the utilization interval being a time interval in which the appliance is used.

4. The utilization start interval prediction device according to claim 1, wherein said prediction interval prediction unit is further configured to calculate, as a backward probability, a probability that in the history data of the utilization interval, the start time of the utilization interval of the second appliance is included in a period from the start time or the end time of the utilization interval of the first appliance to a passage of the predetermined time, and record the first appliance in the start relationship data, in association with the second appliance, in the case where the backward probability is equal to or greater than a threshold value.

5. The utilization start interval prediction device according to claim 1, wherein said prediction interval prediction unit is further configured to calculate a backward probability and a forward probability, and record the first appliance in the start relationship data in association with the second appliance, in the case where a score obtained from the backward probability and the forward probability is equal to or greater than a threshold value, the backward probability being a probability that in the history data of the utilization interval, the start time of the utilization interval of the second appliance is included in a period from the start time or the end time of the utilization interval of the first appliance to a passage of the predetermined time, and the forward probability being a probability that the start time or the end time of the utilization interval of the first appliance is included in a period starting from the start time or the end time of the utilization interval of the second appliance to ending before the predetermined time.

6. The utilization start interval prediction device according to claim 1, wherein, in the case where the second prediction scheme is determined, said prediction unit is further configured to:

calculate a first probability and a second probability, the first probability being a probability that in the history data of the utilization interval, the start time of the utilization interval of the second appliance is included in a period from the start time or the end time of the utilization interval of the first appliance to a passage of the predetermined time, and the second probability being a probability that the start time of the utilization interval of the second appliance is included in a period from the end time of the utilization interval of the first appliance to a passage of the predetermined time; and predict, as the prediction interval for the second appliance, a time interval of a second duration including the start time of the utilization interval of the first appliance in the case where a difference value between the first probability and the second probability is equal to or greater than a predetermined value, and predict, as the prediction interval for the second appliance, a time interval of a third duration including the end time of the utilization interval of the first appliance in the case where the difference value between the first probability and the second probability is less than the predetermined value, the third duration being shorter than the second duration.

7. The utilization start interval prediction device according to claim 1, further comprising:

a user load prediction unit configured to calculate, by using the prediction interval and the history data of the utilization interval, a user load value for each of predetermined variable values necessary to predict by the first prediction scheme or the second prediction scheme, the user load value indicating a size of a load on the user utilizing each of the appliances in the case where electric power is supplied to the appliance based on the prediction interval;

a power saving effect prediction unit configured to calculate, by using the prediction interval and the history data of the utilization interval, a power saving effect value for each of the predetermined variable values, the power saving effect value indicating a size of a power saving effect in the case where electric power is supplied to each of the appliances based on the prediction interval; and a display control unit configured to cause a display unit to display, as electric power information, a combination of the user load value and the power saving effect value both corresponding to each of the variable values.

8. The utilization start interval prediction device according to claim 7, wherein said user load prediction unit is configured to calculate the user load value such that the user load value indicates a greater load when a start time of a utilization interval included in the history data of the utilization interval is not included in the prediction interval.

9. The utilization start interval prediction device according to claim 7, wherein said user load prediction unit is configured to calculate the user load value such that an appliance indicates a greater load when a time from a start of power supply to an appliance to a start of utilization of the appliance is longer.

10. The utilization start interval prediction device according to claim 7,
wherein said user load prediction unit is configured to calculate the user load value such that a load of an appliance which can start utilization by remote control is greater than a load of an appliance which cannot start utilization by remote control.

11. The utilization start interval prediction device according to claim 7,
wherein, in the case where a predetermined user load value is selected by the user, said display control unit is configured to cause said display unit to display, as the electric power information, a combination having the power saving effect value indicating the greatest power saving effect among combinations having predetermined user load values.

12. The utilization start interval prediction device according to claim 7,
wherein said display control unit is configured to determine whether or not to display the electric power information for each of the appliances or for each of the time periods, based on a distribution of evaluation values for each of the appliances and for each of the time periods which is determined by at least one of the user load value and the power saving effect value.

13. The utilization start interval prediction device according to claim 7,
wherein said display control unit is configured to:
display the electric power information for each of the appliances in the case where a variance of evaluation values for each of the appliances is greater than a variance of evaluation values for each of the time periods; and
display the electric power information for each of the appliances in the case where the variance of evaluation values for each of the appliances is smaller than the variance of evaluation values for each of the time periods.

14. The utilization start interval prediction device according to claim 7,
wherein, in the case where the electric power information is displayed for each of the time periods, said display control unit is configured to display the electric power information for each of the time periods which is set to include a time period in which the user load value is equal to or less than a predetermined value.

15. The utilization start interval prediction device according to claim 1, further comprising
a power source control unit configured to control power supply to each of the appliances based on the prediction interval.

16. The utilization start interval prediction device according to claim 1,
wherein said evaluation unit is configured to calculate the evaluation value for each of the appliances and each of the time intervals, and
said determination unit is configured to determine, for each of the appliances and each of the time intervals, at least one of the first prediction scheme and the second prediction scheme as the prediction scheme of the prediction interval for the appliance.

17. A utilization start interval prediction device for predicting, for each of a plurality of appliances consuming electric power, a prediction interval which is a time interval predicted to have a high possibility that utilization of the appliances is started, said utilization start interval prediction device comprising:
a utilization interval data storage unit configured to store, for each of the appliances, history data of a utilization interval which is a time interval in which the appliance has been used; and
a prediction interval prediction unit configured to predict a prediction interval at least for each of the appliances based on the history data of the utilization interval,
wherein said prediction interval prediction unit includes:
an evaluation unit configured to calculate, by using the history data of the utilization interval, an evaluation value for determining a prediction scheme of the prediction interval, the prediction scheme being for each of the appliances;
a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is an other appliance until a passage of predetermined time; and
a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance,
wherein said evaluation unit is configured to calculate, as the evaluation value, a data amount of the history data of the utilization interval, and
said determination unit is configured to determine the second prediction scheme as the prediction scheme for the appliance in the case where the evaluation value is equal to or greater than a predetermined value, and determine the first prediction scheme as a prediction scheme for the appliance in the case where the evaluation value is less than the predetermined value.

18. A utilization start interval prediction device for predicting, for each of a plurality of appliances consuming electric power, a prediction interval which is a time interval predicted to have a high possibility that utilization of the appliances is started, said utilization start interval prediction device comprising:
a utilization interval data storage unit configured to store, for each of the appliances, history data of a utilization interval that is a time interval in which the appliances has been used; and
a prediction interval prediction unit configured to predict a prediction interval at least for each of the appliances based on the history data of the utilization interval, wherein said prediction interval prediction unit includes:
an evaluation unit configured to calculate, by using the history data of the utilization interval, an evaluation value for determining a prediction scheme of the prediction interval, the prediction scheme being for each of the appliances;
a determination unit configured to determine at least one of a first prediction scheme and a second prediction scheme as the prediction scheme of predicting the prediction interval for the appliance based on the evaluation value at least for each of the appliances, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is an other appliance until a passage of predetermined time; and
a prediction unit configured to predict, as the prediction interval, a time interval of a first duration in the case where the first prediction scheme is determined, and predict, as the prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data indicating the first appliance corresponding to the second appliance,
wherein said evaluation unit is configured to calculate the evaluation value, for each of the prediction result of the prediction interval by the first prediction scheme and the prediction result of the prediction interval by the second prediction scheme which are predicted by using history data of a part of the time interval among the history data of the utilization interval, by using history data of another part of the time interval, and
said determination unit is configured to determine, as the prediction scheme for the appliance, one of the first prediction scheme and the second prediction scheme for which the evaluation value is higher.

19. A utilization start interval prediction method for predicting, for each of a plurality of appliances consuming electric power, a prediction interval which is a time interval predicted to have a high possibility that utilization of the appliances is started, said utilization start interval prediction method comprising:
calculating, by using the history data of the utilization interval, an evaluation value for determining a prediction scheme of a prediction interval, the utilization interval being a time interval in which each of the appliance is used and being stored in the utilization interval data storage unit, and the prediction scheme being for each of the appliances;
determining, based on the evaluation value at least for each of the appliances, at least one of a first prediction scheme and a second prediction scheme as a prediction scheme of the prediction interval of the appliance, the first prediction scheme being a prediction scheme using a property that the appliance is utilized in a predetermined cycle, and the second prediction scheme being a prediction scheme using a property that the utilization of a second appliance that is the appliance is started in a period from a start or an end of utilization of a first appliance that is another appliance to a passage of a predetermined time; and
predicting, as a prediction interval, a time interval of a first duration in the case where the first prediction scheme is determined and, as a prediction interval, a time interval of a second duration with reference to start relationship data in the case where the second appliance is determined, the time interval of the first duration including a time periodically corresponding to a start time of the utilization interval included in the history data of the utilization interval, the time interval of the second duration including a time when the utilization of the first appliance is started or ended, and the start relationship data showing the first appliance corresponding to the second appliance,
wherein, in said calculating, in the history data of the utilization interval, a probability is calculated for each of the first appliances, and a numeral value is calculated as the evaluation value, the probability being that the start time or the end time of the first appliance is included in a period from the start time of the utilization interval of the second appliance to before a predetermined time, and the numeral value being the number of the first appliances equal to or greater than a first threshold value, and
in said determining, the second prediction scheme is determined as a prediction scheme for the second appliance in the case where the evaluation value is equal to or greater than a second threshold value, and the first prediction scheme is determined as a prediction scheme for the second appliance in the case where the evaluation value is less than the second threshold value.

20. A non-transitory computer-readable recording medium having a program recorded thereon for causing a computer to execute the utilization start interval prediction method according to claim 19.

* * * * *